United States Patent
Erno et al.

(10) Patent No.: US 11,067,867 B2
(45) Date of Patent: Jul. 20, 2021

(54) ELECTROCHROMIC ORGANIC FRAMEWORKS

(71) Applicant: Gentex Corporation, Zeeland, MI (US)

(72) Inventors: Zachary B. Erno, Grand Rapids, MI (US); Sue F. Franz, Holland, MI (US); Leroy J. Kloeppner, Jenison, MI (US); Steven D. Looman, Holland, MI (US)

(73) Assignee: GENTEX CORPORATION, Zeeland, MI (US)

(*) Notice: Subject to any disclaimer, the term of this patent is extended or adjusted under 35 U.S.C. 154(b) by 226 days.

(21) Appl. No.: 15/971,431

(22) Filed: May 4, 2018

(65) Prior Publication Data

US 2018/0321565 A1    Nov. 8, 2018

Related U.S. Application Data

(60) Provisional application No. 62/501,477, filed on May 4, 2017.

(51) Int. Cl.
| | | |
|---|---|---|
| *G02F 1/1516* | (2019.01) | |
| *G02F 1/155* | (2006.01) | |
| *C09K 9/02* | (2006.01) | |
| *G02F 1/1514* | (2019.01) | |

(52) U.S. Cl.
CPC .............. *G02F 1/1516* (2019.01); *C09K 9/02* (2013.01); *G02F 1/155* (2013.01); *G02F 1/15165* (2019.01); *G02F 2001/15145* (2019.01)

(58) Field of Classification Search
CPC .... G02F 1/1516; G02F 1/155; G02F 1/15165; G02F 2001/15145; C09K 9/02; C09K 9/00; C09K 3/00; C07F 1/00
See application file for complete search history.

(56) References Cited

U.S. PATENT DOCUMENTS

| | | | |
|---|---|---|---|
| 4,297,401 A | 10/1981 | Chern et al. | |
| 4,418,102 A | 11/1983 | Ferrato | |
| 4,695,490 A | 9/1987 | McClelland et al. | |
| 4,902,108 A | 2/1990 | Byker | |
| 5,596,023 A | 1/1997 | Tsubota et al. | |
| 5,596,024 A | 1/1997 | Horie et al. | |
| 5,805,330 A | 9/1998 | Byker et al. | |

(Continued)

OTHER PUBLICATIONS

Liu, Jian-Jun, Anion-Mediated Architecture and Photochromism of Rigid Bipyridinium-Based Coordination Polymers, Crystal Growth & Design, 2016 16, 2836-2842.

(Continued)

*Primary Examiner* — Tuyen Tra
(74) *Attorney, Agent, or Firm* — Price Heneveld LLP; Bradley D. Johnson

(57) ABSTRACT

The electrochromic device includes a first substantially transparent substrate coupled to a first transparent electrode, a second substrate coupled to a second electrode, and an electrochromic medium. The electrochromic medium includes at least one solvent and/or an electrolyte gel, at least one cathodic material, and at least one anodic material. The cathodic material can be a cathodic organic framework electroactive material and/or the anodic material can be an anodic organic framework electroactive material. At least one of the anodic and cathodic organic framework electroactive materials is electrochromic.

20 Claims, 10 Drawing Sheets

(56) References Cited

U.S. PATENT DOCUMENTS

| | | | |
|---|---|---|---|
| 5,818,625 A | 10/1998 | Forgette et al. | |
| 5,940,201 A | 8/1999 | Ash et al. | |
| 6,137,620 A | 10/2000 | Guarr et al. | |
| 6,157,480 A | 12/2000 | Anderson et al. | |
| 6,188,505 B1 | 2/2001 | Lomprey et al. | |
| 6,239,898 B1 | 5/2001 | Byker et al. | |
| 6,242,602 B1 | 6/2001 | Giri et al. | |
| 6,249,369 B1 | 6/2001 | Theiste et al. | |
| 6,407,847 B1 | 6/2002 | Poll et al. | |
| 6,433,914 B1 | 8/2002 | Lomprey et al. | |
| 6,567,708 B1 | 5/2003 | Bechtel et al. | |
| 6,597,489 B1 | 7/2003 | Guarr et al. | |
| 6,710,906 B2 | 3/2004 | Guarr et al. | |
| 6,714,334 B2 | 3/2004 | Tonar | |
| 6,867,894 B2 * | 3/2005 | Asano | G02F 1/155 252/583 |
| 7,046,418 B2 | 5/2006 | Lin et al. | |
| 7,085,609 B2 | 8/2006 | Bechtel et al. | |
| 7,372,611 B2 | 5/2008 | Tonar et al. | |
| 7,379,225 B2 | 5/2008 | Tonar et al. | |
| 7,428,091 B2 | 9/2008 | Baumann et al. | |
| 7,855,821 B2 | 12/2010 | Baumann et al. | |
| 7,990,603 B2 | 8/2011 | Ash et al. | |
| 8,947,756 B2 | 2/2015 | Noh et al. | |
| 9,766,528 B2 * | 9/2017 | Kloeppner | G02F 1/1533 |
| 2006/0023290 A1 | 2/2006 | Giri et al. | |
| 2016/0377946 A1 | 12/2016 | Baumann | |

OTHER PUBLICATIONS

Leroux, Maxime, Porous Coordination Polymer Based on Bipyridinium Carboxylate Linkers with High and Reversible Ammonia Uptake, Inorganic Chemistry, 2016, 55, 8587-8594.

Higuchi, Masakazu, Design of Flexible Lewis Acidic Sites in Porous Coordination Polymers by using the Viologen Moiety, Structure Elucidation, Angewandte Chem., 2012, 51, 8369-8372.

Sun, Jian-Ke, Reversible Luminescence Switch in a Photochromic Metal-organic Framework, Chem Commun., 2011, 47, 6870-6872.

Yao, Qing-Xia, Novel Polythreaded Coordination Polymer: from an Armed-Polyrotaxane Sheet to a 3D Polypseudorotaxane Array, Photo- and Thermochromic Behaviors, Inorg. Chem. 2009, 48, 1266-1268.

* cited by examiner

ELECTROCHROMIC ORGANIC FRAMEWORKS

CROSS REFERENCE TO RELATED APPLICATIONS

This application claims priority under 35 U.S.C. § 119(e) to U.S. Provisional Patent Application No. 62/501,477, entitled "ELECTROCHROMIC ORGANIC FRAMEWORKS," filed May 4, 2017, the entire disclosure of which is incorporated herein by reference.

FIELD OF THE DISCLOSURE

The present disclosure generally relates to electrochromic devices, and more particularly, to covalent organic frameworks using electrochromic dyes.

BACKGROUND OF THE DISCLOSURE

In electrochromic devices, the color, reflectance, and/or transmission of a composition is changed by an electrochemical reaction caused by application of an electrical potential difference to electrodes in contact with the composition. A material having such a property, that is, a material whose optical characteristics may be reversibly changed by an electrochemical redox reaction, is called an electrochromic material. An electrochromic material may be colorless until an electric field is applied thereto, it may be colored in the absence of an applied electric field and lose the color and become colorless when an electric field is applied, or it may go from one color state to another color state when an electric field is applied.

In an electrochromic device, the electrochromic medium may include a cathodic compound and an anodic compound held in contact with two electrodes. The electrochromic medium can be held as a layer between and in contact with the two, substantially planar, parallel, spaced-apart electrode layers. These electrode layers may be substantially transparent layers (such as indium-tin oxide or fluorine-doped tin oxide) coated on a substantially transparent material, such as glass, polycarbonate, or PET. One of these electrodes may be non-transparent or semitransparent such as in the case of a mirror, in which case, one of electrode layer may be reflective metal or metal alloy or combination thereof conductor. With no potential difference between the electrode layers, and the electrochromic medium therebetween in its zero-potential equilibrium state, the electrochromic medium can be clear or colored. When a potential difference of sufficient magnitude (which will typically be less than about 2.0 volts and will depend on a number of factors, including the redox potentials of the cathodic and anodic compounds in the electrochromic medium) is applied across the electrode layers, reflectance or transmittance of light through the device is changed, and the color of the device may be perceived as changing, as reduction of the cathodic compound at the electrode functioning as the cathode yields a composition with a molar extinction coefficient at least one wavelength in the visible or infrared range that is different from that of the cathodic compound in its zero-potential equilibrium state and, similarly, oxidation of anodic compound at the electrode functioning as the anode yields a composition with the molar extinction coefficient of at least one wavelength in the visible or infrared range that is different from that of the anodic compound in its zero-potential equilibrium state. The rate at which a solution based electrochromic medium layer changes color once potential difference is applied across the electrode layers, and the steady-state transmission or reflectance or color that results if a potential difference is maintained for a sufficiently long period of time, will depend on a number of factors, including the potential difference, the current across the electrochromic medium layer, the thickness of the electrochromic medium, and the rate at which the reduced cathodic compound is reoxidized and the oxidized anodic compound is re-reduced. Once the potential difference between the electrode layers is reduced or eliminated the color or transmission or reflectance of the solution layer will return toward a zero-potential equilibrium state, as the concentrations of reduced cathodic compound and oxidized anodic compound will decrease toward lower, steady-state levels. Thus, by adjusting the potential difference between the electrode layers, such a device can function as a "grayscale" device, with continuous, or step-wise, variable transmittance or reflectance over a wide range. Ideally, when the potential between the electrodes of such a device is returned to zero, the device returns to the same, zero-potential, equilibrium color and transmittance or reflectance as the device had before the potential was applied.

Accordingly, new designs for electrochromic devices including their configurations and assemblies, in addition with new complementary electrochromic materials are needed particularly in view of processing costs, aesthetics, and/or improved functionality.

BRIEF SUMMARY OF THE DISCLOSURE

According to at least one aspect of the present disclosure, an electrochromic device is disclosed. The electrochromic device includes a first substantially transparent substrate coupled to a first electrically conductive material, a second substrate coupled to a second electrically conductive material, and an electrochromic medium. The electrochromic medium includes at least one solvent and/or an electrolyte gel, at least one cathodic material, and at least one anodic material. The cathodic material is a cathodic organic framework electroactive material and/or the anodic material is an anodic organic framework electroactive material. At least one of the anodic and cathodic organic framework electroactive materials is electrochromic. The cathodic organic framework electroactive material is represented by the following structure (VI):

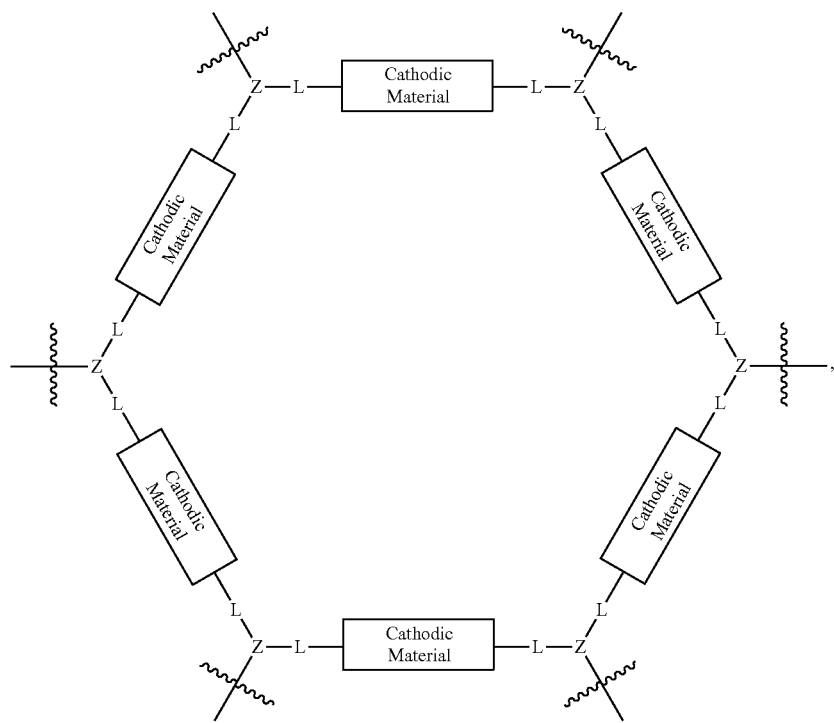
(VI)
and the anodic organic framework electroactive material is represented by the following structure (I):
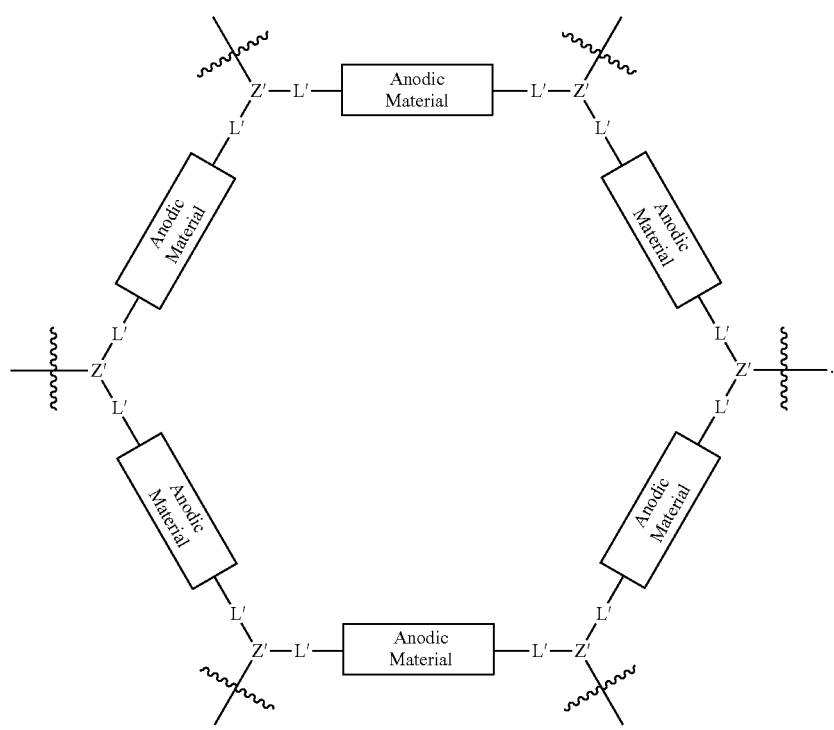
(I)

According to another aspect of the present disclosure, an electrochromic device is disclosed. The electrochromic device includes a first substantially transparent substrate coupled to a first electrically conductive material, a second substrate coupled to a second electrically conductive material, and an electrochromic medium. The electrochromic medium includes at least one solvent and/or an electrolyte gel, at least one cathodic material, and at least one anodic material. The cathodic material is a cathodic organic framework electroactive material and/or the anodic material is an anodic organic framework electroactive material. At least one of the anodic and cathodic organic framework electroactive materials is electrochromic. The cathodic organic framework electroactive material is represented by the following structure (VII):

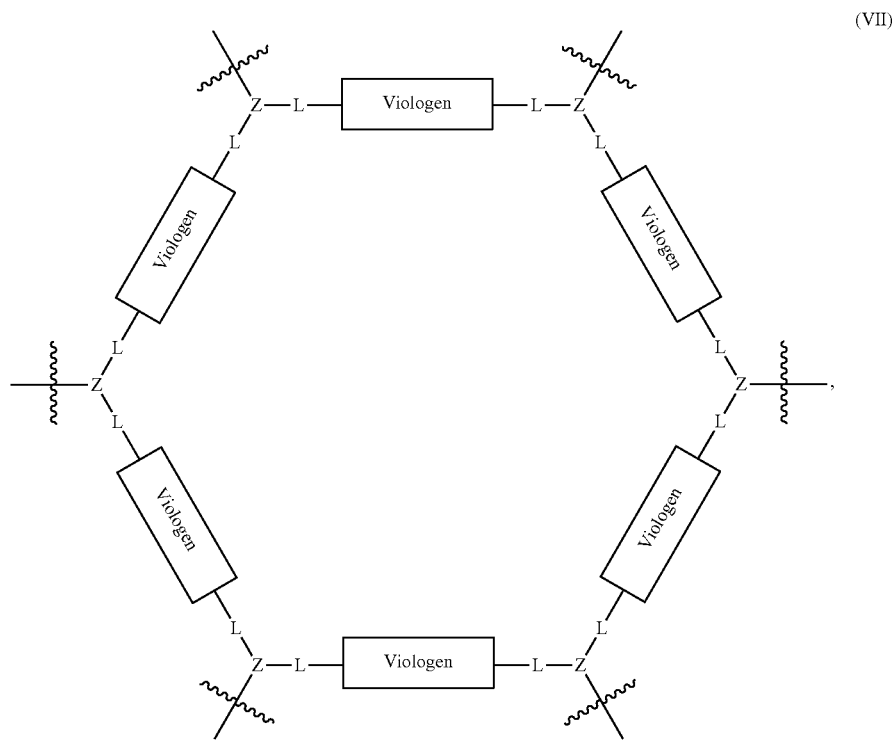

(VII)

and the anodic organic framework electroactive material is represented by the following structure (II):

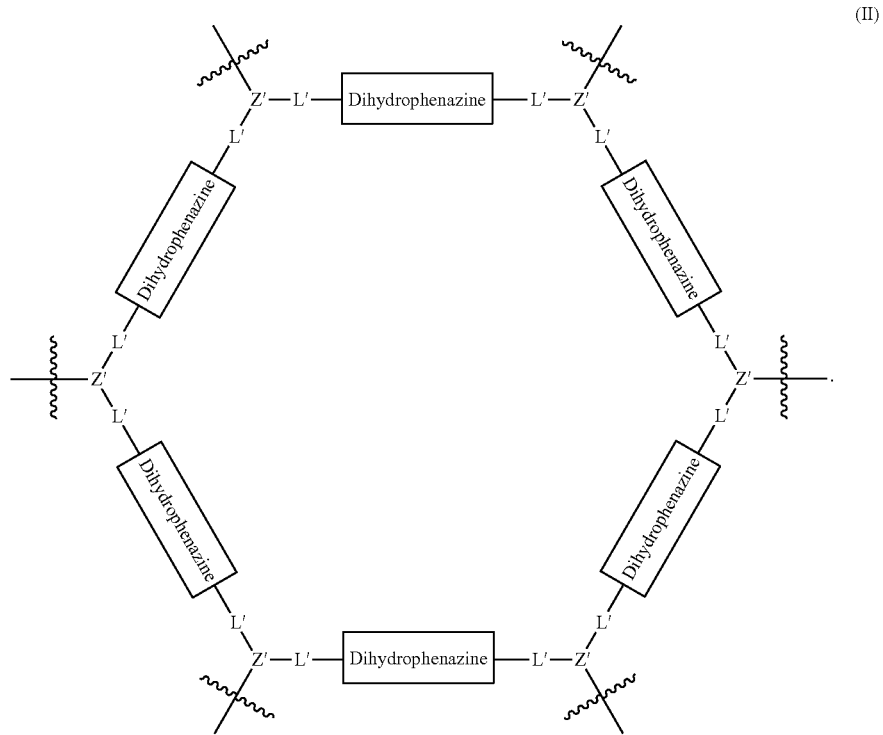

(II)

According to yet another aspect of the present disclosure, an electrochromic device is disclosed. The electrochromic device includes a first substantially transparent substrate coupled to a first electrically conductive material, a second substrate coupled to a second electrically conductive material, and an electrochromic medium. The electrochromic medium includes at least one solvent and/or an electrolyte gel, at least one anodic material, and at least one cathodic material. The cathodic material is a cathodic covalent organic framework electroactive material and/or the anodic material is an anodic covalent organic framework electroactive material. At least one of the anodic and cathodic covalent organic framework electroactive materials is electrochromic. The cathodic covalent organic framework electroactive material is represented by at least one of the following chemical structures (VIII)-(XII):

(VIII)
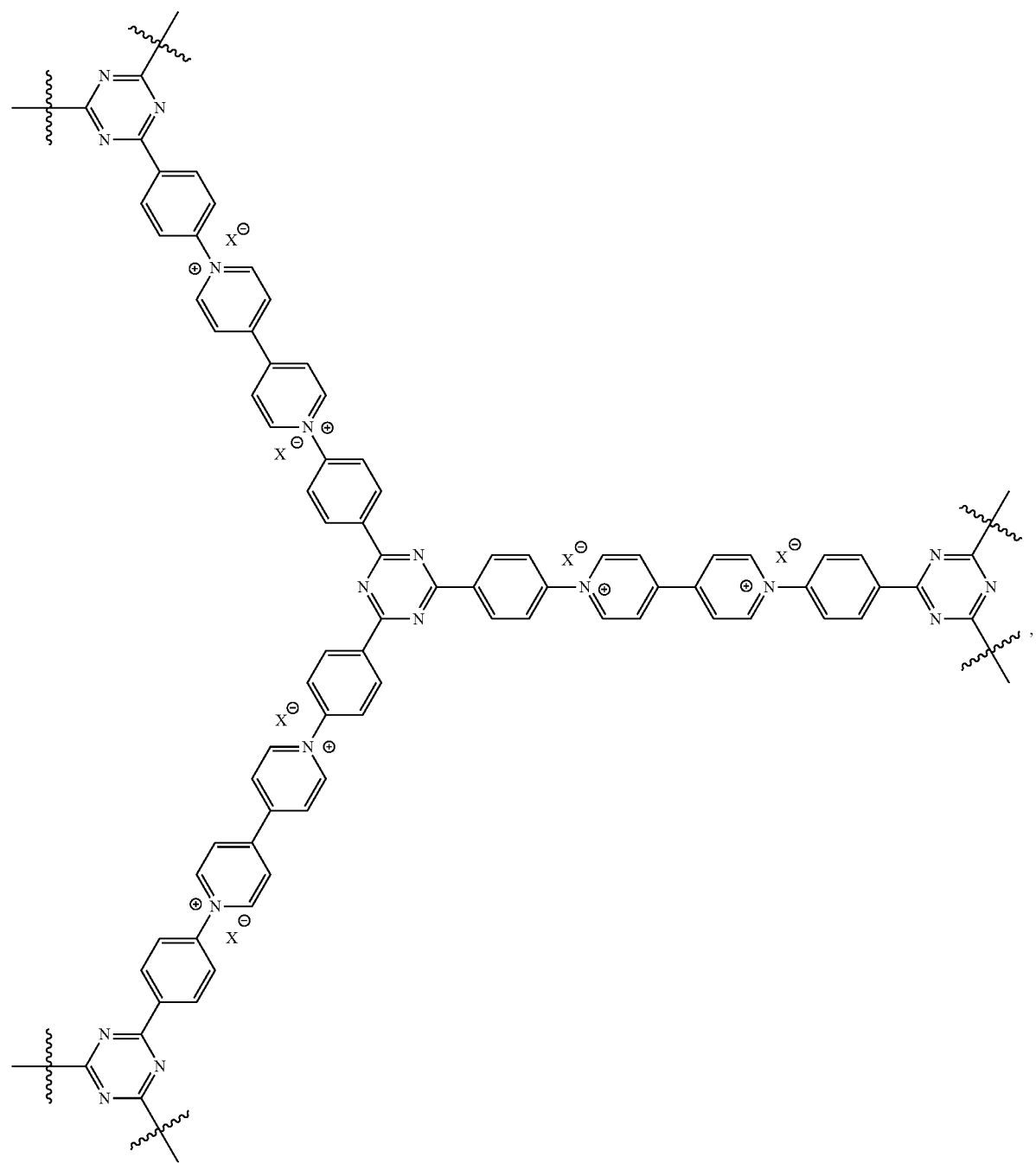

-continued
(IX)
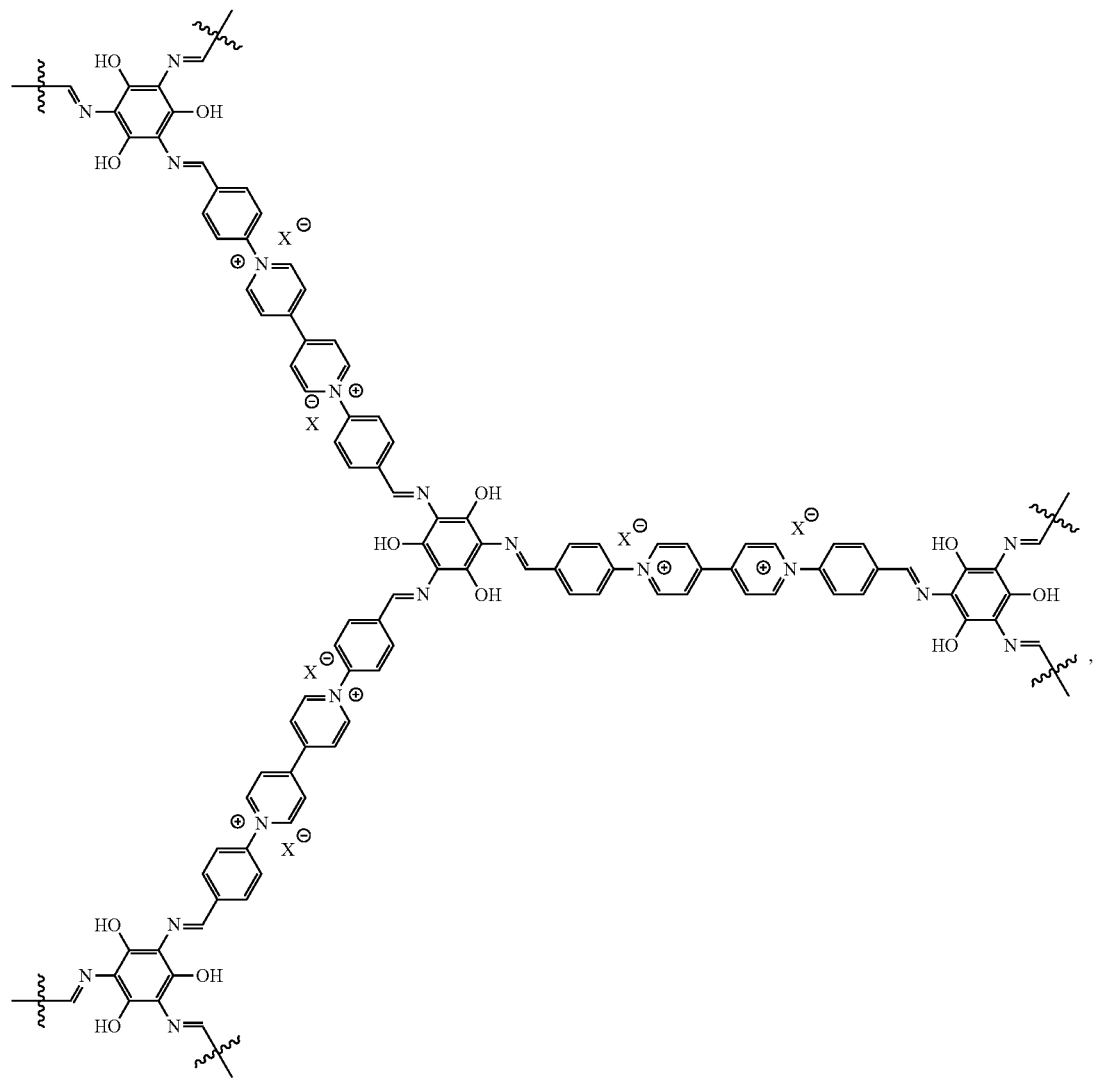

(X)
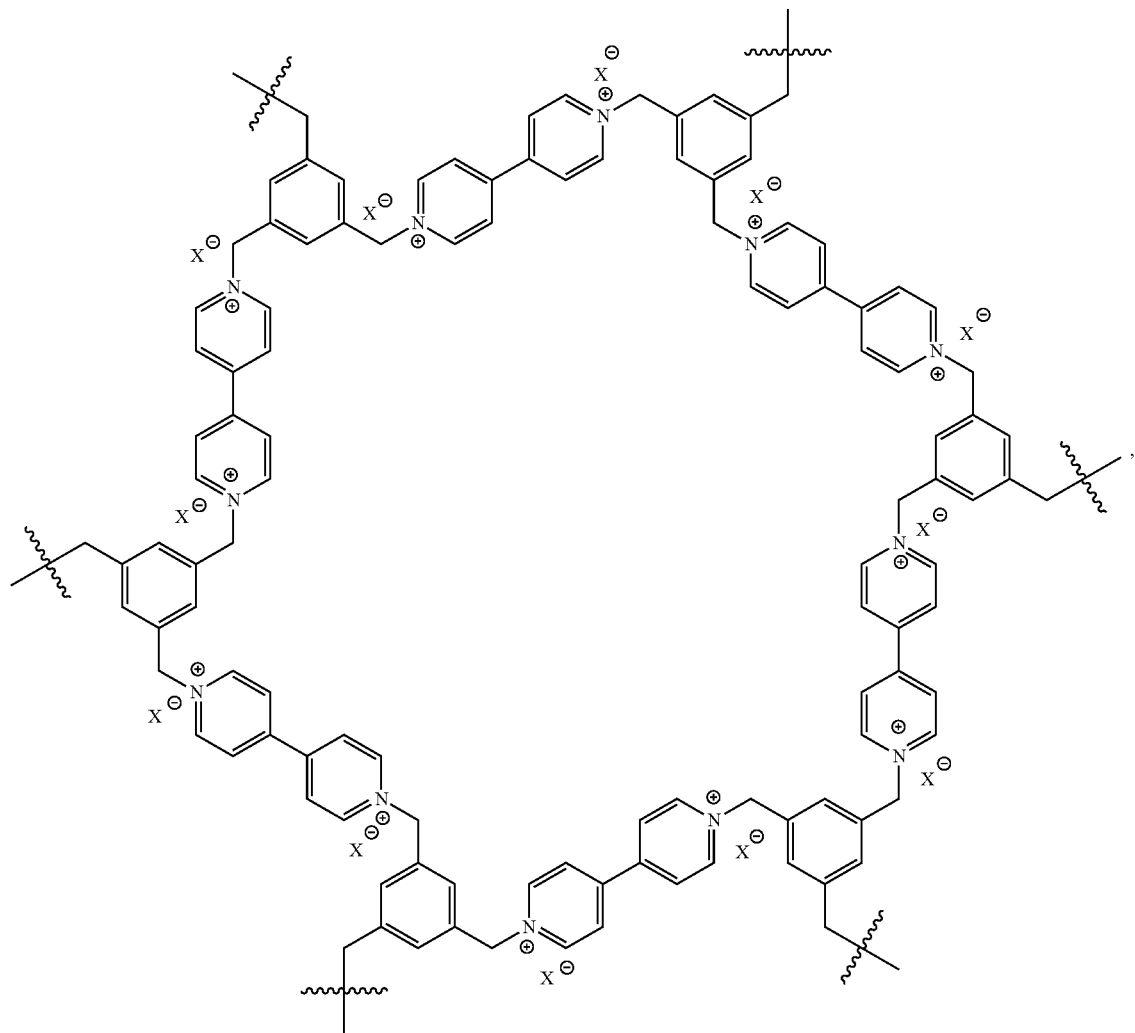
,

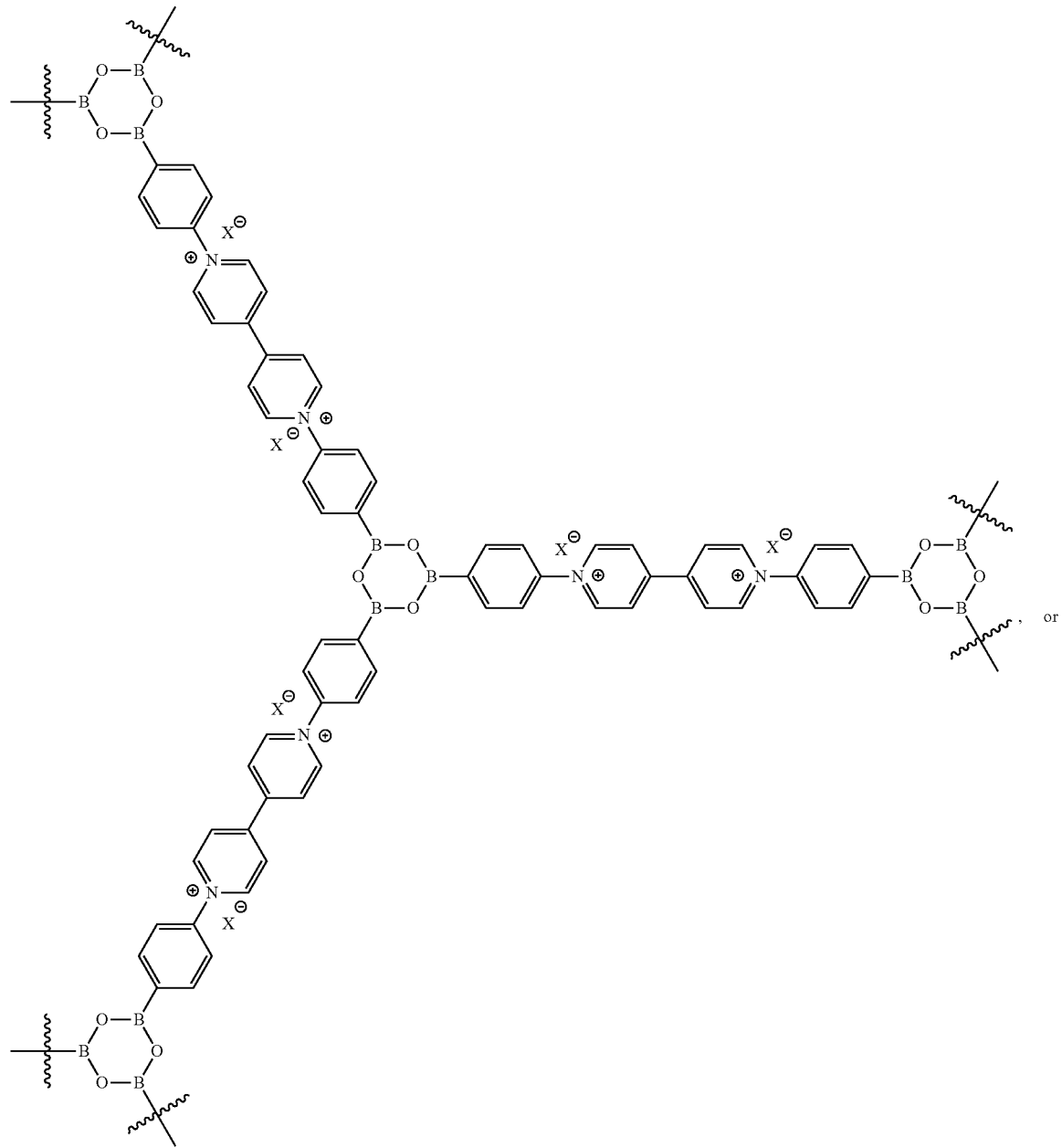
(XI)

(XII)
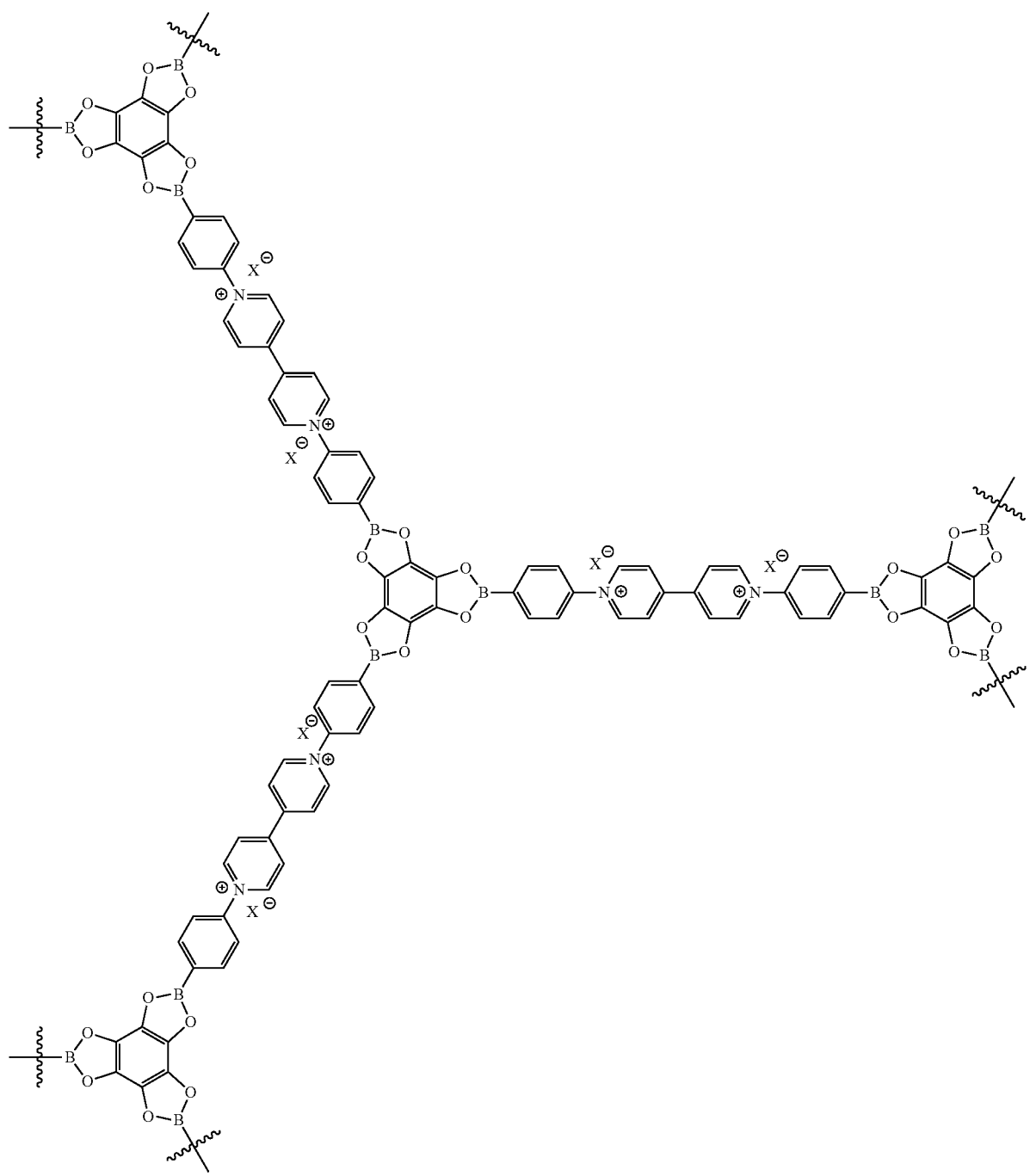
wherein X is an anion, and the anodic covalent organic framework electroactive material is represented by at least one of the following chemical structures (III)-(V):

(III)
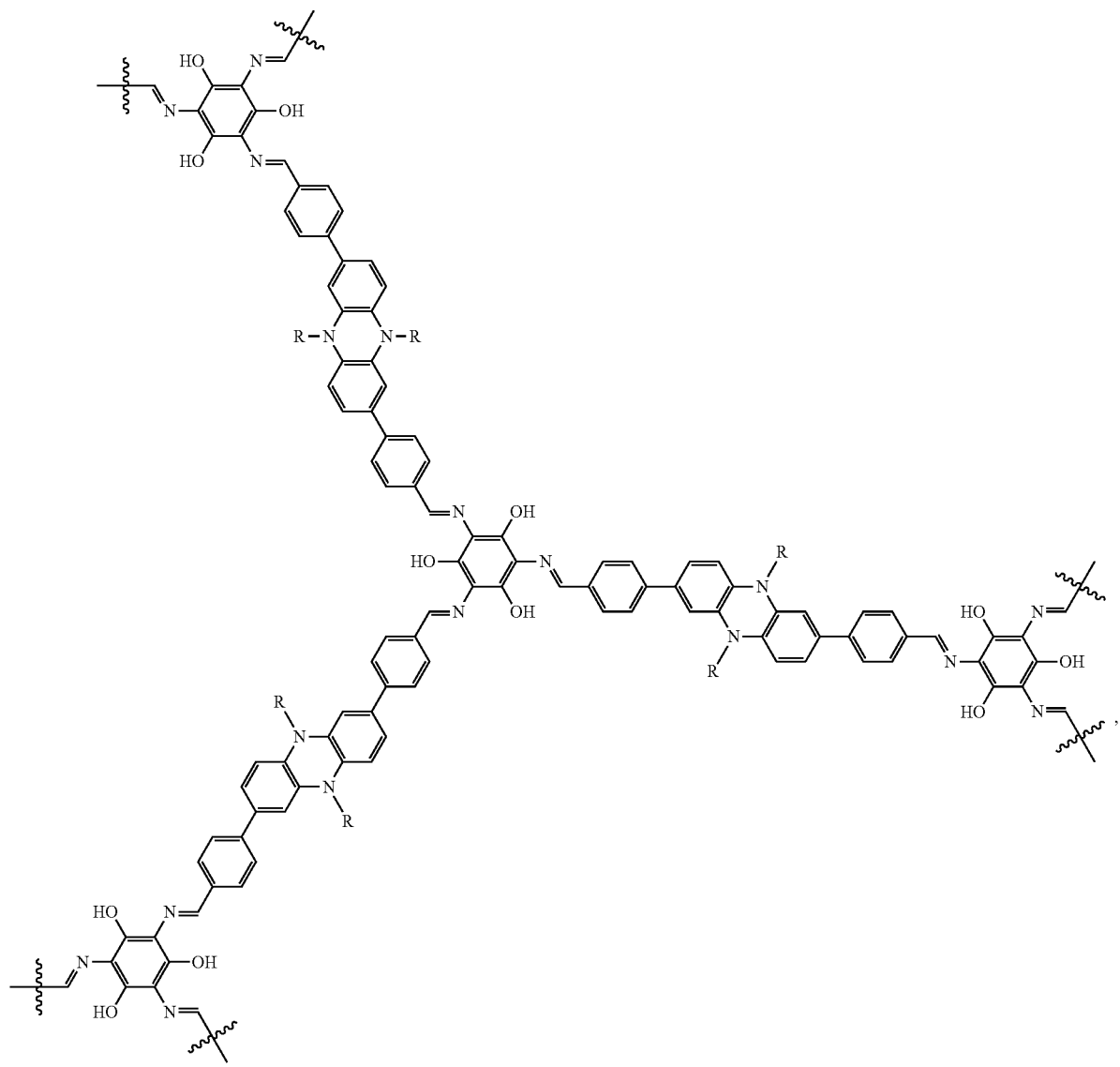

-continued
(IV)
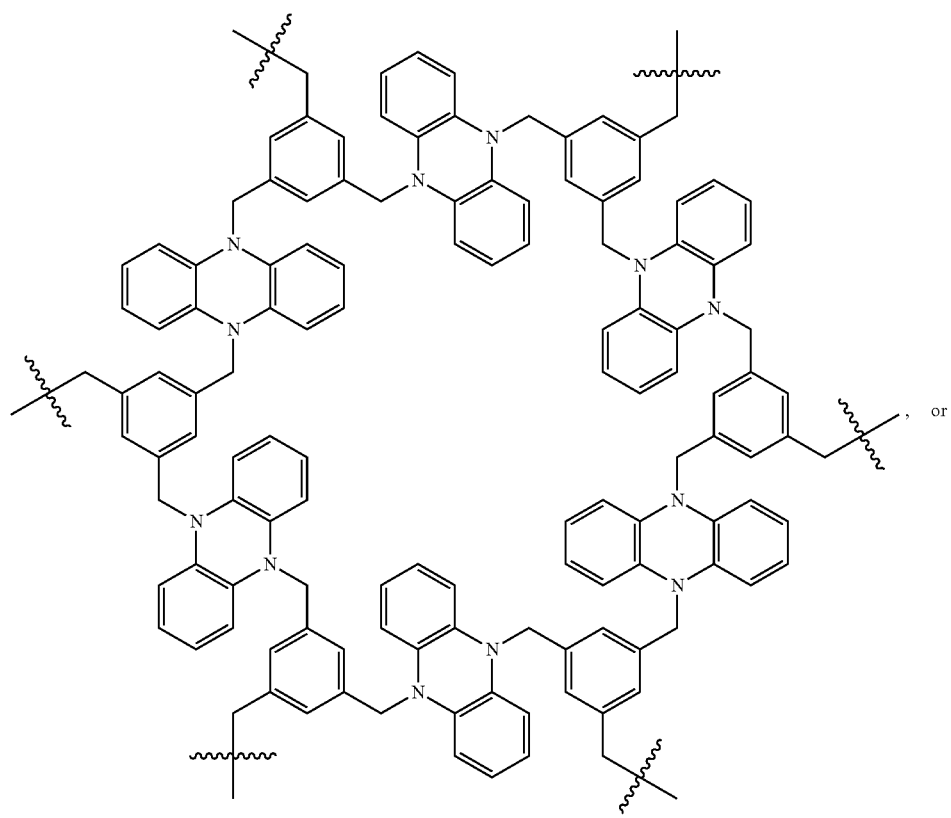
, or (V)

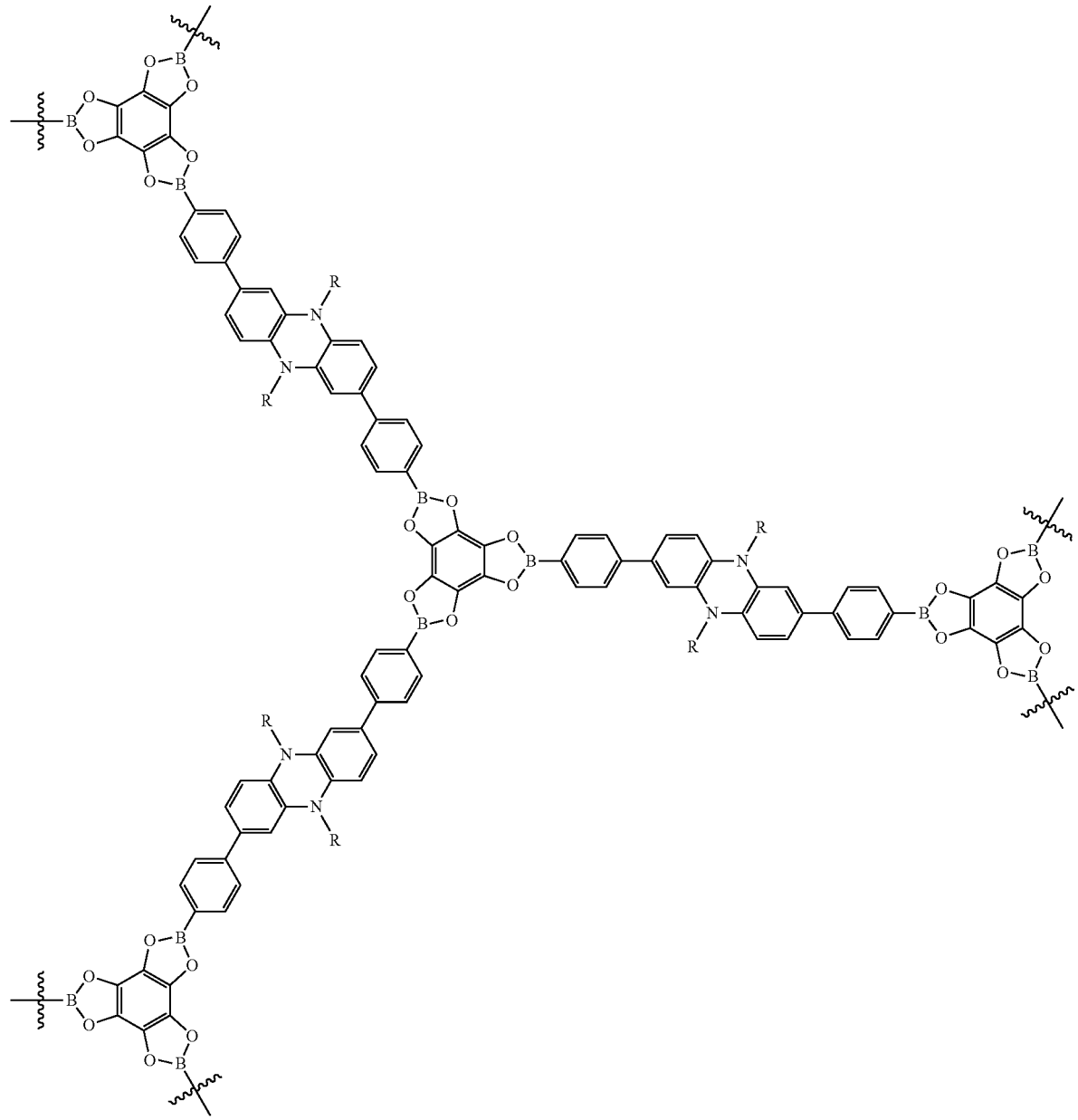

wherein R is alkyl, siloxy alkyl, hydroxyalkyl, alkenyl, aralkyl, or a combination thereof.

According to yet another aspect of the present disclosure, a rearview mirror assembly is disclosed. The rearview mirror assembly includes a housing, a circuit board positioned in or proximate the housing, and an electro-optic element positioned proximate the circuit board. The electro-optic element includes a first substantially transparent substrate defining a first surface and a second surface, a second substrate defining a third surface and a fourth surface, a primary seal disposed between the first and second substrates, the seal and the first and second substrates defining a cavity therebetween, and an electrochromic medium positioned within the cavity. The electrochromic medium includes at least one solvent and/or an electrolyte gel, at least one cathodic material, and at least one anodic material. The cathodic material is a cathodic organic framework electroactive material and/or the anodic material is an anodic organic framework electroactive material. At least one of the anodic and cathodic organic framework electroactive materials is electrochromic. The cathodic organic framework electroactive material is represented by the following structure (VI):

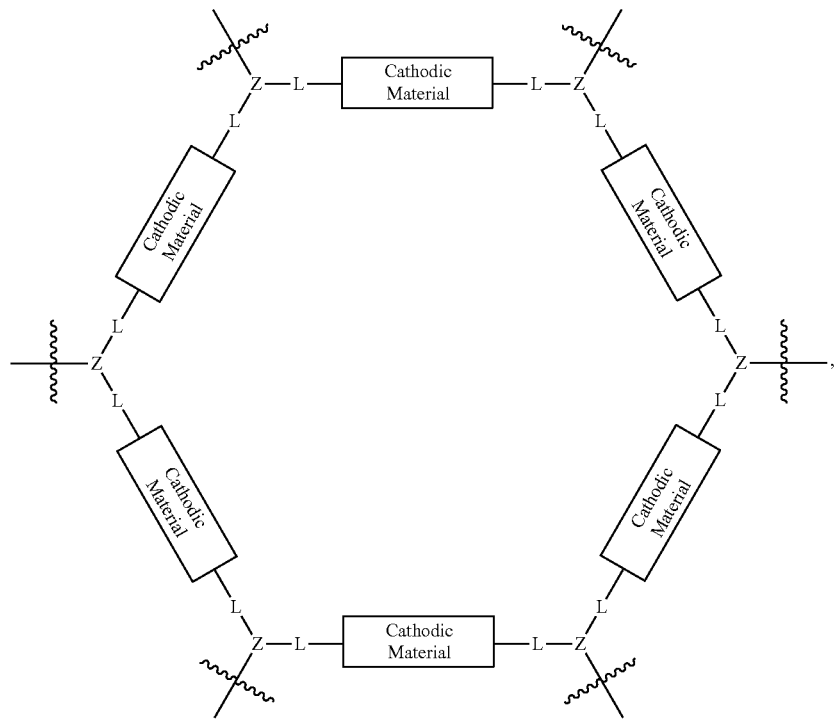
(VI)
and the anodic organic framework electroactive material is represented by the following structure (I):
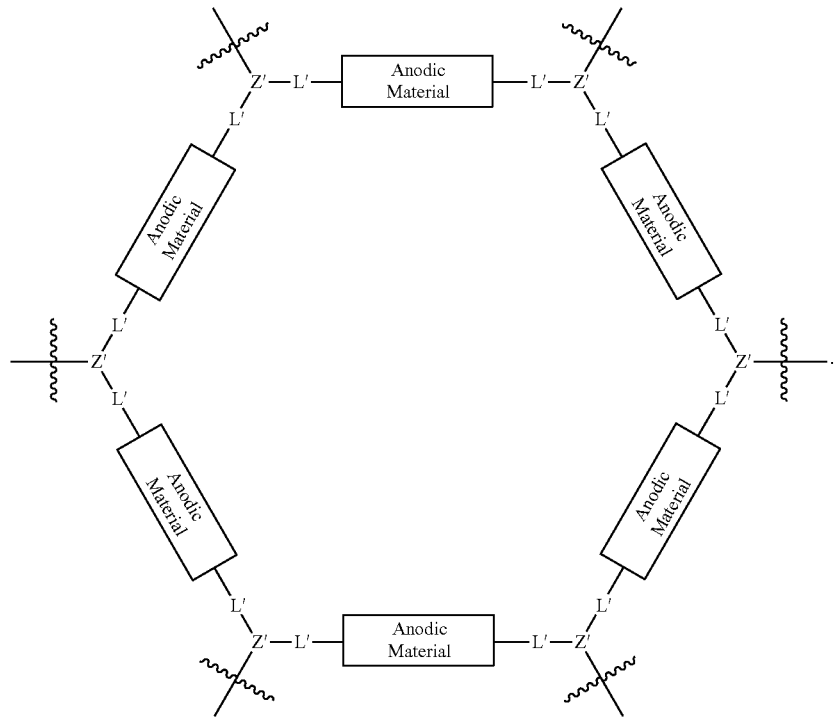
(I)

According to yet another aspect of the present disclosure, a window assembly is disclosed. The window assembly includes a first substantially transparent substrate defining a first surface and a second surface, a second substrate defining a third surface and a fourth surface, a primary seal disposed between the first and second substrates, the seal and the first and second substrates defining a cavity therebetween, and an electrochromic medium positioned within the cavity. The electrochromic medium includes at least one solvent and/or an electrolyte gel, at least one cathodic material, and at least one anodic material. The cathodic material is a cathodic organic framework electroactive material and/or the anodic material is an anodic organic framework electroactive material. At least one of the anodic and cathodic organic framework electroactive materials is electrochromic. The cathodic organic framework electroactive material is represented by the following structure (VI):

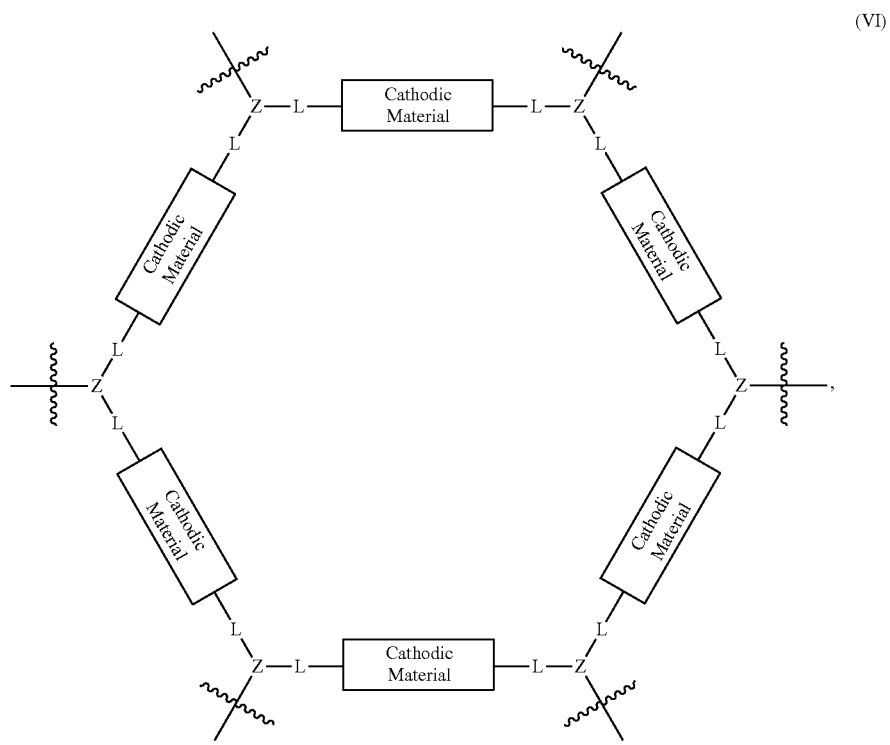

(VI)

and the anodic organic framework electroactive material is represented by the following structure (I):

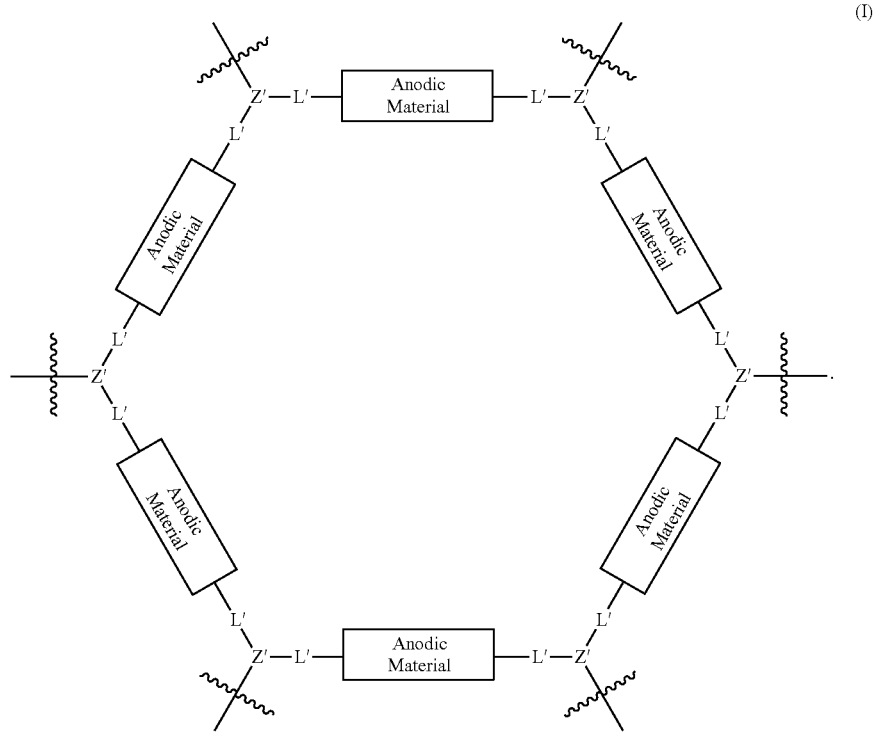

(I)

These and other features, advantages, and objects of the present invention will be further understood and appreciated by those skilled in the art by reference to the following specification, claims, and appended drawings.

BRIEF DESCRIPTION OF THE DRAWINGS

The following is a description of the figures and the accompanying drawings. The figures are not necessarily to scale, and certain features and certain views of the figures may be shown exaggerated in scale or in schematics in the interest of clarity and conciseness.

In the drawings.

DETAILED DESCRIPTION

Figure 1A:
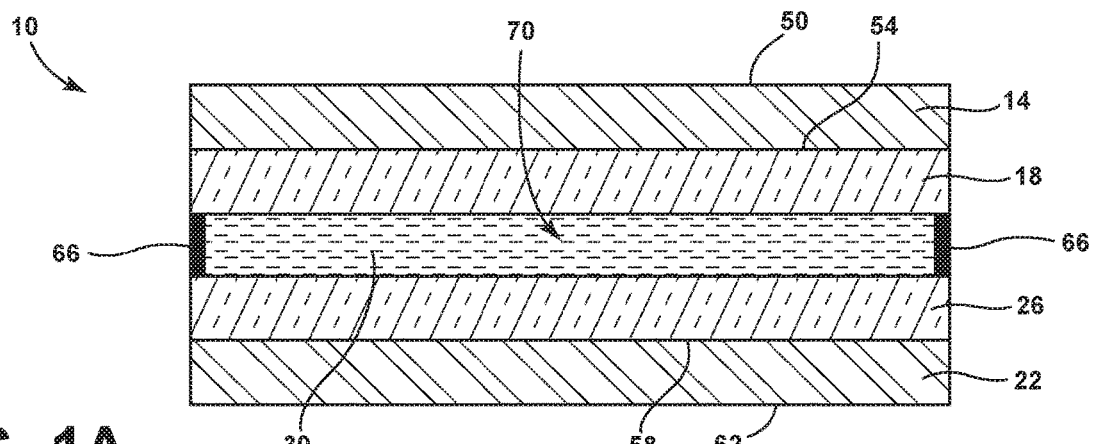
FIG. 1A, 1B or 1C is a cross-sectional view of an electrochromic device, according to at least one example.

The present illustrated embodiments reside primarily in combinations of method steps and apparatus components related to an electro-optic device. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The use of the terms "a" and "an" and "the" and similar referents in the context of describing the elements (especially in the context of the following claims) are to be constructed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Covalent organic frameworks (COFs) are a class of porous polymers in which organic building blocks are precisely integrated into extended structures using covalent bonds with periodic skeletons and ordered pores. The properties of COFs put them in contrast to other types of porous material, such as zeolites, mesoporous silica, metal-organic frameworks (MOFs), and other inorganic porous polymer systems.

Topology diagrams represent the variety of different polygon skeletons of covalent organic frameworks (COFs) that can be synthesized using various rigid building blocks as vertices and edges. Some of the COF polygon shapes that have been developed include hexagonal, tetragonal, rhombic, kagome, and trigonal structures.

COFs are crystalline porous polymers in which the organic units are linked into ordered polygon skeletons. To ensure the growth of ordered lattice structures, the chemical reactions involved in the formation of COFs must have a certain level of reversibility. Reversible reactions provide COF systems with a self-healing ability that can repair structural defects, which is critical for the formation of highly ordered frameworks.

In two dimensional (2D) COFs, the organic units are linked into 2D atomic layers that further stack via π-π interactions to crystallize layer structures, and the frameworks are locked by intralayer covalent bonds and controlled by interlayer non-covalent forces such as van der waal forces. 2D COFs have a well-defined alignment of π building units in their atomic layers and segregated arrays of π columns in their frameworks. The variety of different skeletons that may be synthesized to form the 2D COFs can provide a fundamental approach for designing structures. The sizes, shapes, and chemical environments of the corresponding 1D channels formed by the skeletons can thus be fully controllable. Although the design of the building blocks can alternatively be designed to synthesize 3D COFs, the embodiments herein focus on building blocks and covalent bonds that form 2D COFs where aromaticity and/or a π system can be extended throughout the lattice structure to achieve a new class of functional materials used in electrochromic devices.

COFs can be designed using three general structural levels: 1) pore design; 2) skeleton design; and 3) the complementary design of pores and skeletons. Regarding the first structural level, the pores of COFs have polygonal shapes that can be designed to assume hexagonal, tetragonal, trigonal, rhombic, and kagome structures and can be designed to have a wide range of sizes from small micropores (1.1 nm) to large mesopores (10.0 nm). In some embodiments, the pores on the COFs may have a hexagonal shape and may have a pore size from 5.0 nm to about 25.0 nm, from 7.5 nm to about 15.0 nm, or from 8.5 nm to about 12.5 nm In addition to the pore-based functional approach, the second structural level used to design COFs is to explore different skeleton structures. The skeletons of COFs are unique because they consist of highly ordered π arrays that are topologically aligned in the polygon frameworks. Various organic units with different functionalities, such as luminescent units, π systems, catalytic sites, and redox-active moieties, have been explored over the years to develop a large number of functional materials. The functionalities and the material performance of these materials are highly correlated to the ordered skeletons of the respective structures; thus, these structures are attractive as new materials platform for functional design.

In the last structural level approach, the use and design of pores and skeletons is a powerful technique used to merge structural features to achieve synergistic effects and optimize the desired functionality of the materials. The resultant COF systems have been demonstrated to have a high potential for photo energy conversion, energy conversion, and proton conduction.

Figure 1B:
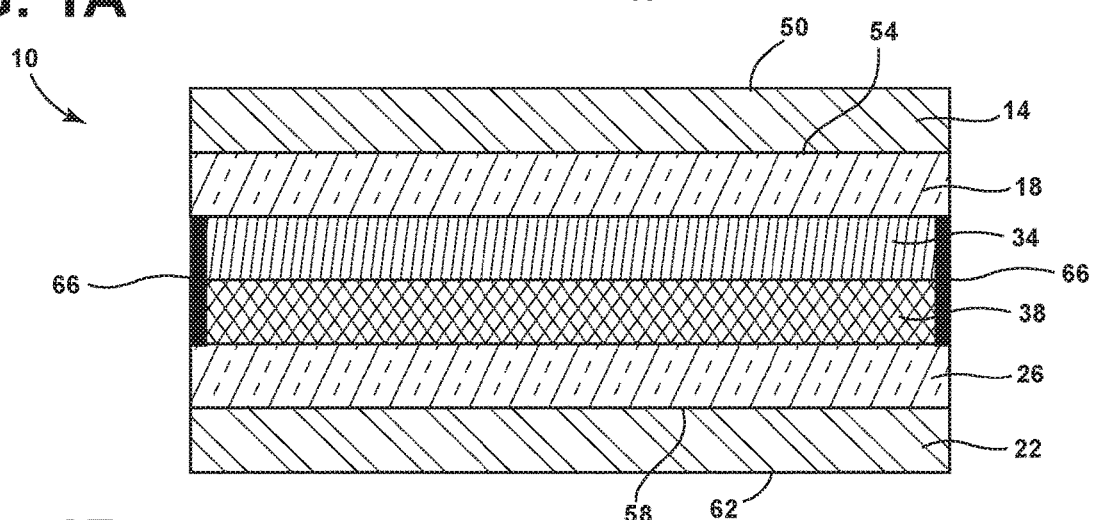
Figure 1C:
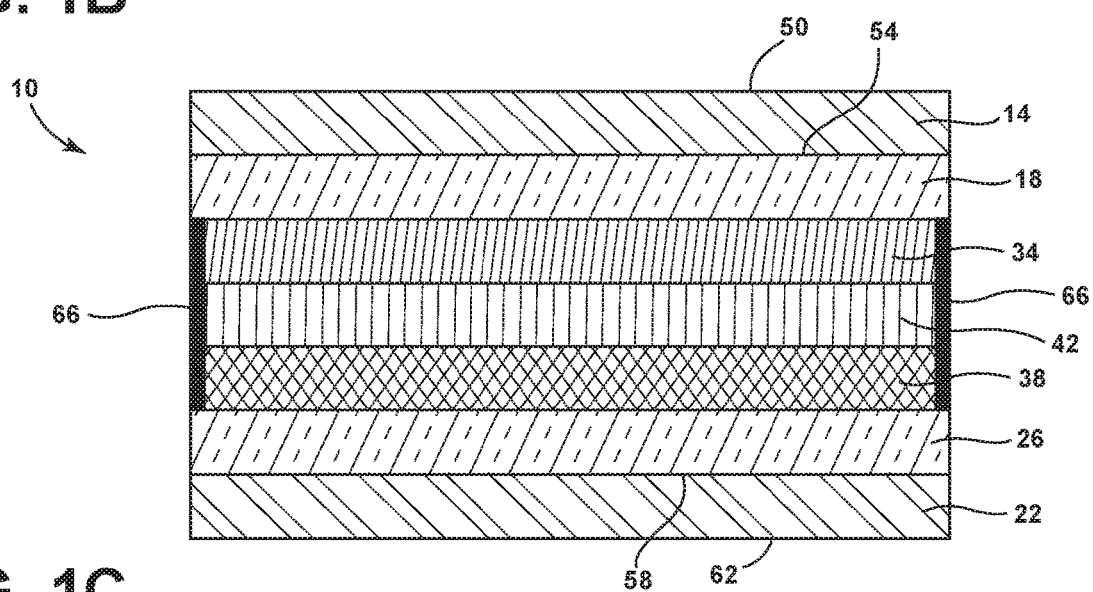

Referring now to FIGS. 1A-C, reference numeral 10 generally designates an electrochromic device. The electrochromic device 10 includes a first substantially transparent substrate 14 coupled to a first electrically conductive material 18, a second substrate 22 coupled to a second electrically conductive material 26, and an electrochromic medium 30. The electrochromic medium 30 includes at least one solvent and/or an electrolyte gel 42, at least one cathodic organic framework electroactive material 34, and/or at least one anodic organic framework electroactive material 38. At least one of the anodic and cathodic organic framework electroactive materials 34, 38 is electrochromic. The cathodic organic framework electroactive material 34 can be represented by the following structure (VI):

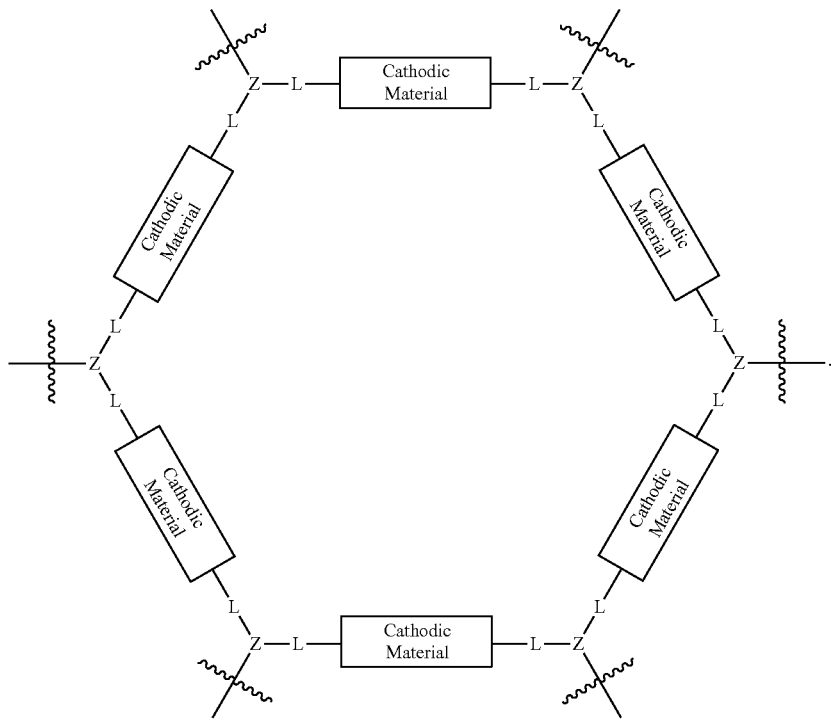
(VI)
The anodic organic framework electroactive material 38 can be represented by the following structure (I):
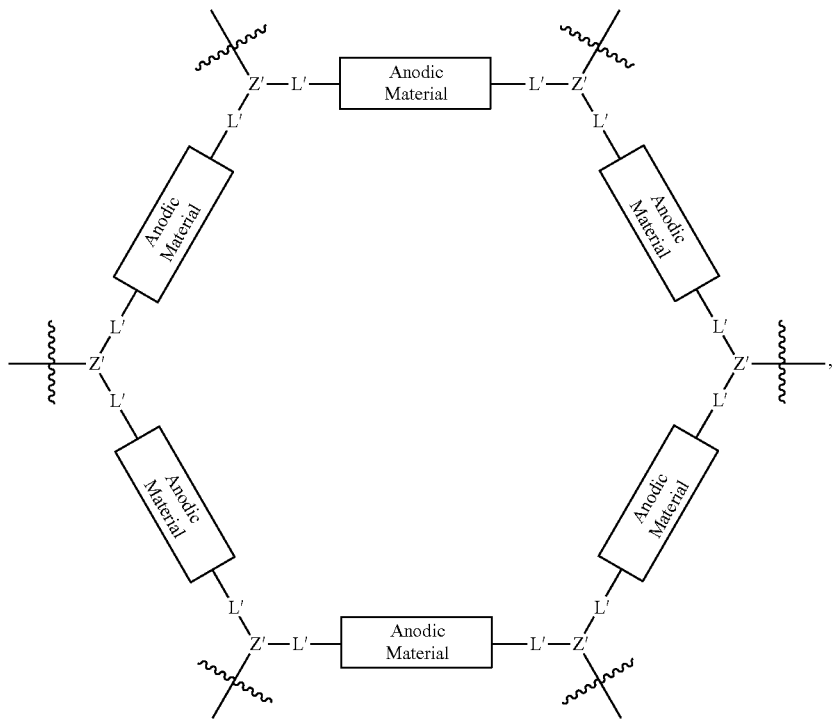
(I)

wherein L and L' may both include an organic connector group and wherein Z and Z' may both include an organic linking group.

The term, "cathodic organic framework electroactive material 34," as used herein, is defined to mutually include a cathodic electroactive material and a cathodic covalent organic framework (COF) electroactive material, or a combination thereof. The term, "anodic organic framework electroactive material 38," as used herein, is defined to mutually include both an anodic electroactive material and an anodic covalent organic framework (COF) electroactive material, or a combination thereof.

Referring now to FIG. 1A, a cross-sectional schematic representation of the electrochromic device 10 is shown. The electrochromic device 10 includes the first substantially transparent substrate 14 having a first surface 50 and a second surface 54. The second substrate 22 includes a third surface 58 and a fourth surface 62. The first and second substrates 14, 22 and a sealing member 66 form a chamber 70 for containing the electrochromic medium 30.

Referring now to FIG. 1B, a cross-sectional schematic representation of the electrochromic device 10 is shown. The electrochromic medium 30 (see FIG. 1A) includes the cathodic organic framework electroactive material 34 and the anodic organic framework electroactive material 38 positioned or sandwiched between the first electrically conductive material 18 and the second electrically conductive material 26 with the sealing member 66. In some embodiments, the cathode material may be the cathodic organic framework electroactive material 34 but in other embodiments the cathode material may be a cathodic material that is not a cathodic organic framework electroactive material. In some embodiments, the anode material may be the anodic organic framework electroactive material 38 but in other embodiments the anode material may be an anodic material that is not an anodic organic framework electroactive material.

Referring now to FIG. 1C, a cross-sectional schematic representation of the electrochromic device 10 is shown. The electrochromic medium 30 (see FIG. 1A) includes the solvent and/or an electrolyte gel 42 sandwiched between the cathodic organic framework electroactive material 34 and the anodic organic framework electroactive material 38 as described above using the first and second electrically conductive materials 18, 26 and the sealing member 66. In some embodiments, the cathode material may be the cathodic organic framework electroactive material 34 but in other embodiments the cathode material may be a cathodic material that is not acathodic organic framework electroactive material. In some embodiments, the anode material may be the anodic organic framework electroactive material 38 but in other embodiments the anode material may be an anodic material that is not an anodic organic framework electroactive material.

In accordance with the present invention, electrochromic device 10 may comprise, for illustrative purposes only, a mirror, a window, a transparency, a display device, a contrast enhancement filter, and the like. It will be further understood that like or analogous elements and/or components, and/or methods referred to herein, may be identified throughout the drawings with like reference characters. It will be further understood that FIG. 1A-C is merely a schematic representation of electrochromic device 10. As such, some of the components have been distorted from their actual scale for pictorial clarity. Indeed, numerous other variable transmission electrochromic device configurations, components and/or control systems are contemplated for use, including those disclosed in U.S. Pat. No. 7,990,603 entitled "Variable Transmission Window System," U.S. Pat. No. 7,085,609 entitled "Variable Transmission Window Constructions," U.S. Pat. No. 6,597,489 entitled "Electrode Design For Electrochromic Devices," U.S. Pat. No. 6,567,708 entitled "System To Interconnect, Link, And Control Variable Transmission Windows And Variable Transmission Window Constructions," U.S. Pat. No. 6,433,914 entitled "Color-Stabilized Electrochromic Devices," U.S. Pat. No. 6,407,847 entitled "Electrochromic Medium Having A Color Stability," U.S. Pat. No. 6,239,898 entitled "Electrochromic Structures," U.S. Pat. No. 6,137,620 entitled "Electrochromic Media With Concentration-Enhanced Stability, Process For The Preparation Thereof And Use In Electrochromic Devices," U.S. Pat. No. 5,940,201 entitled "Electrochromic Mirror With Two Thin Glass Elements And A Gelled Electrochromic Medium," U.S. Pat. No. 5,818,625 entitled "Electrochromic Rearview Mirror Incorporating A Third Surface Metal Reflector," U.S. Pat. No. 5,805,330 entitled "Electro-Optic Window Incorporating A Discrete Photovoltaic Device," and U.S. Pat. No. 7,379,225 entitled "Vehicular Rearview Mirror Elements And Assemblies Incorporating These Elements," all of which are hereby incorporated herein by reference in their entirety including all references incorporated and/or cited therein.

The first substantially transparent substrate 14 may be fabricated from any one of a number of materials that are transparent or substantially transparent in the visible and/or infrared region of the electromagnetic spectrum, such as, for example, borosilicate glass, soda lime glass, natural and synthetic polymeric resins, plastics, and/or composites including polyesters (e.g. PET), polyimides (PI), polycarbonates, glass-clad polycarbonates (GCP) polysulfones, polyamides, polyethylene naphthalate (PEN), ethylene vinyl acetate (EVA), acrylate polymers, as well as Topas®, which is commercially available from Ticona of Summit, N.J. The first substantially transparent substrate 14 is preferably fabricated from a sheet of glass having a thickness ranging from approximately 0.10 millimeters (mm) to approximately 12.7 mm, more preferably from approximately 0.50 mm to approximately 1.50 mm, and yet more preferably from approximately 0.60 mm to approximately 1.00 mm. Of course, the thickness of the substrate will depend largely upon the particular application of the variable transmission electrochromic device. While particular substrate materials have been disclosed, for illustrative purposes only, it will be understood that numerous other substrate materials are likewise contemplated for use—so long as the materials are at least substantially transparent and exhibit appropriate physical properties, such as strength, to be able to operate effectively in conditions of intended use. Indeed, variable transmission electrochromic devices in accordance with the present invention can be, during normal operation, exposed to extreme temperature variation as well as substantial UV radiation, emanating primarily from the sun. It will be further understood that first substantially transparent substrate 14 and/or the second substrate 22 may comprise a UV absorbing layer and/or contain a UV absorbing material to help protect the substrate(s) and/or the electrochromic media from UV damage.

The second substrate 22 may be fabricated from similar materials as that of first substantially transparent substrate 14. In some embodiments, the second substrate 22 may be a second substantially transparent substrate. In other embodiments, the second substrate 22 may be a non-transparent substrate or a semi-transparent substrate. The second substrate 22 may also be fabricated from non-transparent materials like metals, plastics, composites, ceramics, and the like. The second substrate 22 is preferably fabricated from a sheet of glass or plastic having a thickness ranging from approximately 0.10 mm to approximately 12.7 mm, more preferably from approximately 0.50 mm to approximately 1.50 mm, and yet more preferably from approximately 0.60 mm to approximately 1.00 mm. If the first and second substrates 14 and 22, respectively, are fabricated from sheets of glass, then the glass can optionally be tempered, heat strengthened, chemically strengthened, curved and/or laminated prior to or subsequent to being coated with first and second electrically conductive materials 18, 26.

One or more electrode layers of electrically conductive materials 18, 26 are associated with the second and third surfaces 54, 58 of the first and second substrates 14, 22, respectively. These layers serve as an electrode for the electrochromic device. In some embodiments, just the first electrically conductive material 18 may be transparent (e.g., mirror). In other embodiments, both the first and second electrically conductive material 18, 26 may be transparent (e.g., a window). Electrically conductive materials 18, 26 are desirably a material that: (a) can be made as substantially transparent in the visible and/or infrared regions of the electromagnetic spectrum; (b) bonds reasonably well to the first and second substrates 14, 22; (c) maintains this bond when associated with the sealing member 66; (d) is generally resistant to corrosion from materials contained within the variable transmission electrochromic device or the atmosphere; and (e) exhibits minimal diffuse or specular reflectance as well as sufficient electrical conductance. It is contemplated that electrically conductive materials 18, 26 may be fabricated from fluorine doped tin oxide (FTO), for example TEC glass, which is commercially available from Libbey Owens-Ford-Co., of Toledo, Ohio, indium/tin oxide (ITO), doped zinc oxide, indium zinc oxide, metal oxide/Ag/metal oxide (wherein metal oxide comprises metal carbide, metal nitride, metal sulfide, etcetera), or other materials known to those having ordinary skill in the art.

The first electrically conductive material 18 can be coupled with the second surface 54 of the first substantially transparent substrate 14, and may be operatively bonded to the second electrically conductive material 26 with the sealing member 66. As can be seen in FIG. 1A-C, once bonded, sealing member 66 and the juxtaposed portions of the first and second electrically conductive materials 18 and 26 serve to generally define an inner peripheral geometry of chamber 70. Alternatively, edge sealing techniques may be utilized which are disclosed in U.S. Pat. No. 7,372,611 entitled "Vehicular Rearview Mirror Elements And Assemblies Incorporating These Elements," which is hereby incorporated herein by reference in its entirety including all references incorporated and/or cited therein.

In some embodiments of the present disclosure, the cell spacing between inner surfaces of the first and second substrates 14 and 22, which may be coupled to the first and second electrically conductive materials 18 and 26, respectively, can range from approximately 10 microns (μm) to approximately 750 μm, or from approximately 20 μm to approximately 600 μm. However, it will be understood that the thickness of the cell spacing can be manipulated or changed based upon the particular application of the electrochromic device 10.

Sealing member 66 may include any material that is capable of being adhesively bonded to the first and second electrically conductive materials 18 and 26 and, in turn, seal chamber 70 so that electrochromic medium 30 does not inadvertently leak out of the chamber 70 and/or be exposed to the atmosphere. As is shown in FIG. 1, it is also contemplated that the sealing member 66 extend all the way to the second surface 54 and the third surface 58 of their respective substrates. In such an embodiment, the layers of the first and second electrically conductive material 18 and 26 may be partially removed where the sealing member 66 is positioned. If the electrically conductive materials 18 and 26 are not coupled with their respective substrates, then sealing member 66 may bond well to glass. It will be understood that sealing member 66 can be fabricated from any one of a number of materials including, for example, those disclosed in U.S. Pat. No. 4,297,401 entitled "Liquid Crystal Display And Photopolymerizable Sealant Therefor," U.S. Pat. No. 4,418,102 entitled "Liquid Crystal Displays Having Improved Hermetic Seal," U.S. Pat. No. 4,695,490 entitled "Seal For Liquid Crystal Display," U.S. Pat. No. 5,596,023 entitled "Sealing Material For Liquid Crystal Display Panel, And Liquid Crystal Display Panel Using It," U.S. Pat. No. 5,596,024 entitled "Sealing Composition For Liquid Crystal," U.S. Pat. No. 6,157,480 entitled "Seal For Electrochromic Devices," and U.S. Pat. No. 6,714,334 entitled "Electrochromic Device Having A Seal Including An Epoxy Resin Cured With A Cycloaliphatic Amine," all of which are hereby incorporated herein by reference in their entirety including all references incorporated and/or cited therein.

For purposes of the present disclosure, and as will be explained in greater detail herein below, electrochromic medium 30 typically includes at least one solvent (e.g., 1, 2, 3, 4, 5, 10, etc.), at least one anodic material (e.g., 1, 2, 3, 4, 5, 10, etc.), and at least one cathodic material (e.g., 1, 2, 3, 4, 5, 10, etc.). The cathodic material can be the cathodic organic framework electrochromic material 34 and/or the anodic material can be the anodic organic framework electroactive material 38. In some embodiments, the electrochromic device 10 may use the cathodic organic framework electroactive material 34, the anodic organic framework electroactive material 38, or both of the cathodic and anodic organic framework electroactive materials 34, 38.

In some embodiments, the electrolyte gel matrix 38 can be a creep resistant crosslinked electrolyte gel matrix. It will be understood that regardless of its ordinary meaning, the term "creep resistant" will be defined herein as resistance sufficient to materially slow and/or eliminate deformation of the electrochromic medium under the constant forces of the earth's gravitational field and/or any other physical force a device experiences during normal operation, which results in an alteration of the device's cell spacing that is visibly appreciable.

For embodiments of the present disclosure, the solvent 34 of the electrochromic medium 30 may include any one of a number of common, commercially available solvents including 3-methylsulfolane, dimethyl sulfoxide, dimethyl formamide, tetraglyme and other polyethers; alcohols such as ethoxyethanol; nitriles, such as acetonitrile, glutaronitrile, 3-hydroxypropionitrile, and 2-methylglutaronitrile; ketones including 2-acetylbutyrolactone, and cyclopentanone; cyclic esters including beta-propiolactone, gamma-butyrolactone, and gamma-valerolactone; propylene carbonate (PC), ethylene carbonate; and homogenous mixtures of the same. While specific solvents have been disclosed as being associated with the electrochromic medium, numerous other solvents that would be known to those having ordinary skill in the art having the present disclosure before them are likewise contemplated for use.

Typically both of the anodic and cathodic organic framework materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference.

In some embodiments, the electrochromic medium 30 disclosed herein is chosen as a multi-layered material having a multi-layer architecture. In the multi-layer architecture, the electrochromic medium 30 may be made up to include layers of the anodic organic framework and/or cathodic organic framework materials directly coupled to the respective electrically conductive material 18, 26 or confined in close proximity thereto which remains attached or confined when electrochemically oxidized or reduced. The anodic and cathodic layers may also be separated by an electrolyte layer. In accordance with the present invention, one or more layers may contain an electrolyte gel layer.

In some embodiments, the anodic and cathodic organic framework materials 34, 38 of the electrochromic medium 30 may be separated by a membrane material (not shown) to compartmentalize the layers associated with the anode and cathode of the electrochromic device 10.

In addition, the electrochromic medium 30 may comprise other materials, such as light absorbers, light stabilizers, thermal stabilizers, antioxidants, thickeners, viscosity modifiers, tint providing agents, color-stabilizing redox buffers, and mixtures thereof. Suitable redox buffers include, among others, those disclosed in U.S. Pat. No. 6,188,505 entitled "Color-Stabilized Electrochromic Devices," which is hereby incorporated herein by reference in its entirety—including all continuing applications/patents claiming priority therefrom. Suitable UV-stabilizers may include: the material ethyl-2-cyano-3,3-diphenylacrylate, sold by BASF of Parsippany, N.Y., under the trademark Uvinul N-35 and by Aceto Corp., of Flushing, N.Y., under the trademark Viosorb 910; the material (2-ethylhexyl)-2-cyano-3,3-diphenylacrylate, sold by BASF under the trademark Uvinul N-539; the material 2-(2-hydroxy-5-methylphenyl)benzotriazole, sold by Ciba-Geigy Corp. under the trademark Tinuvin P; the material 3-[3-(2H-benzotriazole-2-yl)-5-(1,1-dimethylethyl)-4-hydroxyphenyl]propionic acid pentyl ester prepared from Tinuvin 213, sold by Ciba-Geigy Corp., via conventional hydrolysis followed by conventional esterification (hereinafter "Tinuvin PE"); the material 2,4-dihydroxybenzophenone sold by, among many others, Aldrich Chemical Co.; Tinuvin 384 sold by Ciba-Geigy Corp.; the material 2-hydroxy-4-methoxybenzophenone sold by American Cyanamid under the trademark Cyasorb UV 9; and the material 2-ethyl-2'-ethoxy-oxanilide sold by Sandoz Color & Chemicals under the trademark Sanduvor VSU—to name a few.

In some embodiments, anodic materials may include any one of a number of materials including ferrocene, substituted ferrocenes, substituted ferrocenyl salts, phenazine, dihydrophenazine, substituted phenazines, phenothiazine, substituted phenothiazines including substituted dithiazines, thianthrene, and substituted thianthrenes. Examples of anodic materials may include di-tert-butyl-diethylferrocene, 5,10-dimethyl-5,10-dihydrophenazine (DMP), 3,7,10-trimethylphenothiazine, 2,3,7,8-tetramethoxy-thianthrene, 10-methylphenothiazine, tetramethylphenazine (TMP)—see U.S. Pat. No. 6,242,602 B1 for synthesis, which is hereby incorporated herein by reference in its entirety, and bis(butyltriethylammonium)-para-methoxytriphenodithiazine (TPDT)—see synthesis of 3,10-dimethoxy-7,14-(triethyl-ammoniumbutyl)-triphenodithazinebis(tetrafluoroborate) in U.S. Pat. No. 6,710,906 B2, which is hereby incorporated herein by reference in its entirety. It is also contemplated that the anodic material may incorporate a polymer film, such as polyaniline, polythiophenes, polymeric metallocenes, or a solid transition metal oxide, including, but not limited to, oxides of vanadium, nickel, iridium, as well as numerous heterocyclic compounds, etcetera. It will be understood that numerous other anodic materials are contemplated for use in these anodic materials including those disclosed in U.S. Pat. No. 4,902,108 entitled "Single-Compartment, Self-Erasing, Solution-Phase Electrochromic Devices, Solutions For Use Therein, And Uses Thereof," as well as U.S. Pat. No. 6,188,505 entitled "Color-Stabilized Electrochromic Devices," U.S. Pat. No. 6,710,906 B2 entitled "Controlled Diffusion Coefficient Electrochromic Materials For Use In Electrochromic Mediums And Associated Electrochromic Devices," and U.S. Pat. No. 7,428,091 B2 entitled "Electrochromic Compounds And Associated Media And Devices," all of which are hereby incorporated herein by reference in their entirety including all references incorporated and/or cited therein.

The anodic organic framework electroactive materials 38 are synthesized from a monomer anodic organic compound having an anodic material coupled to a connector group (L) with a structure represented by, for example, the following structural unit:

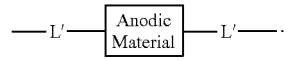

The anodic material may include dihydrophenazine or any of the other anodic materials listed herein. The L group represents the connector group or moiety that may covalently couple the anodic material to the rest of the extended 2D covalent organic framework. In some embodiments, the L moiety and the anodic material form an extended n-conjugated molecule. In some embodiments, the L moieties may be covalently coupled to a linker molecule, group, or moiety Z' or the L groups may react with other L groups to form the extended 2D covalent organic framework (COF) as shown in the following structure (I):

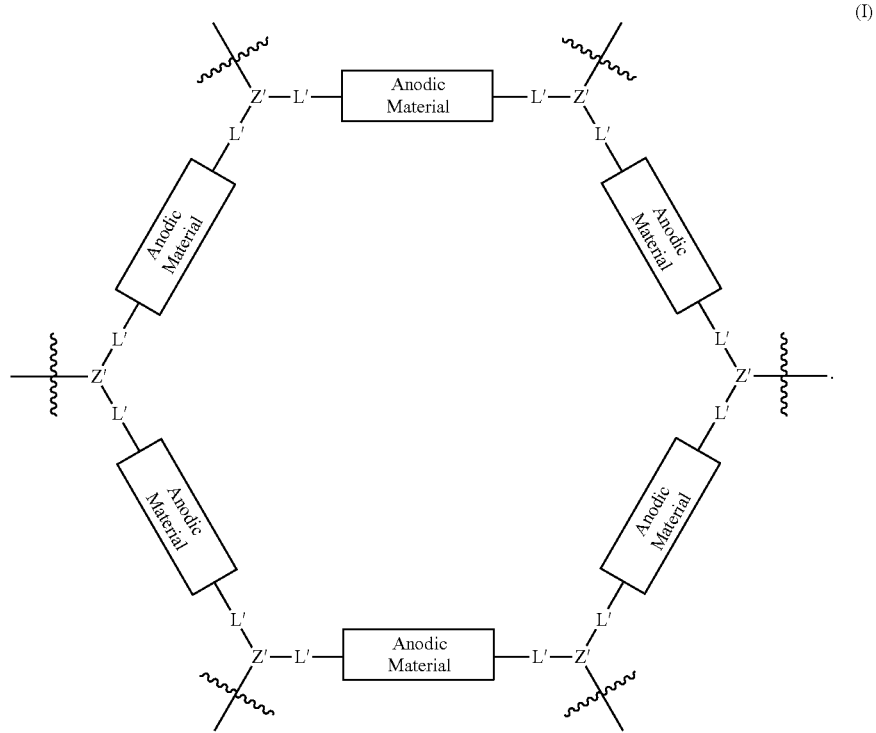

(I)

In some embodiments, the linker moiety or group Z' may include 2,4,6-triaminobenzene-1,3,5-triol, benzene-1,2,3,4,5,6-hexaol, benzene-1,2,3,4,5,6-hexamine, or a combination thereof to form the anodic 2D COF. In some embodiments, the connector moiety or group L' may include a phenyl, aryl, aryloxy, or any other aromatic group appreciated by one skilled in the art.

In some embodiments, the anodic organic framework electroactive material 38 is represented by at least one of the following structures (II)-(V):

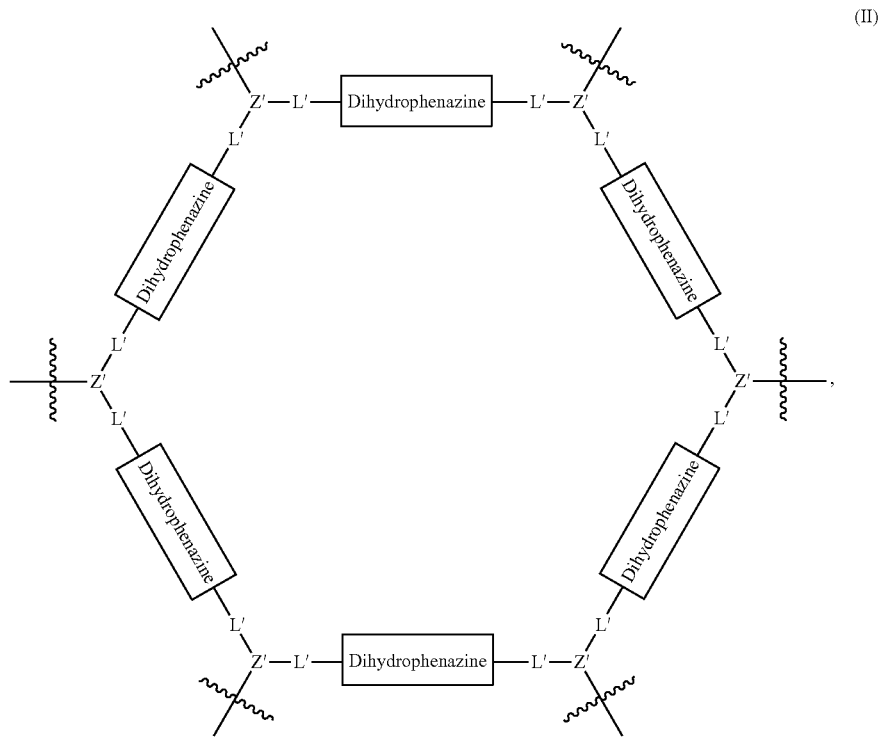

(II)

(III)
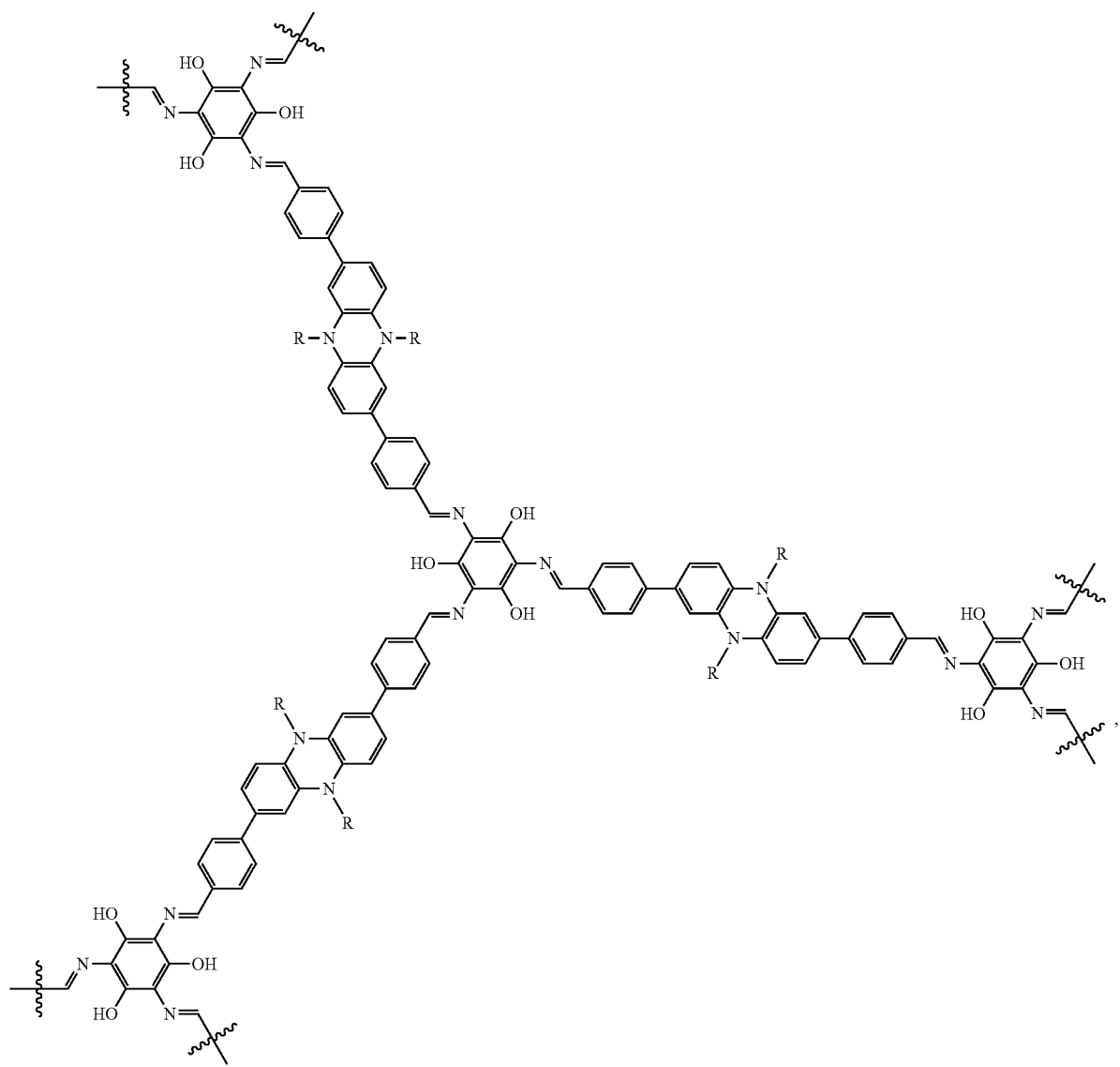

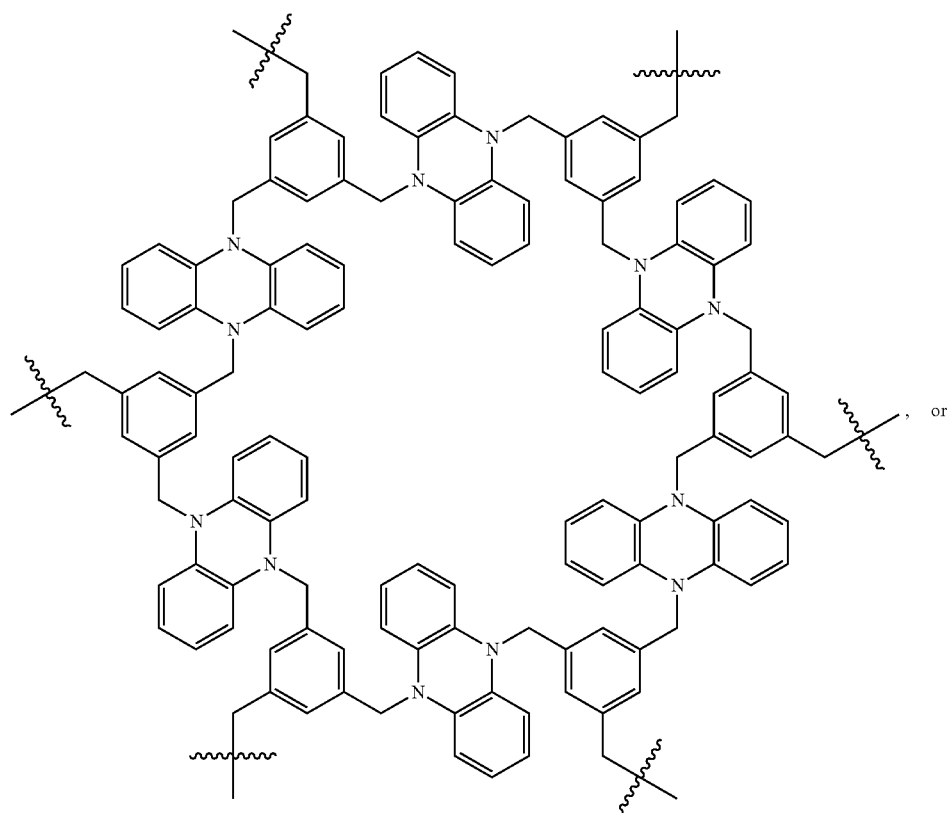
(IV)
, or

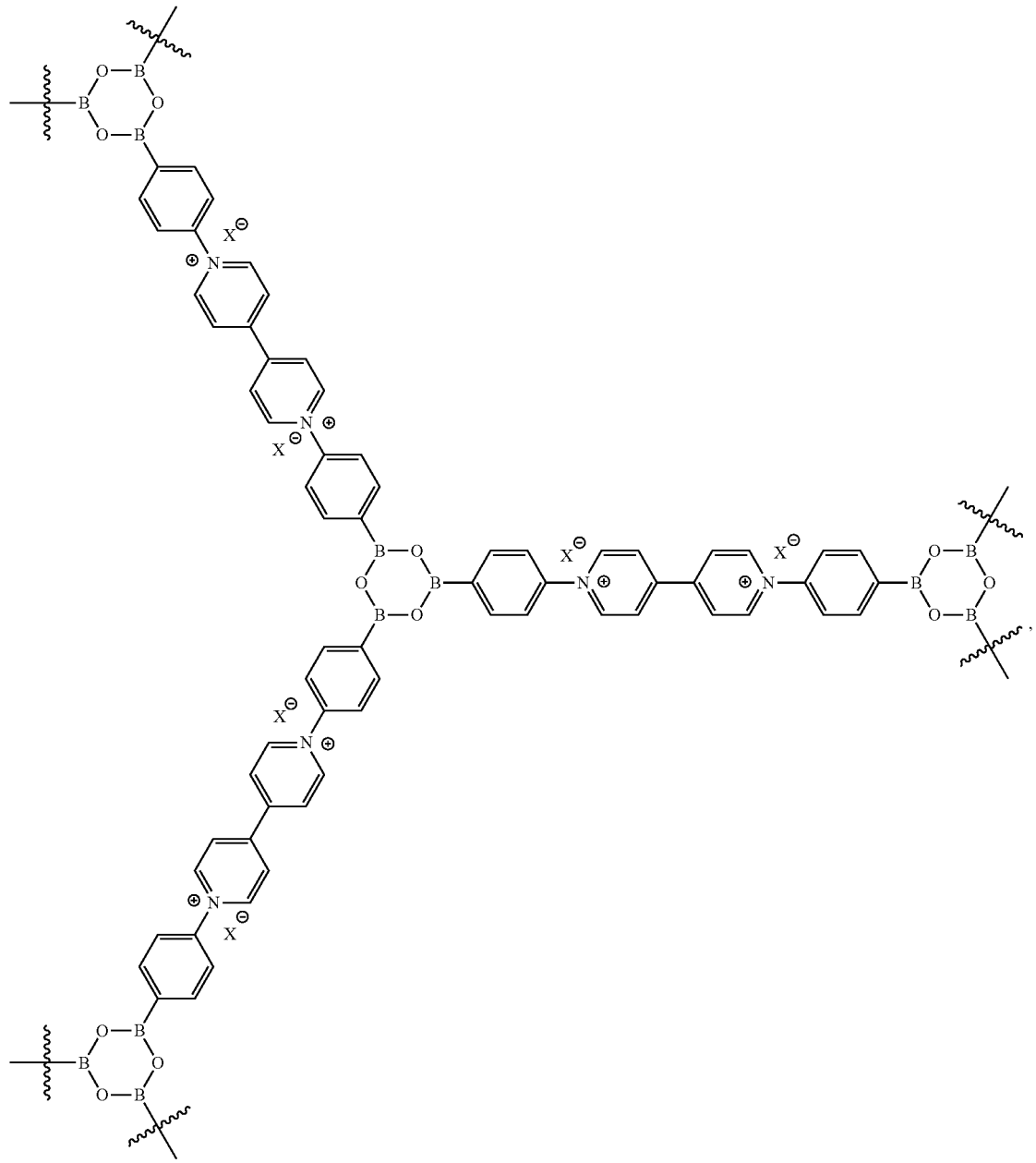

(V)

wherein R is an alkyl, siloxy alkyl, hydroxyalkyl, alkenyl, aralkyl, or a combination thereof. In some embodiments, R is a methyl, ethyl, propyl, isopropyl, and/or additional $C_3$-$C_{10}$ linear or branched alkyl group. In some embodiments, R is a methyl group. In some aspects, R is a phenyl, aryl, substituted aryl, and/or substituted aromatic group. The (III) structure includes a dihydrophenazine anodic structure, material, or moiety having a phenyl connector moiety L' and a 2,4,6-triaminobenzene-1,3,5-triol linker moiety Z' forming 2, 4, 6 imine groups in an extended hexagonal 2D COF (Only a branch point illustrated). The (IV) structure includes a dihydrophenazine anodic structure having a 1,3,5-methylene L' phenyl linker moiety Z' forming an extended hexagonal 2D COF. The (V) structure includes a dihydrophenazine anodic structure having a phenyl connector moiety L' and boronate ester 5-membered rings positioned on a phenyl linker moiety Z' forming an extended hexagonal 2D COF (Only a branch point illustrated). In some embodiments, the anodic organic framework electroactive materials 38 may include one or more of these listed structures where any combination of anodic structure known in the art may be used in combination with the various L' and Z' moieties known or provided herein.

In some embodiments, the cathodic materials may include, for example, viologens, such as methyl viologen tetrafluoroborate, octyl viologen tetrafluoroborate (octylviologen), or benzyl viologen tetrafluoroborate, ferrocinium salts, such as (6-(tri-tert-butylferrocinium)hexyl)triethylammonium di-tetrafluoroborate—see U.S. Pat. No. 7,046,418 entitled "Reversible Electrodeposition Devices and Associated Electrochemical Media" for synthesis which is hereby incorporated herein by reference in its entirety. It will be understood that the preparation and/or commercial availability for each of the above-identified cathodic materials is well known in the art. See, for example, "The Bipyridinium Herbicides" by L. A. Summers (Academic Press 1980). While specific cathodic materials have been provided for illustrative purposes only, numerous other conventional cathodic materials are likewise contemplated for use including, but by no means limited to, those disclosed in previously referenced U.S. Pat. Nos. 4,902,108, 6,188,505, 6,710,906 B2, as well as U.S. Pat. No. 7,855,821 B2 entitled "Electrochromic Compounds And Associated Media And Devices," all of which are hereby incorporated herein by reference in their entirety including all references incorporated and/or cited therein. Moreover, it is contemplated that the cathodic material may comprise a polymer film, such as various substituted polythiophenes, an inorganic film, or a solid transition metal oxide, including, but not limited to, tungsten oxide.

The cathodic organic framework electroactive materials 34 are synthesized from a monomer cathodic organic compound having a cathodic material coupled to a connector group (L) with a structure represented by, for example, the following structural unit:

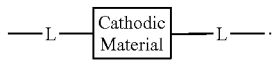

The cathodic material may include viologens or any of the other cathodic materials listed herein. The L group represents the connector group or moiety that may covalently couple the cathodic material to the rest of the extended 2D covalent organic framework. In some embodiments, the L moiety and the cathodic material form an extended n-conjugated molecule. In some embodiments, the L moieties may be covalently coupled to a linker molecule, group, or moiety Z or the L groups may react with other L groups to form the extended 2D covalent organic framework (COF) as shown in the following structure (VI):

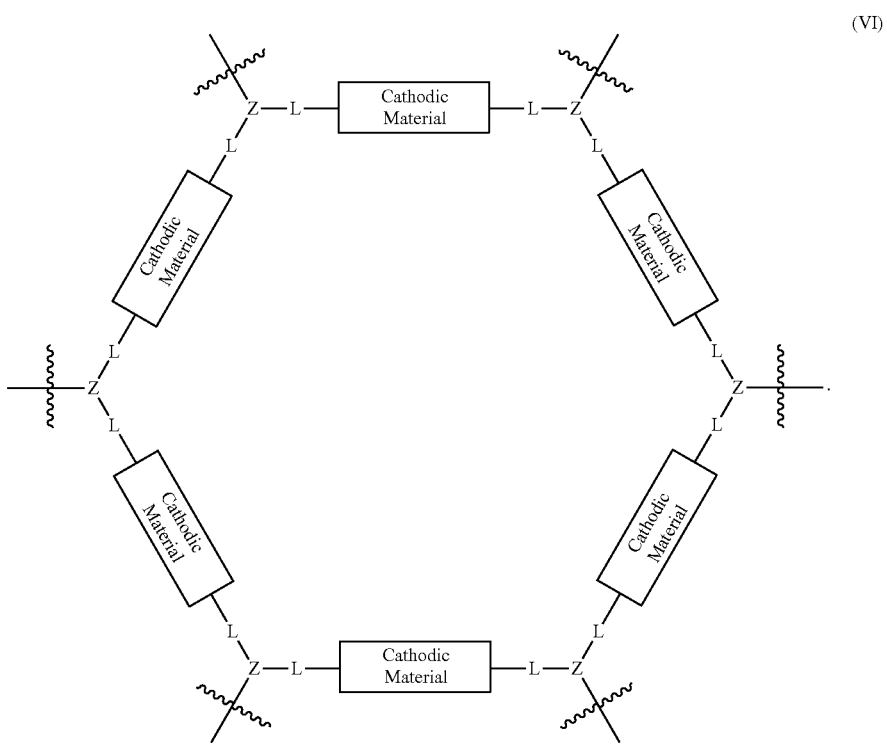

In some embodiments, the linker moiety or group Z may include 2,4,6-triaminobenzene-1,3,5-triol, benzene-1,2,3,4,5,6-hexaol, benzene-1,2,3,4,5,6-hexamine, or a combination thereof to form the anodic 2D COF. In some embodiments, the connector moiety or group L may include a phenyl, aryl, aryloxy, or any other aromatic group appreciated by one skilled in the art. In some embodiments, the connector moiety or group L is a phenyl group.

In some embodiments, the cathodic covalent organic framework electroactive material is represented by at least one of the following structures (VII)-(XII):

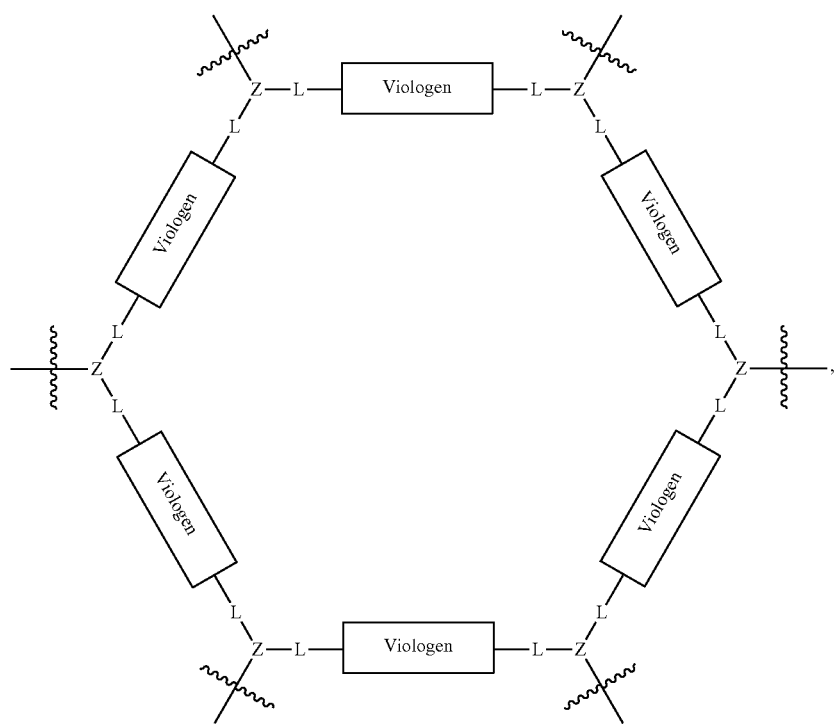
(VII)

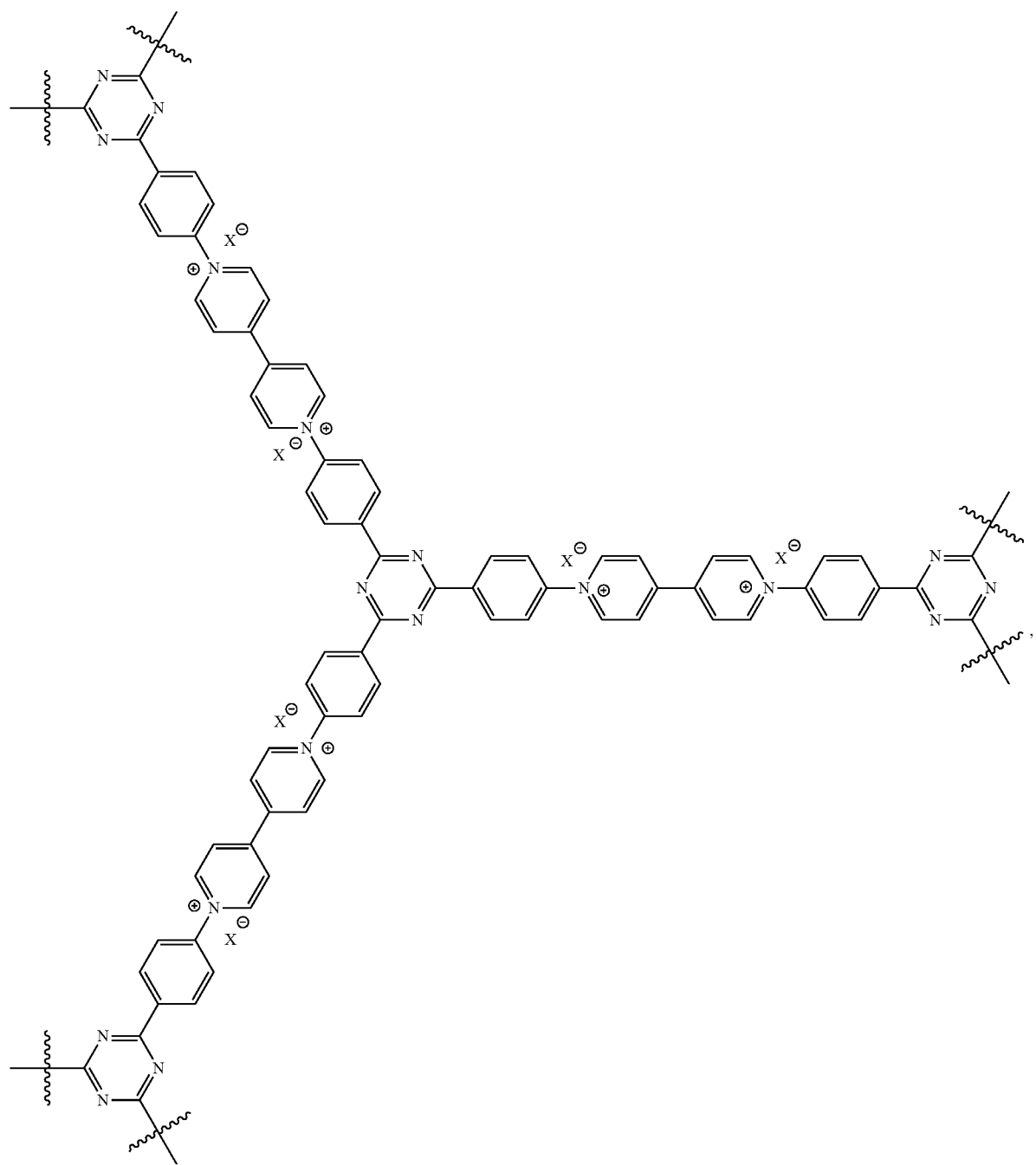
(VIII)

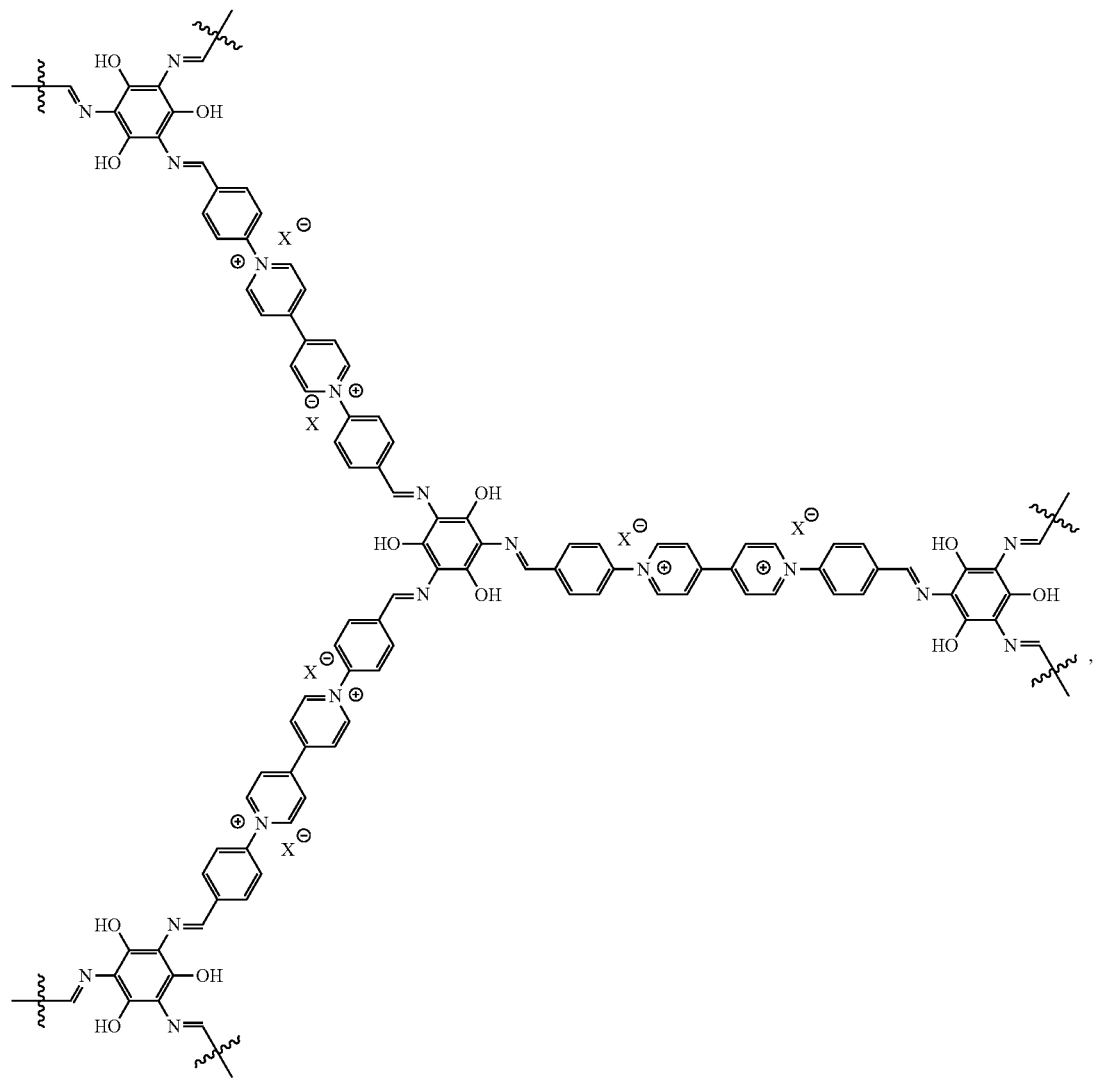
(IX)

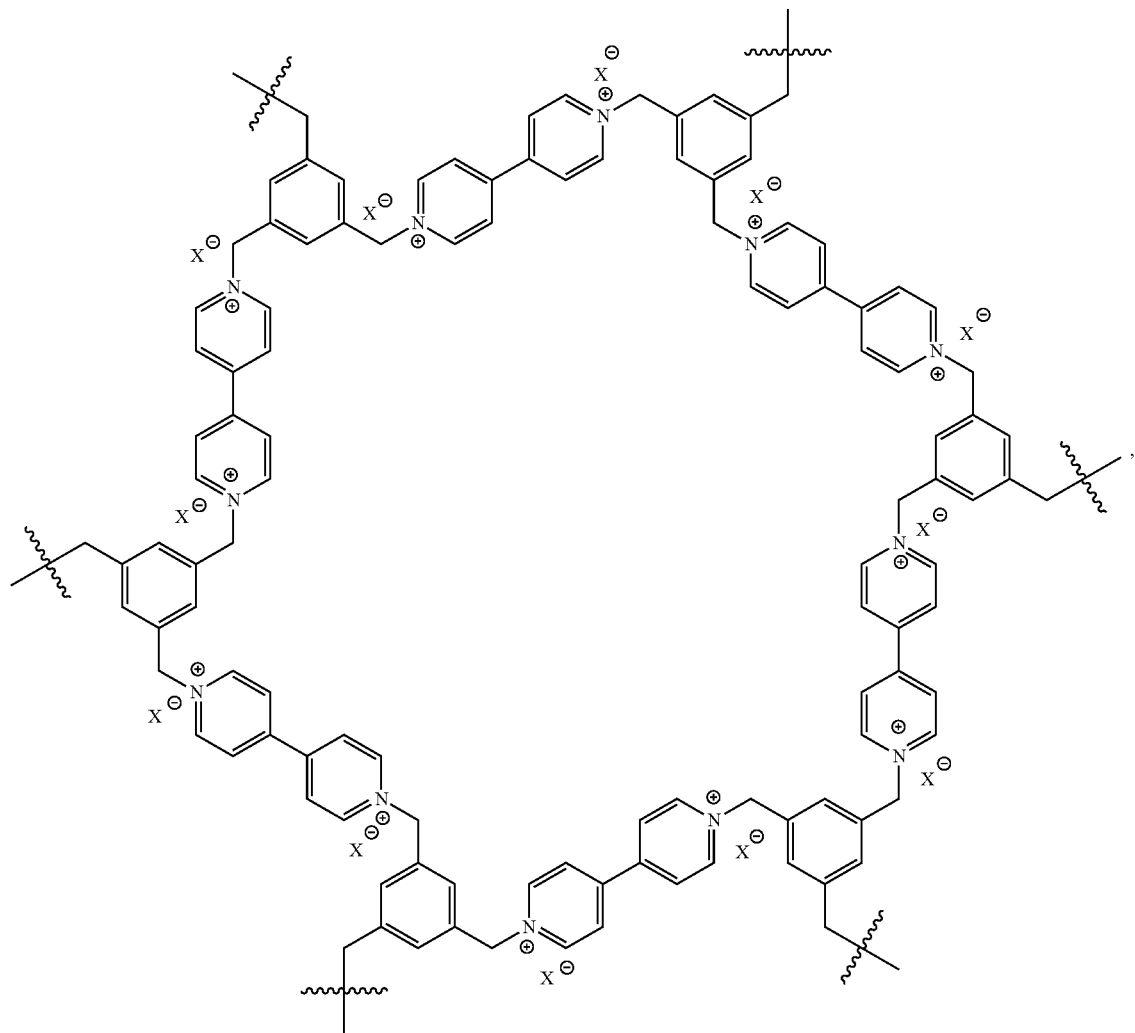
(X)

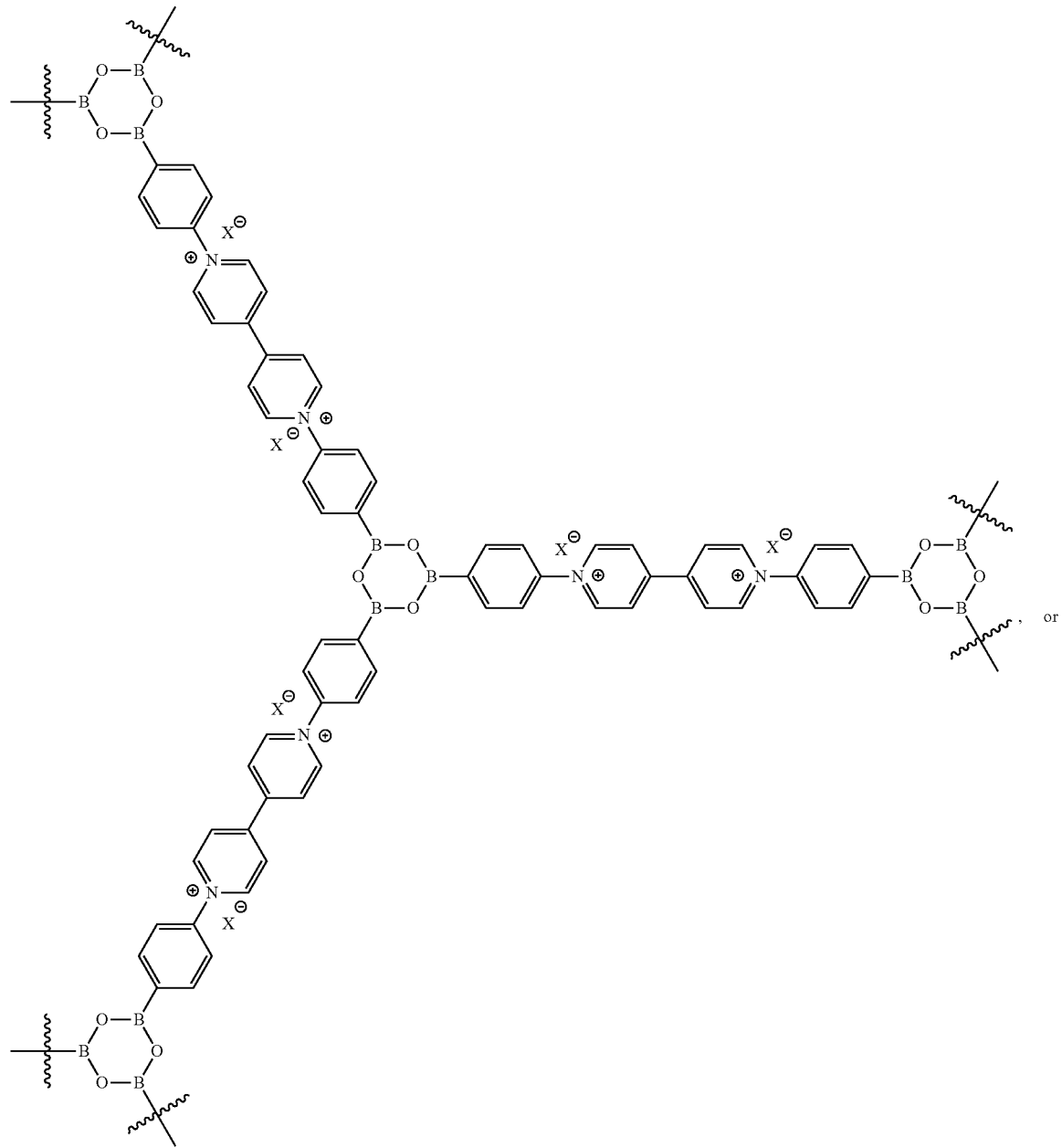
(XI)

(XII)

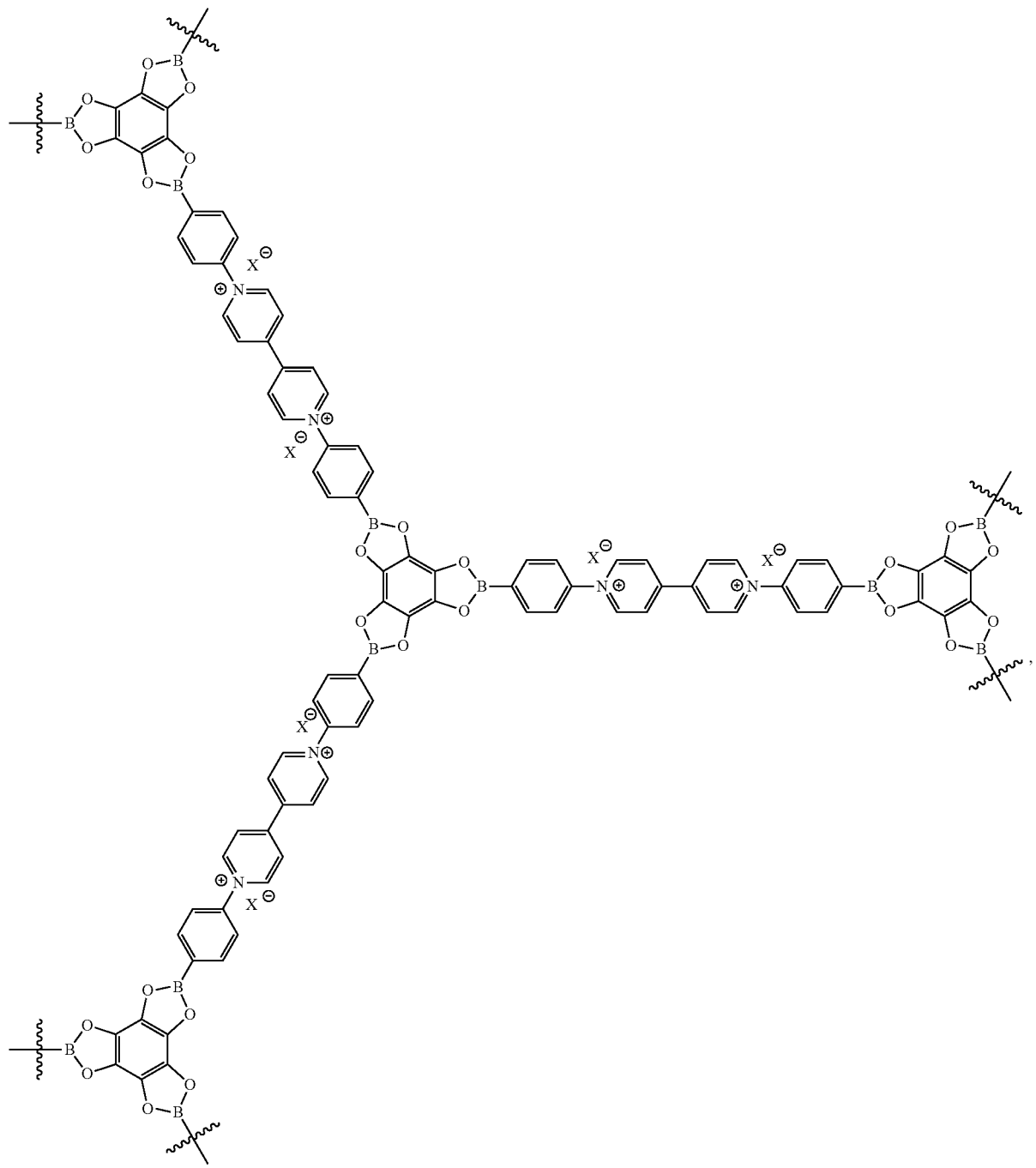

The (VIII) structure includes a viologen cathodic material, structure, moiety having a phenyl connector moiety L and a cyano trimer linker moiety Z forming an extended hexagonal 2D COF (Only a branch point illustrated). The (IX) structure includes a viologen cathodic material having a phenyl connector moiety L and a 2,4,6-triaminobenzene-1,3,5-triol linker moiety Z forming 2, 4, 6 imine groups in an extended hexagonal 2D COF (Only a branch point illustrated). The (X) structure includes a viologen cathodic material having a 1,3,5-methylene L phenyl linker moiety Z forming an extended hexagonal 2D COF. The (XI) structure includes a viologen cathodic material having a phenyl connector moiety L and boroxine 6-membered ring linker moiety Z forming an extended hexagonal 2D COF (Only a branch point illustrated). The (XII) structure includes a viologen cathodic material having a phenyl connector moiety L and boronate ester 5-membered rings positioned on a phenyl linker moiety Z forming an extended hexagonal 2D COF (Only a branch point illustrated). In some embodiments, the cathodic organic framework electroactive materials 34 may include one or more of these listed structures where any combination of cathodic structure known in the art may be used in combination with the various L and Z moieties provided or known.

"TFSI" as used herein refers to bis(trifluoromethanesulfonyl) imide, as illustrated by the molecule below:

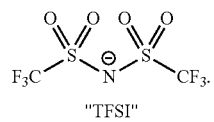

"TFSI"

In some embodiments, X is an anion. In other embodiments, X may be $F^-$, $Cl^-$, $Br^-$, $I^-$, $BF_4^-$, $PF_6^-$, $SbF_6^-$, $AsF_6^-$, $ClO_4^-$, $SO_3^-CF_3^-$, $N(CN)_2^-$, $C(CF_3SO_2)_3^-$, $N(SO_2C_2F_5)_2^-$, $^-Al(OC(CF_3)_3)_4$, TFSI, or $^-BAr_4$, wherein Ar is a aryl or fluorinated aryl group. In some embodiments, $X^-$ is $^{-BAr}4$ and Ar is a pentafluorophenyl group. In other embodiments, $X^-$ is a tetrafluoroborate or a bis(trifluoromethylsulfonyl) imide anion. When $X^-$ is shown as a counterion for any of the compounds disclosed herein, multiple X's may be used as a mixture of two or more different anions as listed above. In still other embodiments, $X^-$ is $BF_4^-$, $PF_6^-$, TFSI, or a combination thereof.

Figure 2:
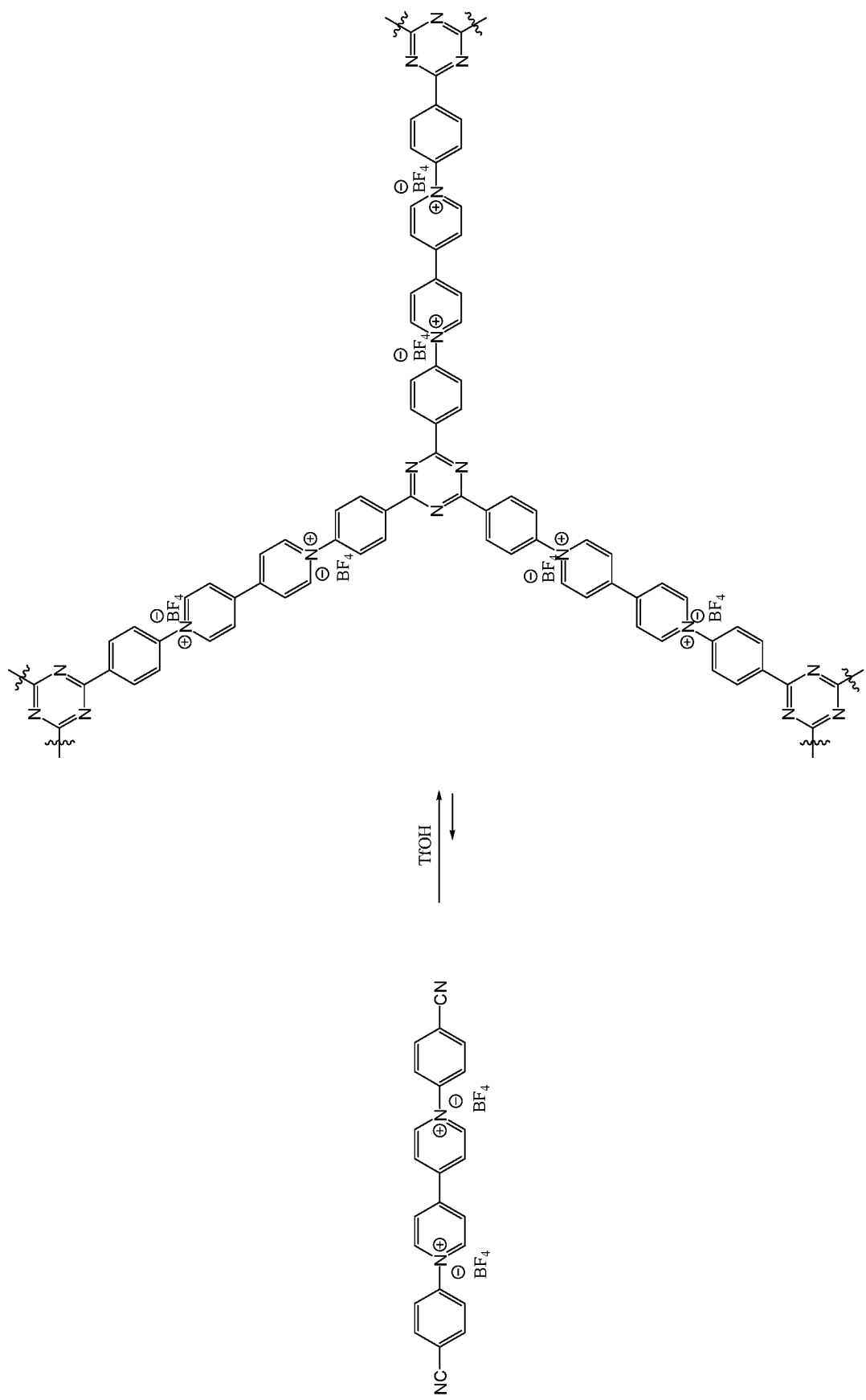
FIG. 2 is a synthetic scheme for the cyano-trimerization to incorporate a viologen into a 2D covalent organic framework.
Figure 3:
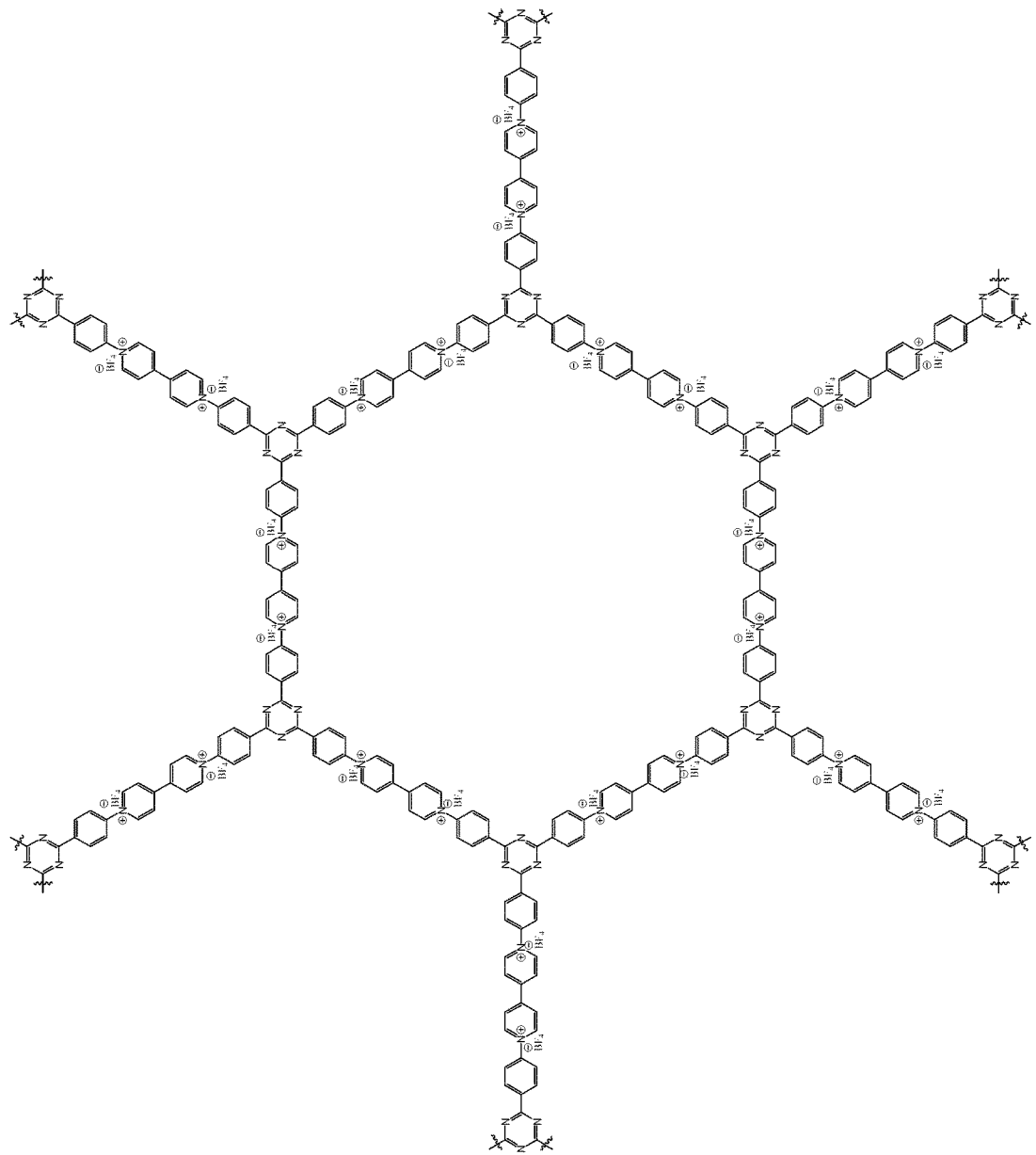
FIG. 3 is an expanded view of the 2D covalent organic framework represented in FIG. 2.
Figure 7:
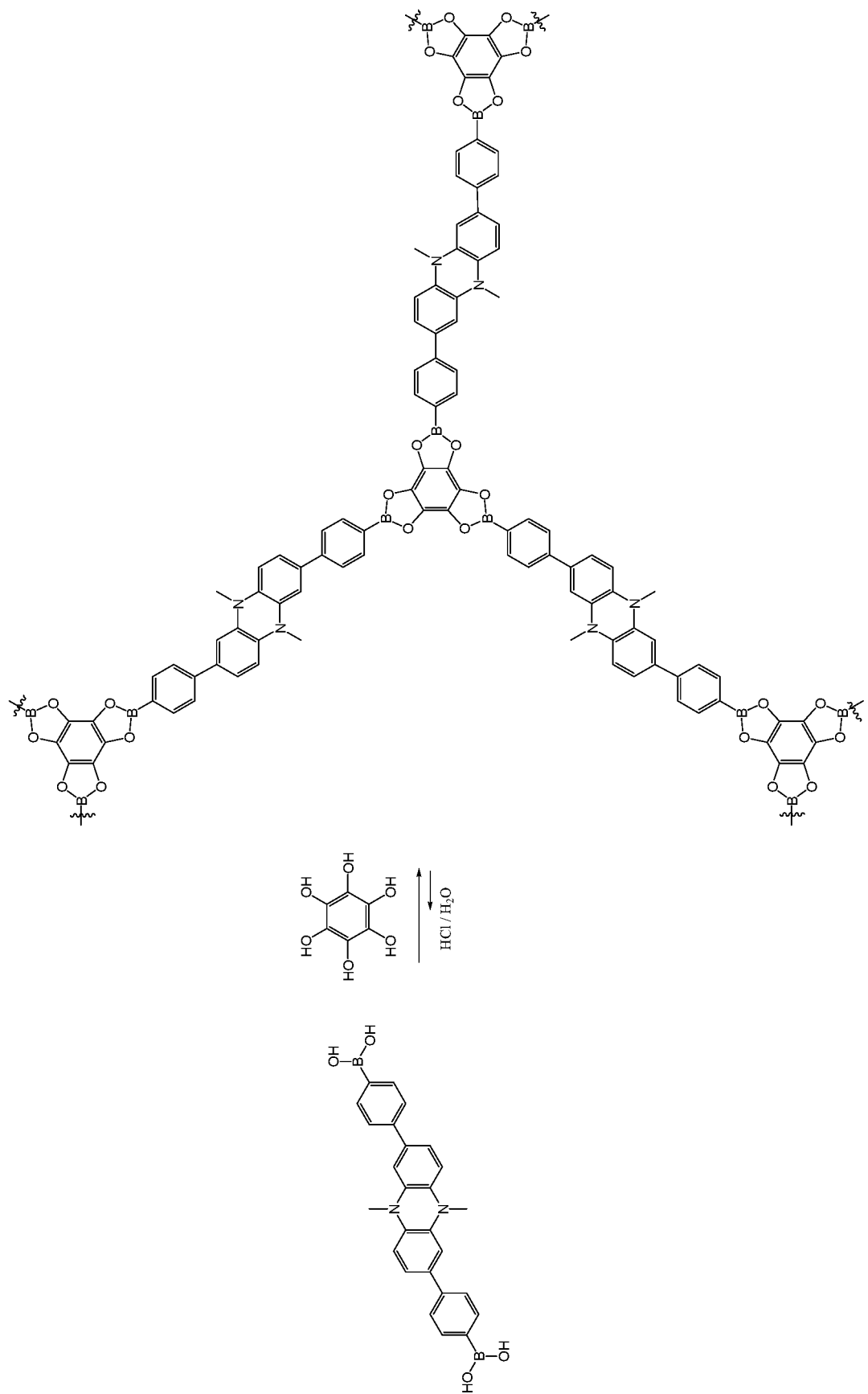
FIG. 7 shows the synthetic schematic using a boronate ester 5-membered rings to incorporate a dihydrophenazine into the 2D covalent organic framework.
Figure 8:
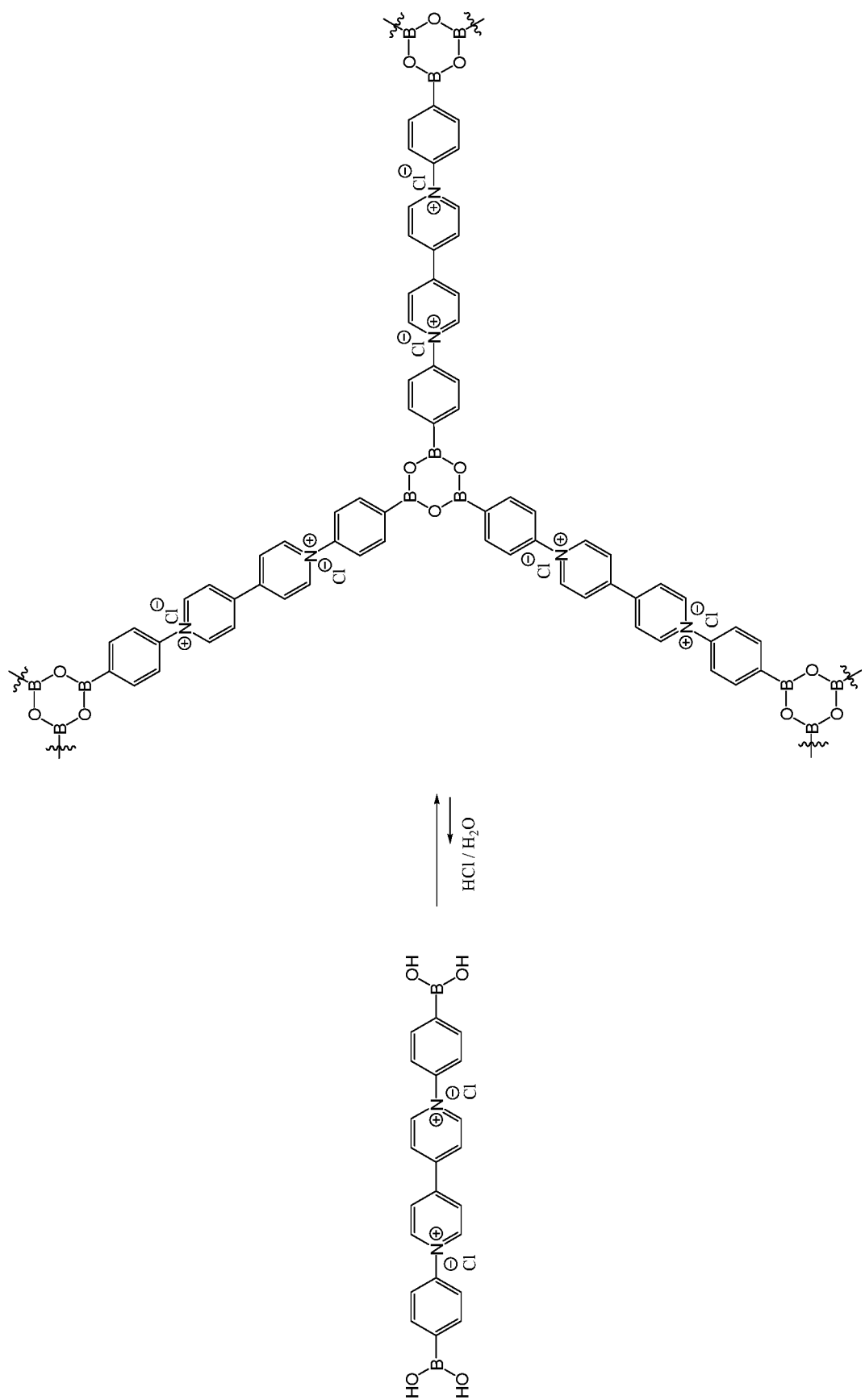
FIG. 8 shows the synthetic schematic using a boroxine 6-membered ring to incorporate a viologen into the 2D covalent organic framework.
Figure 9:
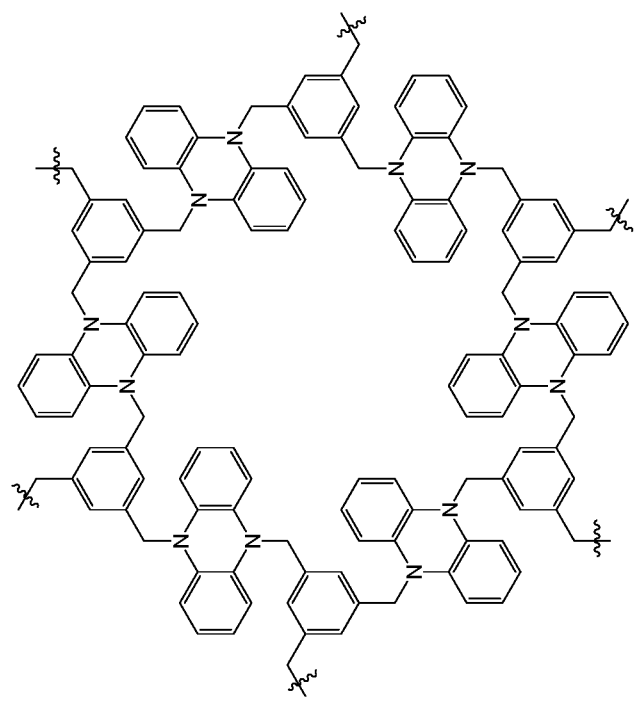
FIG. 9 shows the synthetic schematic for using a substituted benzyl group to incorporate a dihydrophenazine into the 2D covalent organic framework.
Figure 9:
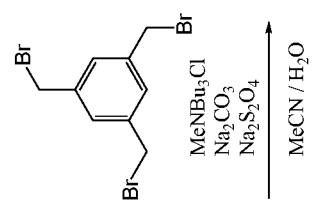
Figure 9:
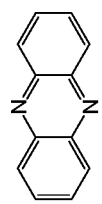
Figure 10:
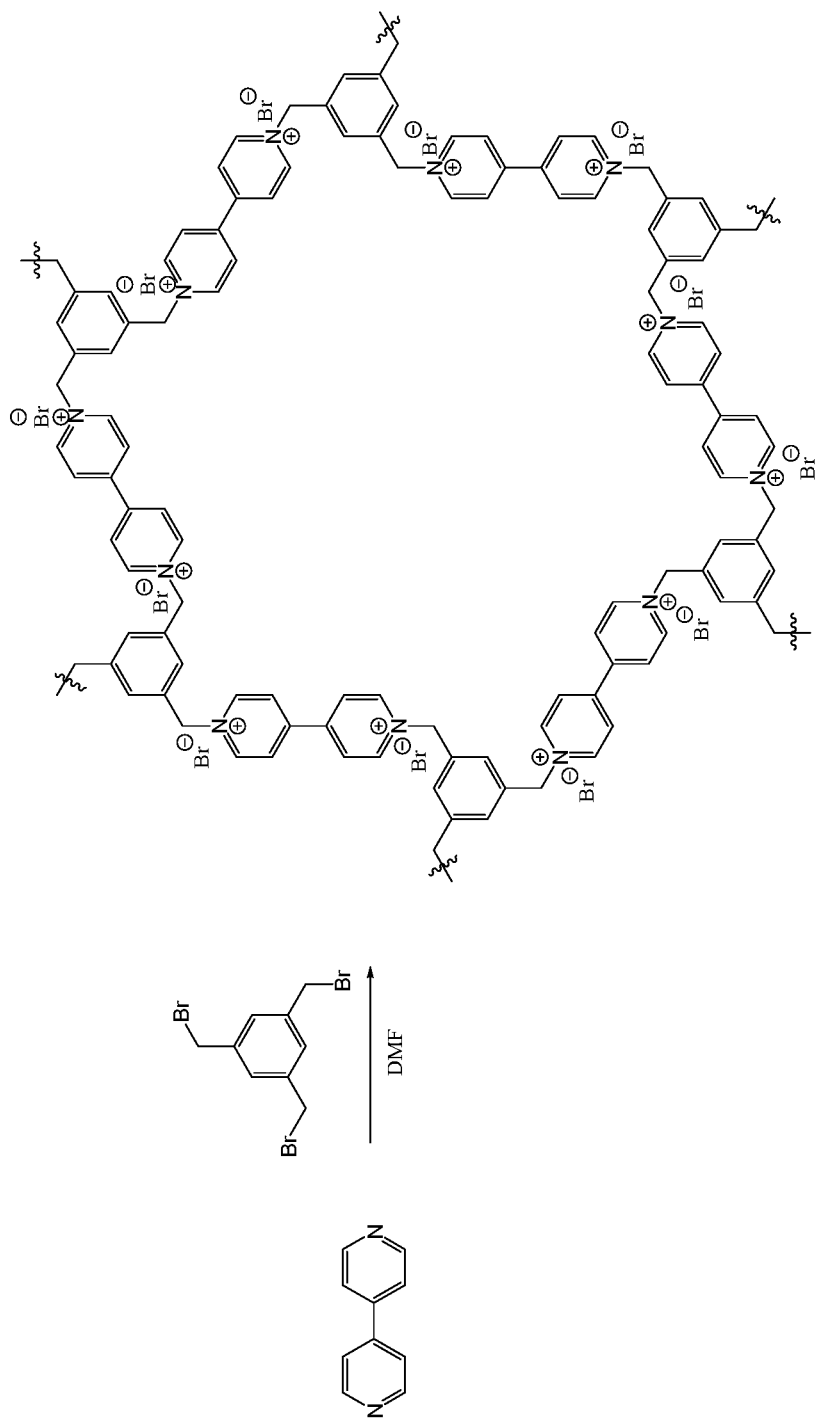
FIG. 10 shows the synthetic schematic using a substituted benzyl group to incorporate a viologen into the 2D covalent organic framework.

As provided in the provided structures and FIGS. 2-10, the cathodic and anodic materials can be covalently coupled together to form an extended 2D covalent organic framework. In some embodiments, the L, L', Z, and Z' moieties or groups facilitate and/or enable the bonding of the respective cathodic and anodic materials (e.g. viologen and dihydrophenazine). In the embodiments provided in FIGS. 2 and 4-10, the respective cathodic and anodic materials form a variety of different polyhedron shaped structures that form the 2D COF. In FIGS. 2 and 4-8, the 2D COF structure represented by the abbreviated structure is an extended hexagonal structure, similar to a honeycomb structure. FIG. 3 illustrates the more extended structure represented in FIG. 2 where this type of extended 2D COF structure can be applied to FIGS. 4-8 and many other structures described herein. FIGS. 9 and 10 also form a hexagon shaped extended 2D COF where no connector group L or L' is utilized. In some embodiments, two, four, six, or more connector groups L or L' may be used to covalently couple and extend the aromaticity or π conjugation of each individual cathodic and anodic material, respectively.

The 2D COFs may be processed using a variety of different techniques to apply them to the electrochromic device 10. For example, in some embodiments, the COF can be uniformly dispersed in a volatile carrier, and the dispersions may then be coated on the first and second electrically conductive material 18, 26 coupled to the first and second substrates 14, 22 (with film formation occurring as the carrier evaporates). In other embodiments, the coating solutions of the cathodic/anodic COFs can be formed with the appropriate node-forming reagents (Z, Z'), allowing the solvents to evaporate, and re-wetting the resulting films with electrolyte. In still other embodiments, the COF can be synthesized, exfoliated, and then coated onto a final substrate by some coating method such as a slot die, spray, etc.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

EXAMPLES

Materials

The viologen compounds, the dihydrophenazine compounds, the solvents, and other reagents were obtained and/or synthesized from commercial suppliers and used without further purification.

Example 1

Referring now to FIG. 2, a flame-dried Schlenk flask equipped with a magnetic stirbar was purged with Ar for 20 minutes and then charged with 1,1'-bis(4-cyanophenyl)-4,4'-bipyridinium bis(tetrafluoroborate) (0.723 g, 1.36 mmol). The flask and its contents were cooled to 0° C. in an ice water bath and then treated with trifluoromethanesulfonic acid (2.40 mL, 27.1 mmol). The flask was sealed and the pale yellow reaction mixture allowed to warm to ambient temperature over 4 h while stirring under Ar. Stirring was continued for an additional 20 h, after which the reaction mixture had become amber and noticeably more viscous. The mixture was cooled once more to 0° C. in an ice water bath and then treated dropwise with deionized water (8.00 mL) over 10 minutes. The resulting suspension was decanted and the residual, amber solid washed twice more with aqueous sodium tetrafluoroborate (40% w/w), twice with methanol, and then twice with acetonitrile. The washings were discarded and the residual material dried in vacuo (10 mTorr) for 2 h, affording the desired product as a light amber solid (0.550 g, 75.7% yield).

Referring now to FIG. 3, the expanded view of the 2D covalent organic framework represented in FIG. 2 is shown. The monomeric cathodic organic compound, 1,1'-bis(4-cyanophenyl)-4,4'-bipyridinium bis(tetrafluoroborate), is shown covalently bonded to four additional monomeric cathodic organic compounds through the trimer of the cyano groups formed as the linker (Z). The expanded 2D covalent organic framework has a graphite like morphology with the monomeric cathodic organic compound, 1,1'-bis(4-cyanophenyl)-4,4'-bipyridinium bis(tetrafluoroborate), positioned as the skeleton of the framework.

Example 2

Figure 4:
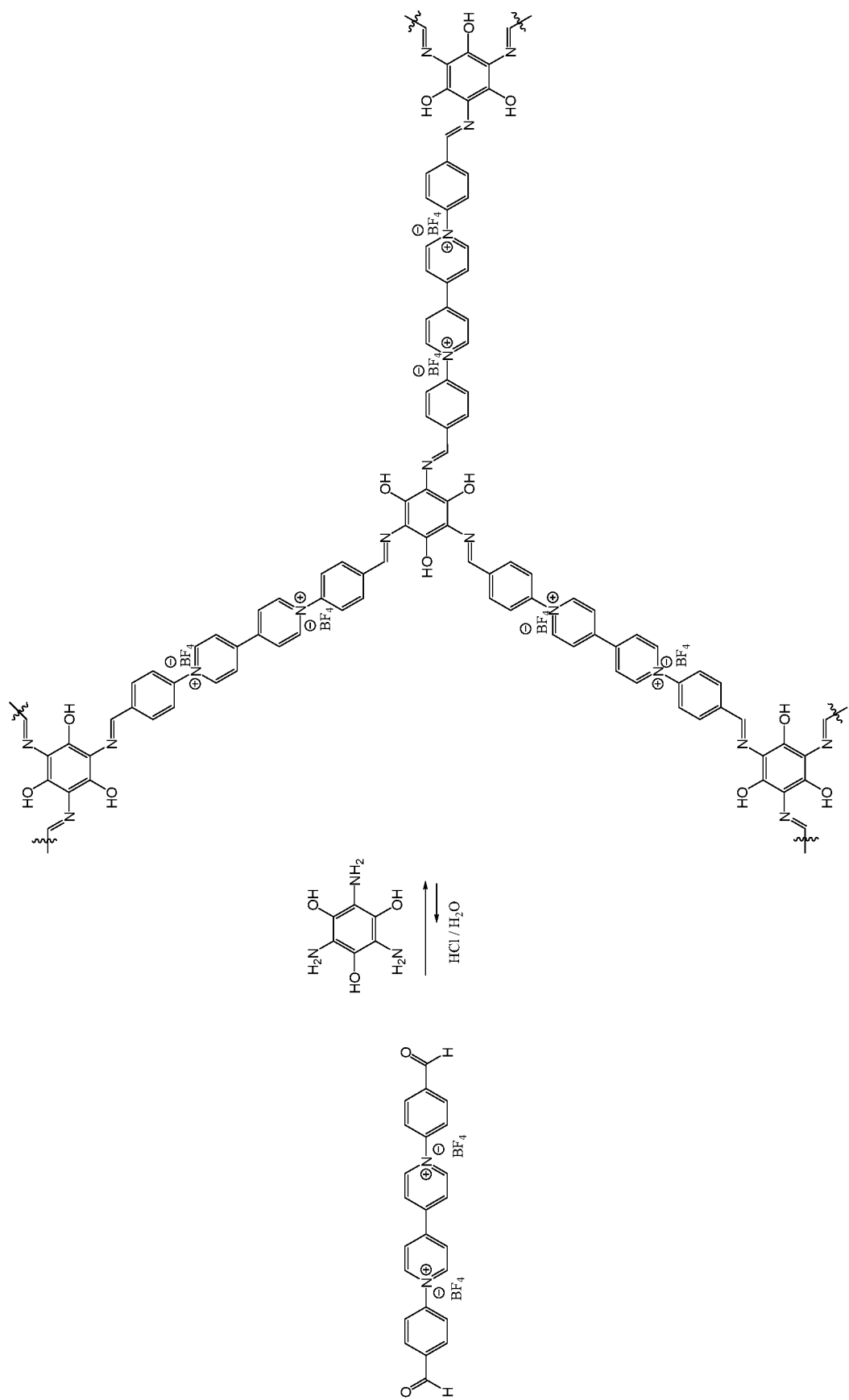
FIG. 4 shows the synthetic schematic of using an imine functional group to incorporate a viologen into the 2D covalent organic framework.

Referring now to FIG. 4, the synthetic schematic of using an imine functional group to incorporate a viologen into the 2D covalent organic framework is provided. In this approach, three equivalents of an aldehyde functionalized 4,4'-bipyridinium viologen may be coupled to a 2,4,6-triaminobenzene-1,3,5-triol in the presence of hydrochloric acid and water to form the extended 2D covalent organic framework. Upon workup, the imine based 2D covalent organic framework can be purified and cast as the cathodic covalent organic framework electroactive material to be used in the electrochromic device 10.

Example 3

Figure 5:
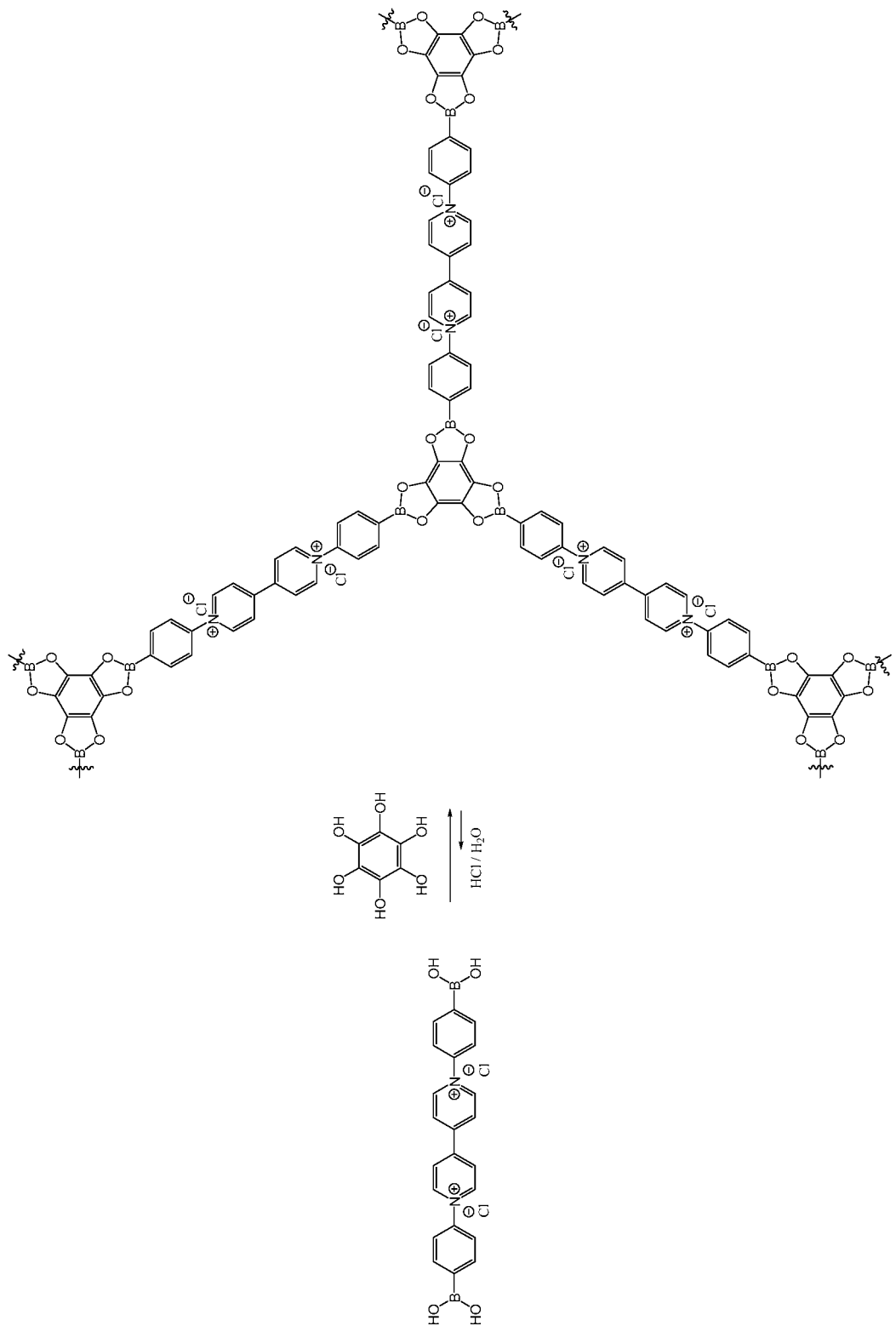
FIG. 5 shows the synthetic schematic of using boronate ester 5-membered rings to incorporate a viologen into a 2D covalent organic framework.

Referring now to FIG. 5, the synthetic schematic of using boronate ester 5-membered rings to incorporate a viologen into a 2D covalent organic framework. In this approach, three equivalents of a boronic acid functionalized 4,4'-bipyridinium viologen may be coupled to a benzene-1,2,3,4,5,6-hexaol in the presence of hydrochloric acid and water to form the extended 2D covalent organic framework. Upon workup, the boronate ester based 2D covalent organic framework can be purified and cast as the cathodic covalent organic framework electroactive material to be used in the electrochromic device 10.

Example 4

Figure 6:
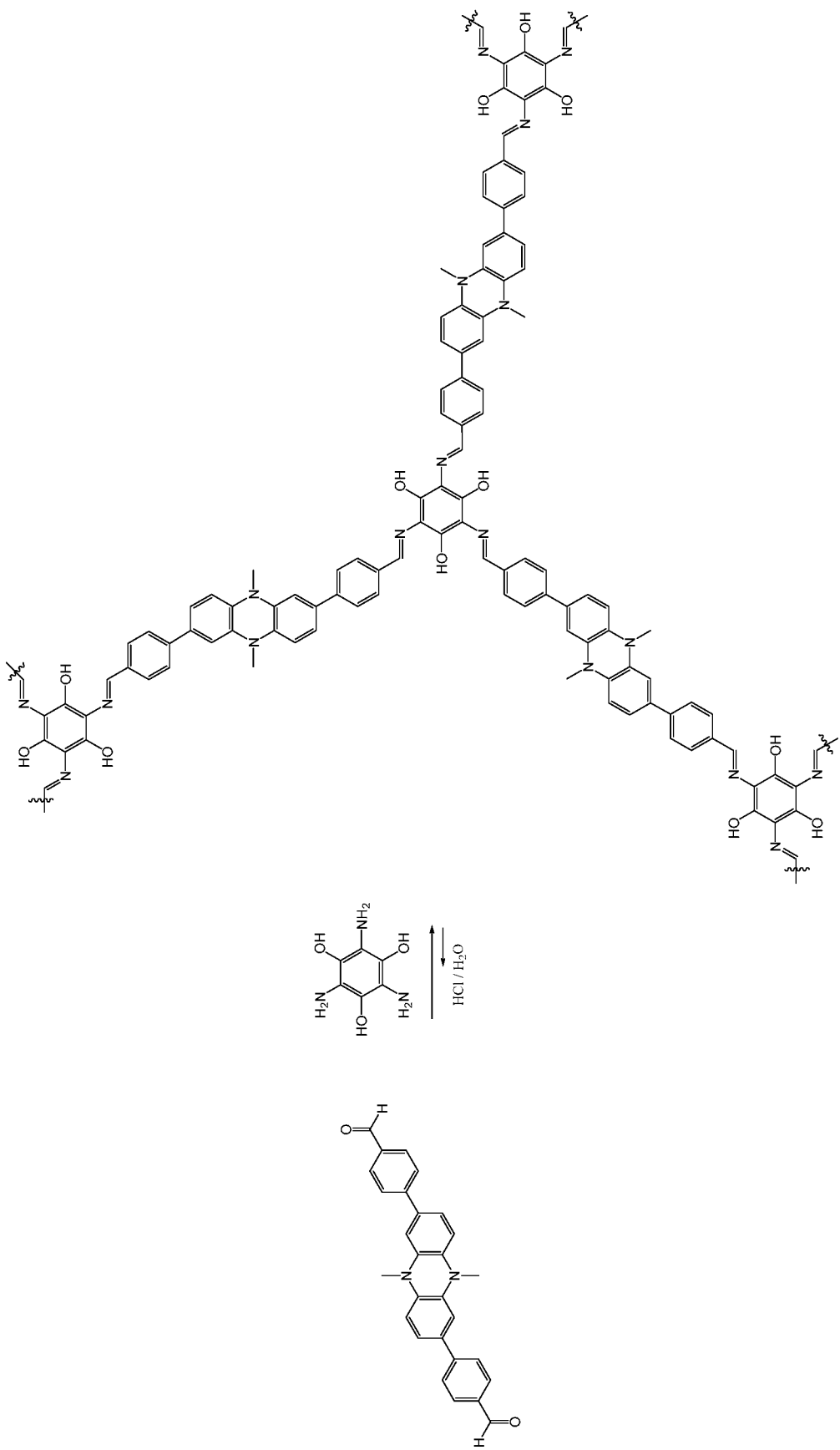
FIG. 6 shows the synthetic schematic of using an imine functional group to incorporate a dihydrophenazine into a 2D covalent organic framework.

Referring now to FIG. 6, the synthetic schematic of using an imine functional group to incorporate a dihydrophenazine into a 2D covalent organic framework. In this approach, three equivalents of an aldehyde functionalized dihydrophenazine may be coupled to a 2,4,6-triaminobenzene-1,3,5-triol in the presence of hydrochloric acid and water to form the extended 2D covalent organic framework. Upon workup, the imine based 2D covalent organic framework can be purified and cast as the anodic covalent organic framework electroactive material to be used in the electrochromic device 10.

Example 5

Referring now to FIG. 7, the synthetic schematic for using a boronate ester 5-membered rings to incorporate a dihydrophenazine into the 2D covalent organic framework. In this approach, three equivalents of a boronic acid functionalized dihydrophenazine may be coupled to a benzene-1,2,3,4,5,6-hexaol in the presence of hydrochloric acid and water to form the extended 2D covalent organic framework. Upon workup, the boronate ester based 2D covalent organic framework can be purified and cast as the anodic covalent organic framework electroactive material to be used in the electrochromic device 10.

Example 6

Referring now to FIG. 8, the synthetic schematic for using a boroxine 6-membered ring to incorporate a viologen into the 2D covalent organic framework. In this approach, three equivalents of a boronic acid functionalized viologen may be coupled to form a trimer or boroxine in the presence of hydrochloric acid and water to form the extended 2D covalent organic framework. Upon workup, the boroxine based 2D covalent organic framework can be purified and cast as the cathodic covalent organic framework electroactive material to be used in the electrochromic device 10.

Example 7

Referring now to FIG. 9, the synthetic schematic for using a substituted benzyl group to incorporate a dihydrophenazine into the 2D covalent organic framework. In this approach, three equivalents of phenazine may be coupled to two equivalents of 1,3,5-tris(bromomethyl)benzene in the presence of tributylmethylammonium chloride, sodium dithionite, sodium carbonate, acetonitrile, and water to form the extended 2D covalent organic framework. Upon workup, the benzylic 2D covalent organic framework can be purified and cast as the anodic covalent organic framework electroactive material to be used in the electrochromic device 10.

Example 8

Referring now to FIG. 10, the synthetic schematic for using a substituted benzyl group to incorporate a viologen into the 2D covalent organic framework. In this approach, three equivalents of 4,4'-bipyridine may be coupled to two equivalents of 1,3,5-tris(bromomethyl)benzene in the presence of DMF and water to form the extended 2D covalent organic framework. Upon workup, the benzylic 2D covalent organic framework can be purified and cast as the cathodic covalent organic framework electroactive material to be used in the electrochromic device 10.

The invention claimed is:

1. An electrochromic device, comprising:
a first substantially transparent substrate coupled to a first electrically conductive material;
a second substrate coupled to a second electrically conductive material; and
an electrochromic medium comprising:
at least one solvent and/or an electrolyte gel;
at least one cathodic material; and
at least one anodic material;
wherein the cathodic material is a cathodic organic framework electroactive material and/or the anodic material is an anodic organic framework electroactive material;
wherein at least one of the anodic and cathodic materials is electrochromic;
wherein the cathodic organic framework electroactive material is represented by the following structure (VI):

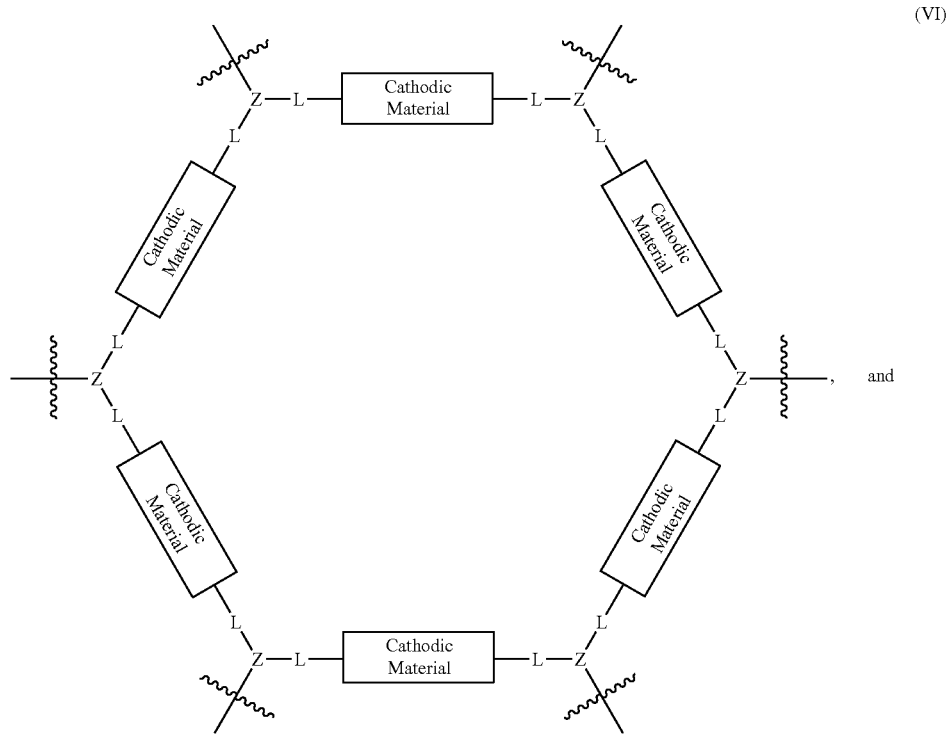

wherein the anodic organic framework electroactive material is represented by the following structure (I):

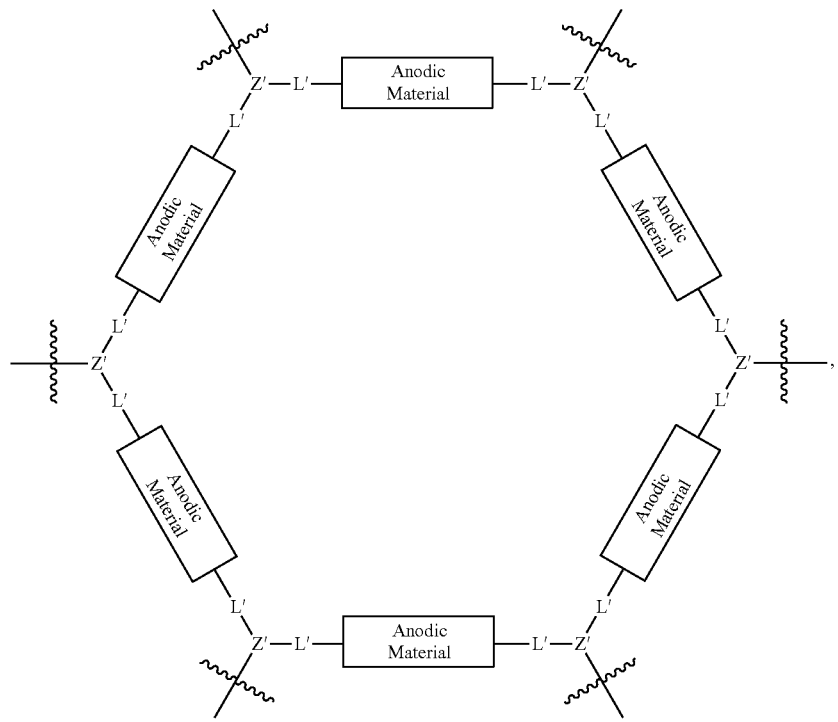
(I)
wherein L and L' may both include an organic connector group and wherein Z and Z' may both include an organic linking group.
2. The electrochromic device of claim 1, wherein the cathodic organic framework electroactive material is represented by the following structure (VII):
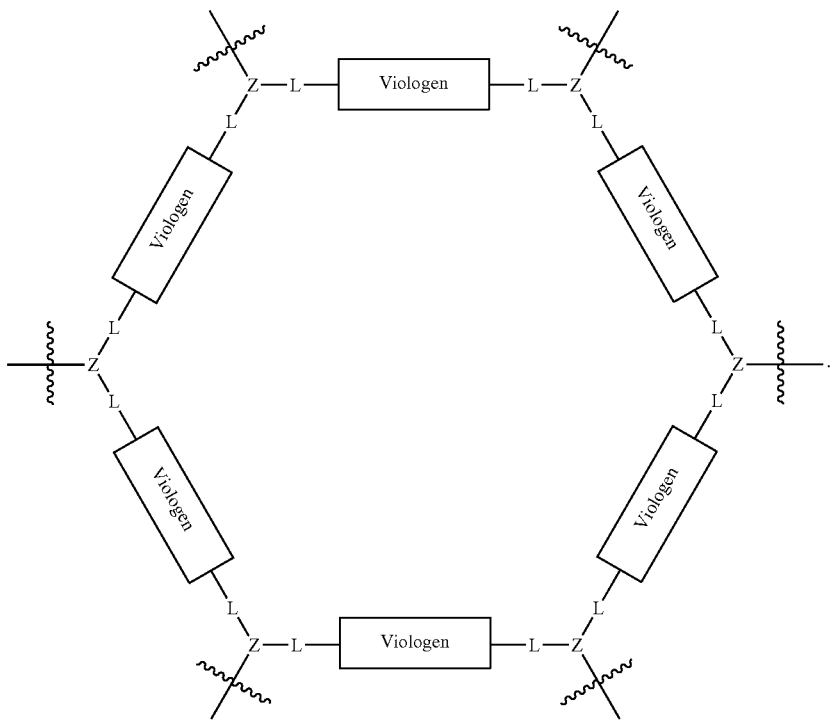
(VII)

3. The electrochromic device of claim 2, wherein X is $F^-$, $Cl^-$, $Br^-$, $I^-$, $BF_4^-$, $PF_6^-$, $SbF_6^-$, $AsF_6^-$, $ClO_4^-$, $SO_3CF_3^-$, $N(CN)_2^-$, $C(CF_3SO_2)_3^-$, $N(SO_2C_2F_5)_2^-$, $^-Al(OC(CF_3)_3)_4$, bis(trifluoromethanesulfonyl) imide, $^-BAr_4$, or a combination thereof, wherein Ar is a aryl or fluorinated aryl group.

4. The electrochromic device of claim 1, wherein the anodic organic framework electroactive material is represented by the following structure (II):

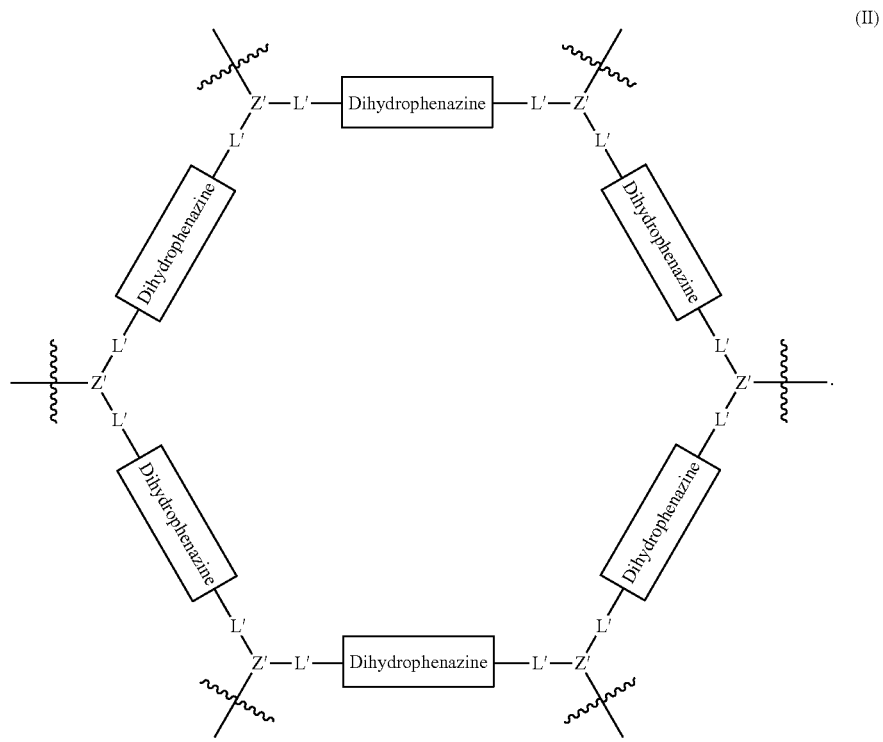

(II)

5. The electrochromic device of claim 1, wherein the cathodic organic framework electroactive material is represented by at least one of the following chemical structures (VIII)-(XII):

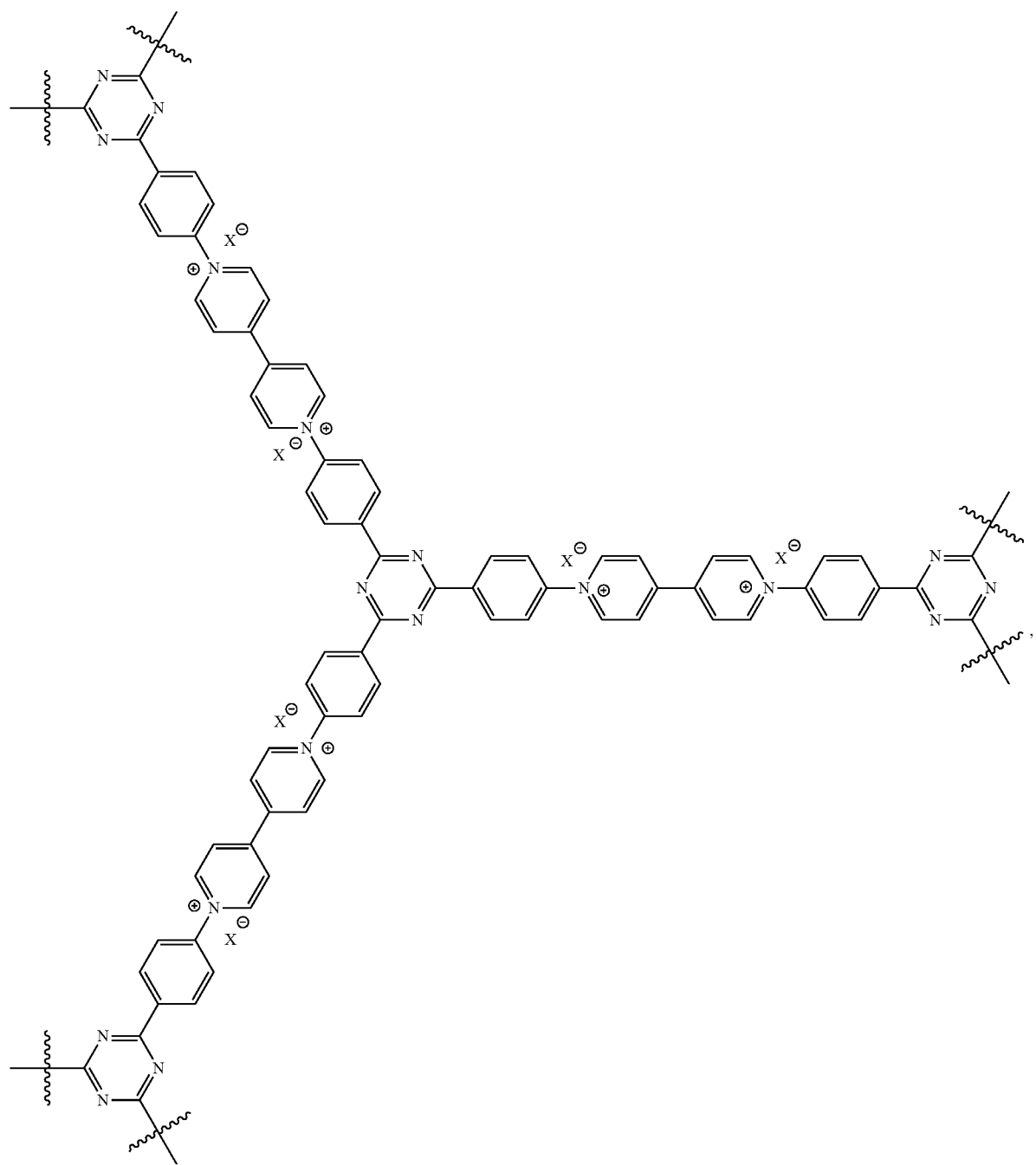
(VIII)

-continued
(IX)
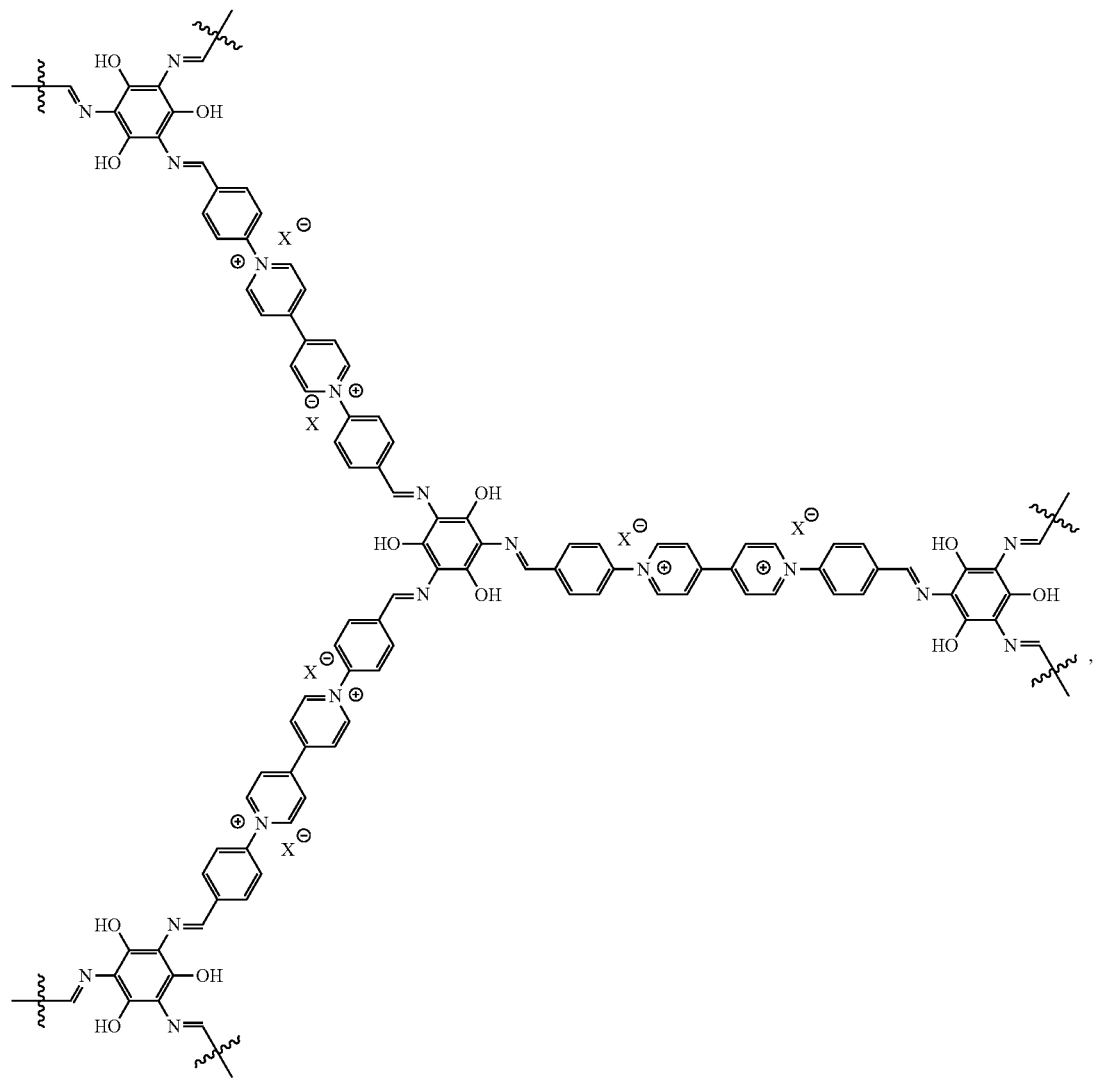

-continued
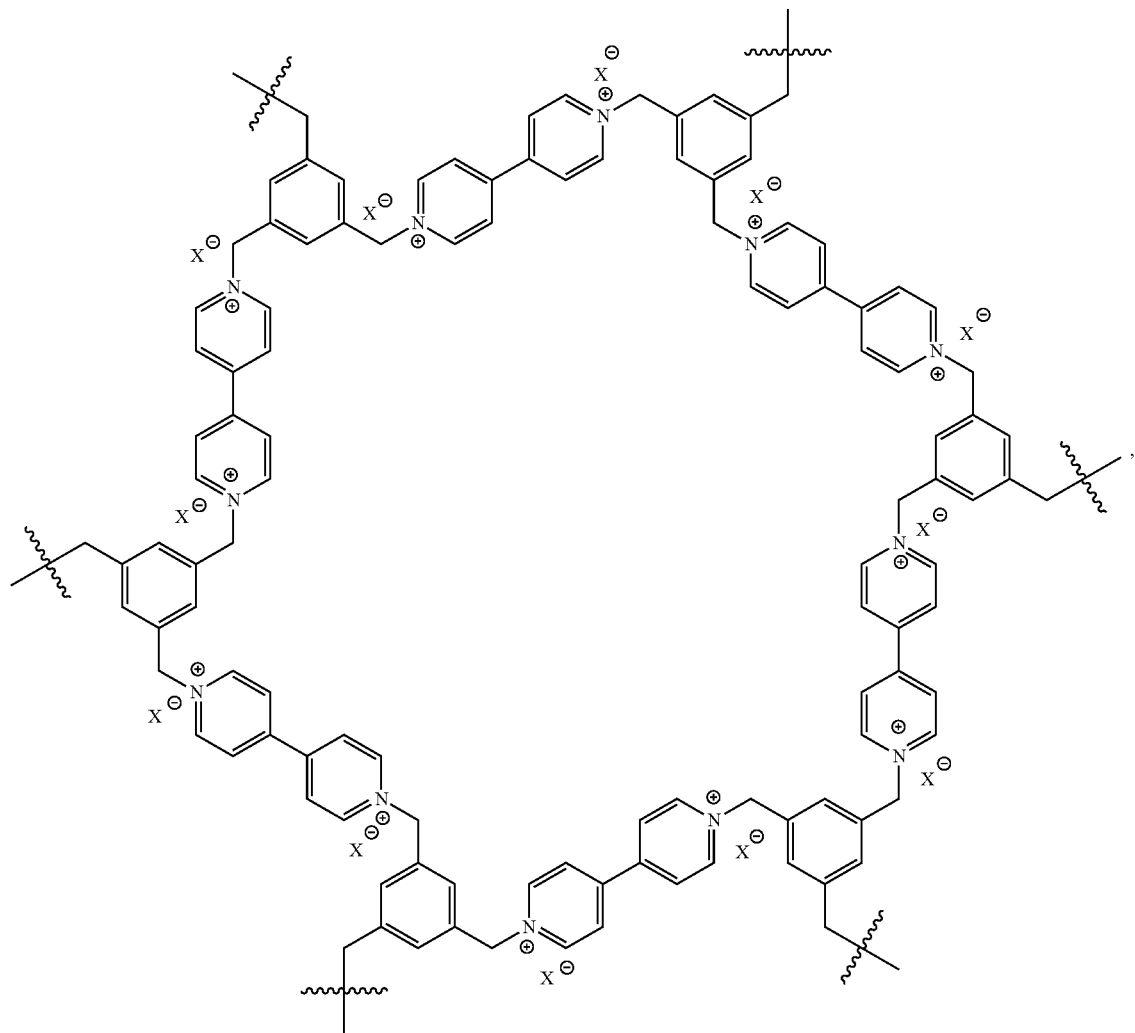
(X)

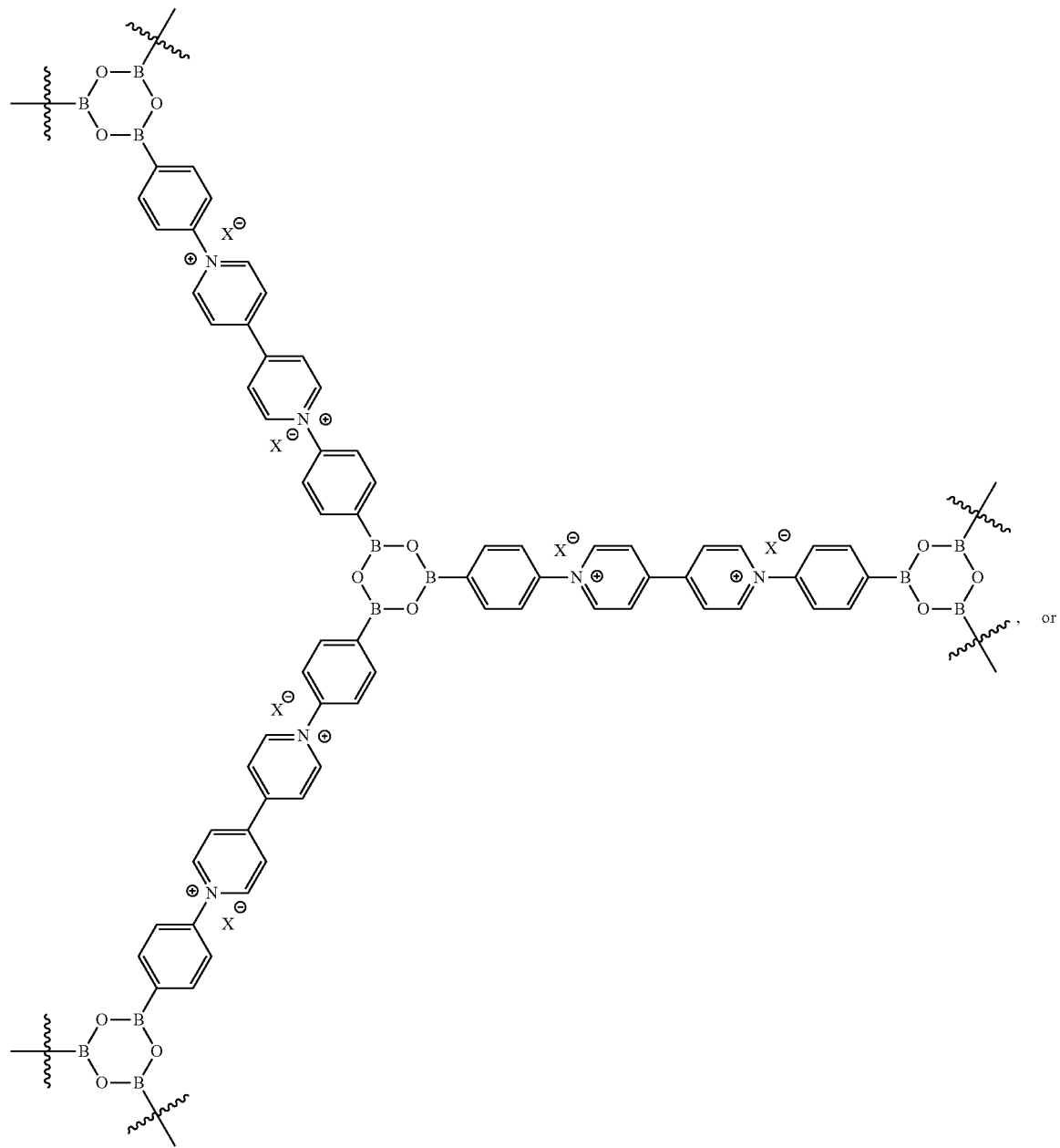
(XI)

(XII)
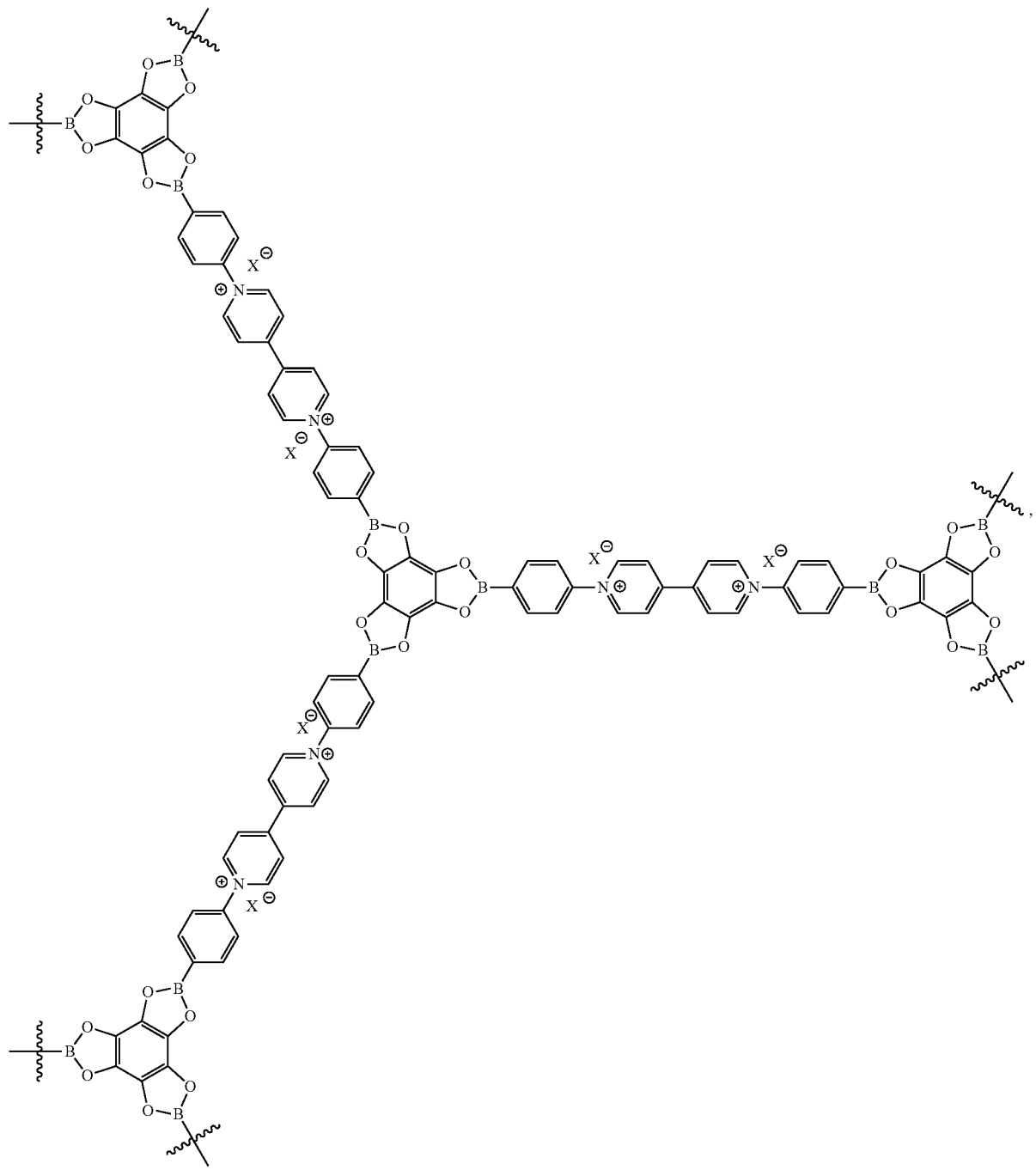
wherein X is an anion.
6. The electrochromic device of claim 1, wherein the anodic organic framework electroactive material is represented by at least one of the following chemical structures (III)-(V):

(III)
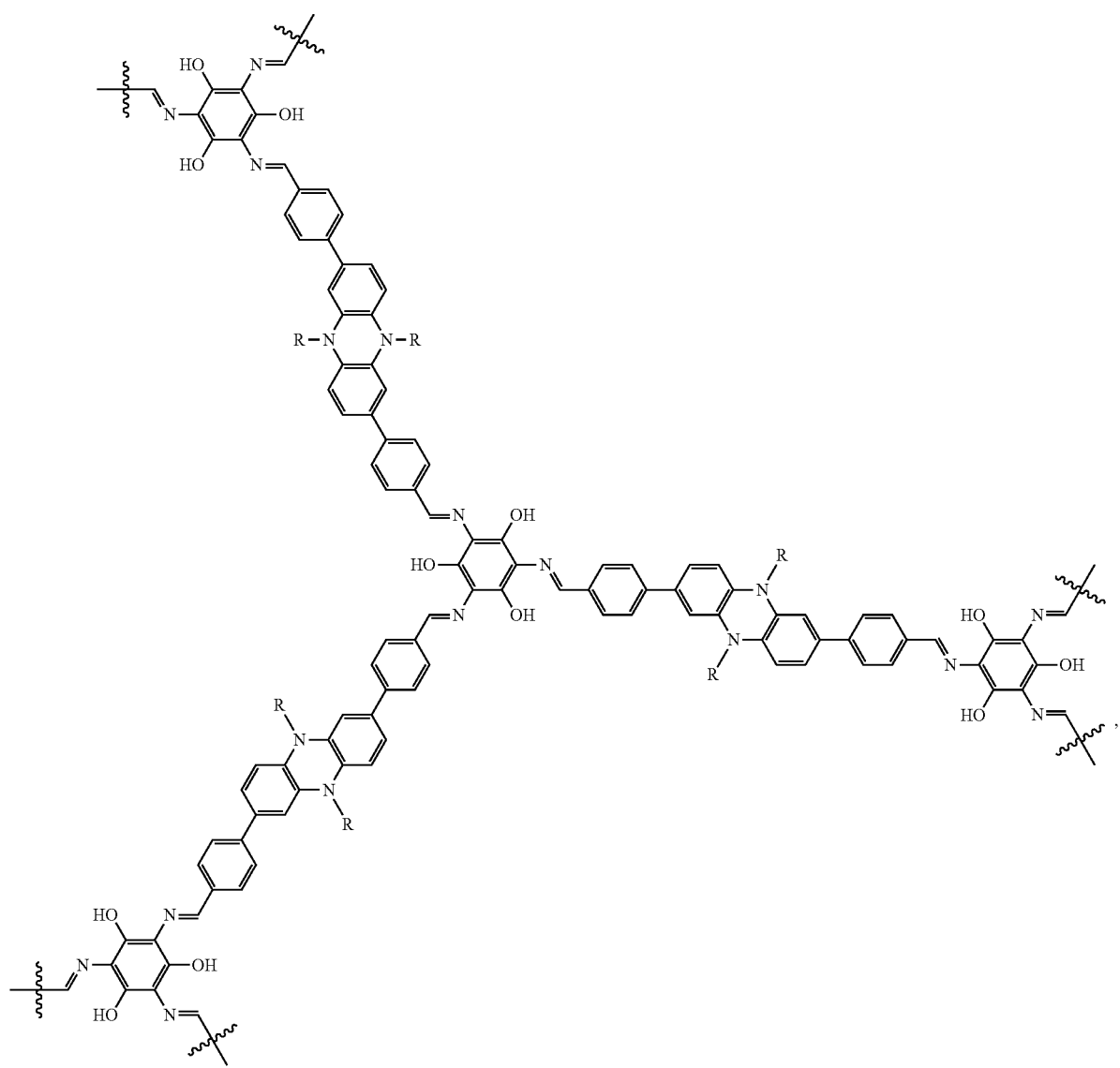

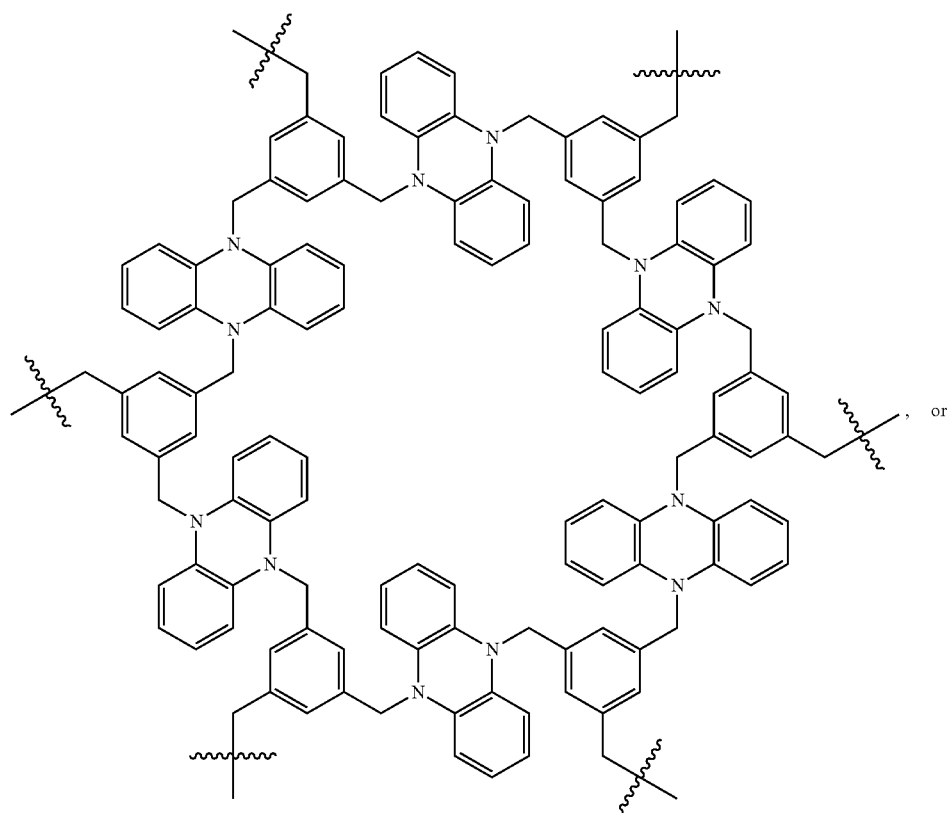
(IV)
, or

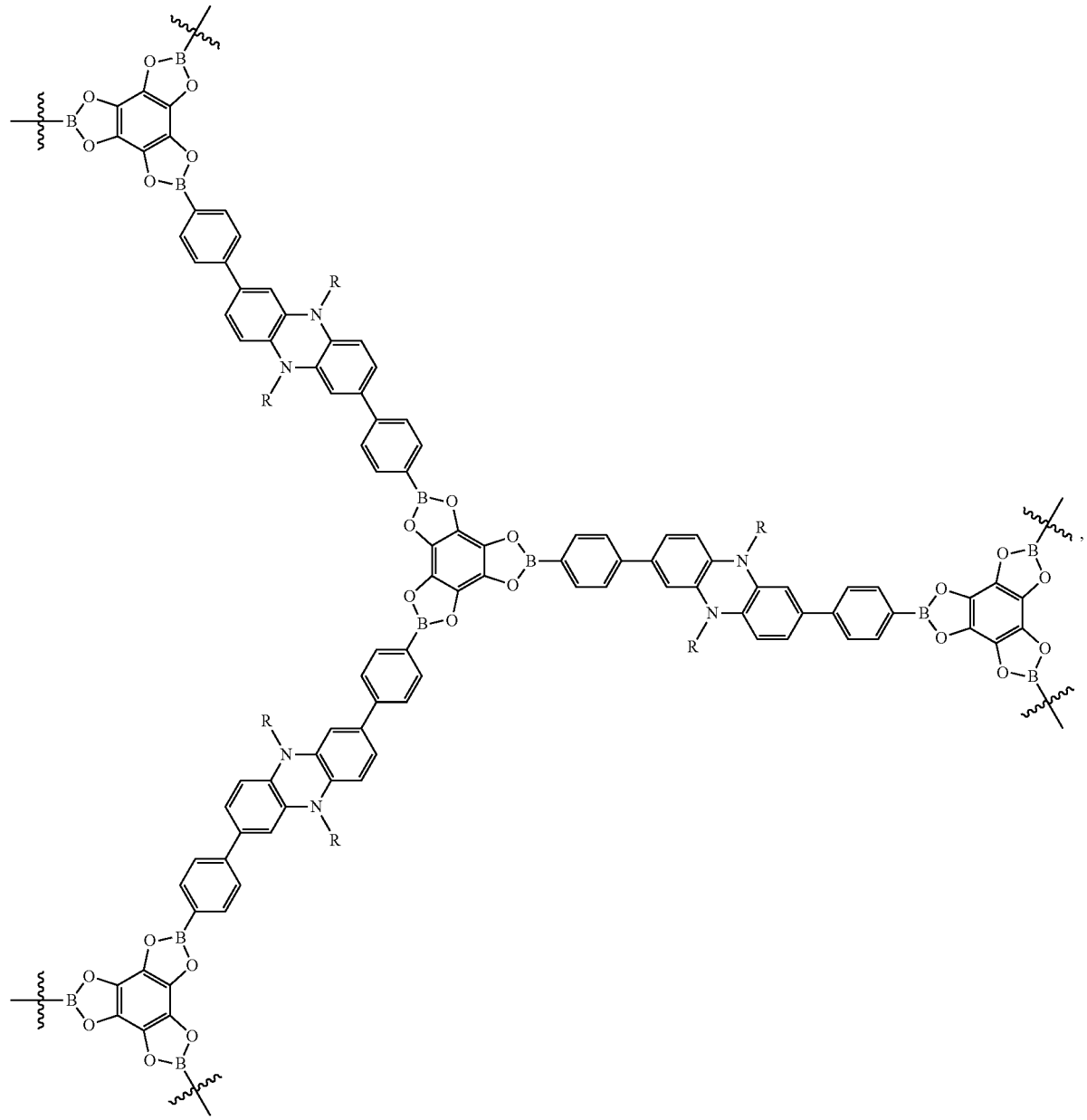

(V)

wherein R is an alkyl, siloxy alkyl, aryl, hydroxyalkyl, alkenyl, aralkyl, or a combination thereof.

7. The electrochromic device of claim 1, wherein the cathodic organic framework electroactive material is a viologen.

8. The electrochromic device of claim 1, wherein the anodic organic framework electroactive material is a dihydrophenazine.

9. The electrochromic device of claim 1, wherein Z and Z' may both include 2,4,6-triaminobenzene-1,3,5-triol, benzene-1,2,3,4,5,6-hexaol, benzene-1,2,3,4,5,6-hexamine, or a combination thereof and wherein L and L' may both include one or more phenyl rings.

10. The electrochromic device of claim 1, further comprising an electrolyte salt.

11. An electrochromic device, comprising:
a first substantially transparent substrate coupled to a first electrically conductive material;
a second substrate coupled to a second electrically conductive material; and
an electrochromic medium comprising:
  at least one solvent and/or an electrolyte gel;
  at least one cathodic material; and
  at least one anodic material;
  wherein the cathodic material is a cathodic organic framework electroactive material and/or the anodic material is an anodic organic framework electroactive material;
  wherein at least one of the anodic and cathodic organic framework electroactive materials is electrochromic;

wherein the cathodic organic framework electroactive material is represented by the following structure (VII):
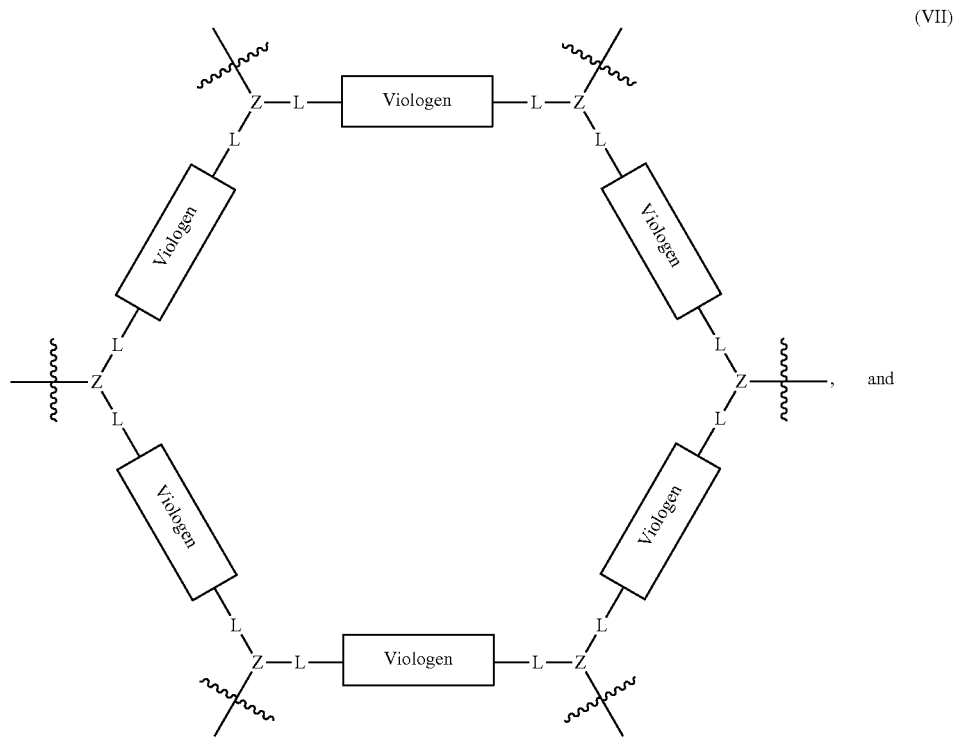
(VII)
, and
wherein the anodic organic framework electroactive material is represented by the following structure (II):
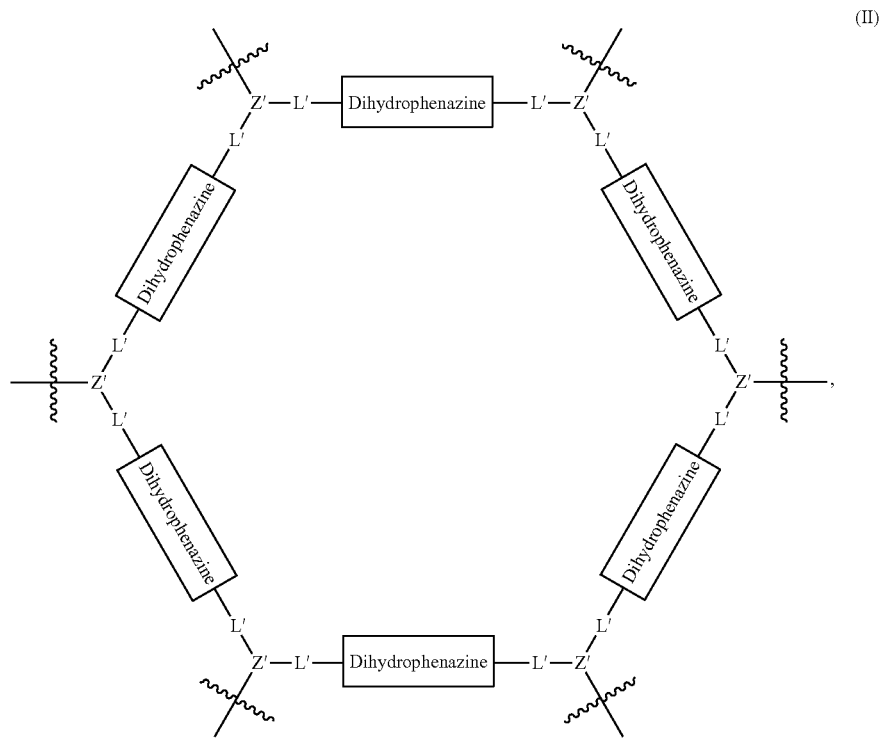
(II)
, wherein L and L' may both include an organic connector group and wherein Z and Z' may both include an organic linking group.
12. The electrochromic device of claim 11, wherein the cathodic organic framework electroactive material is represented by at least one of the following chemical structures (VIII)-(XII):
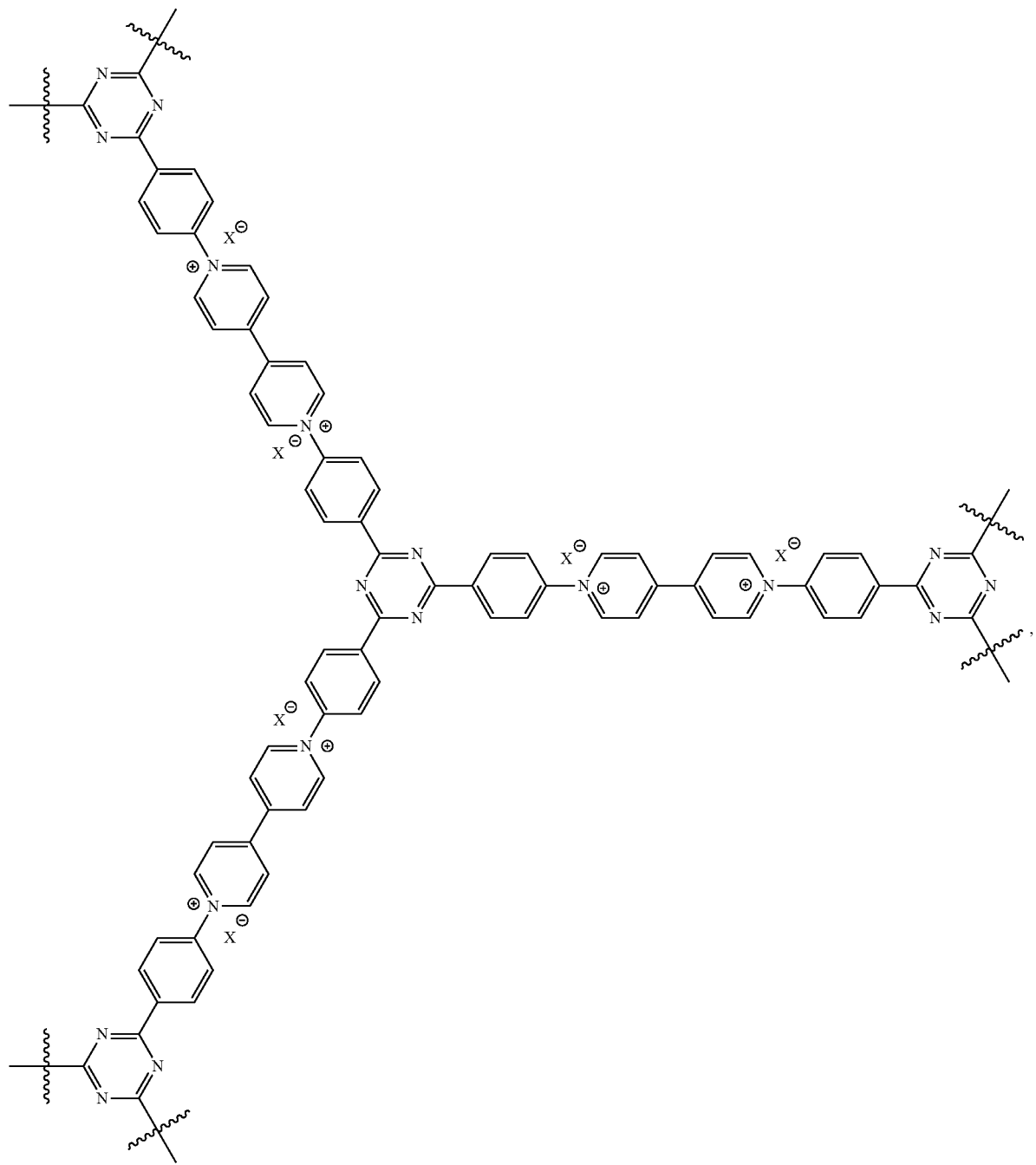
(VIII)

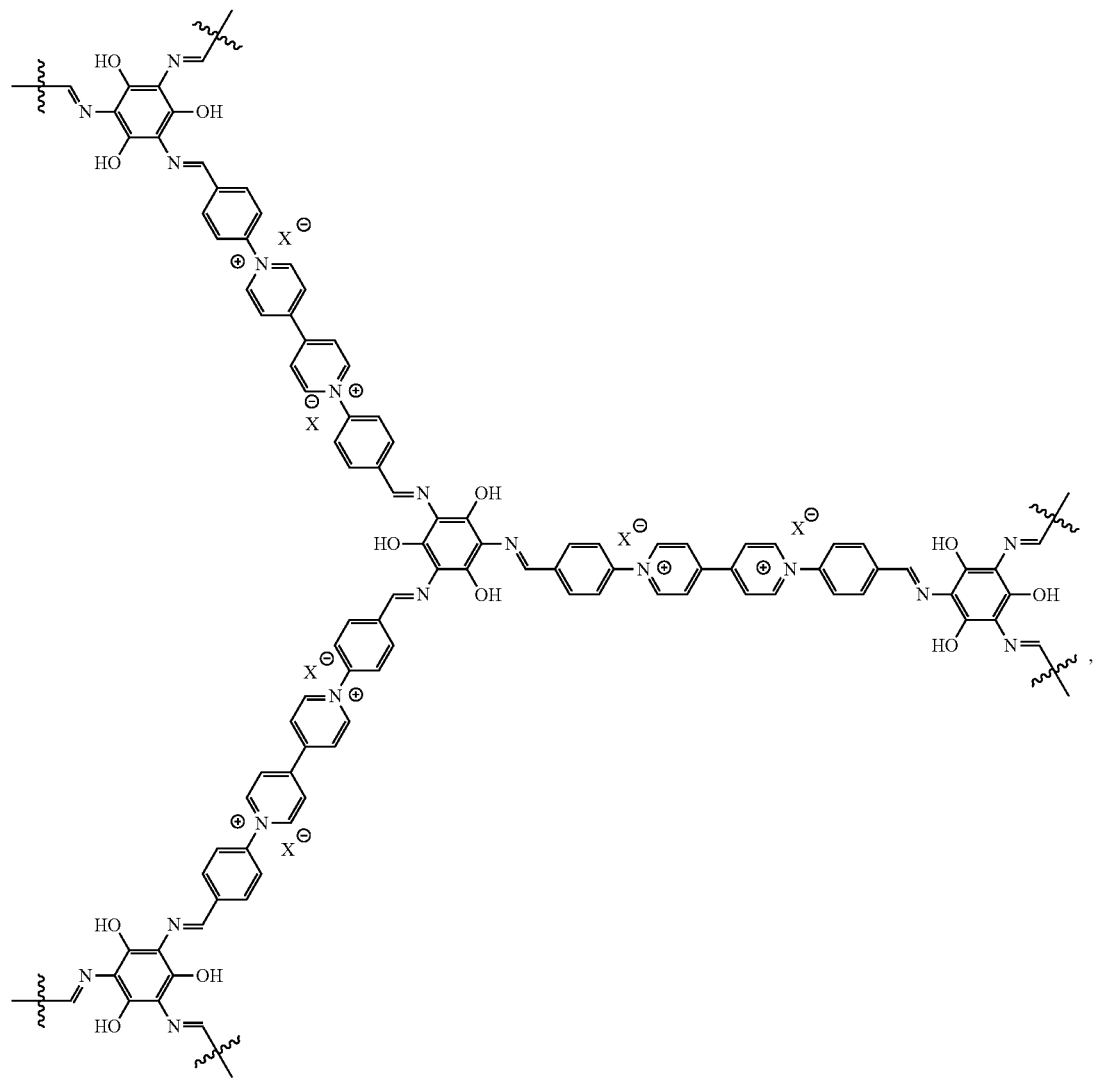
(IX)

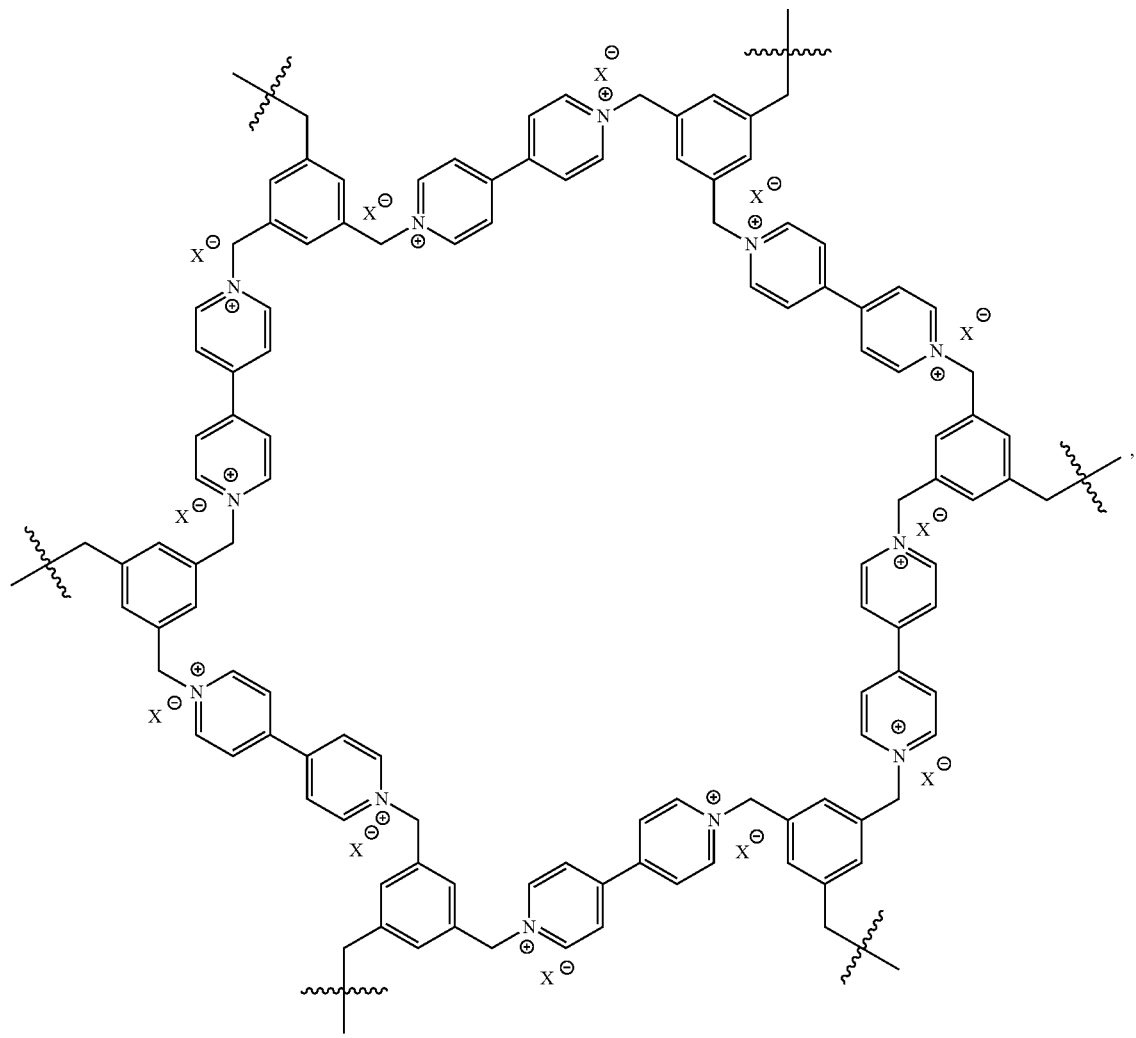
(X)

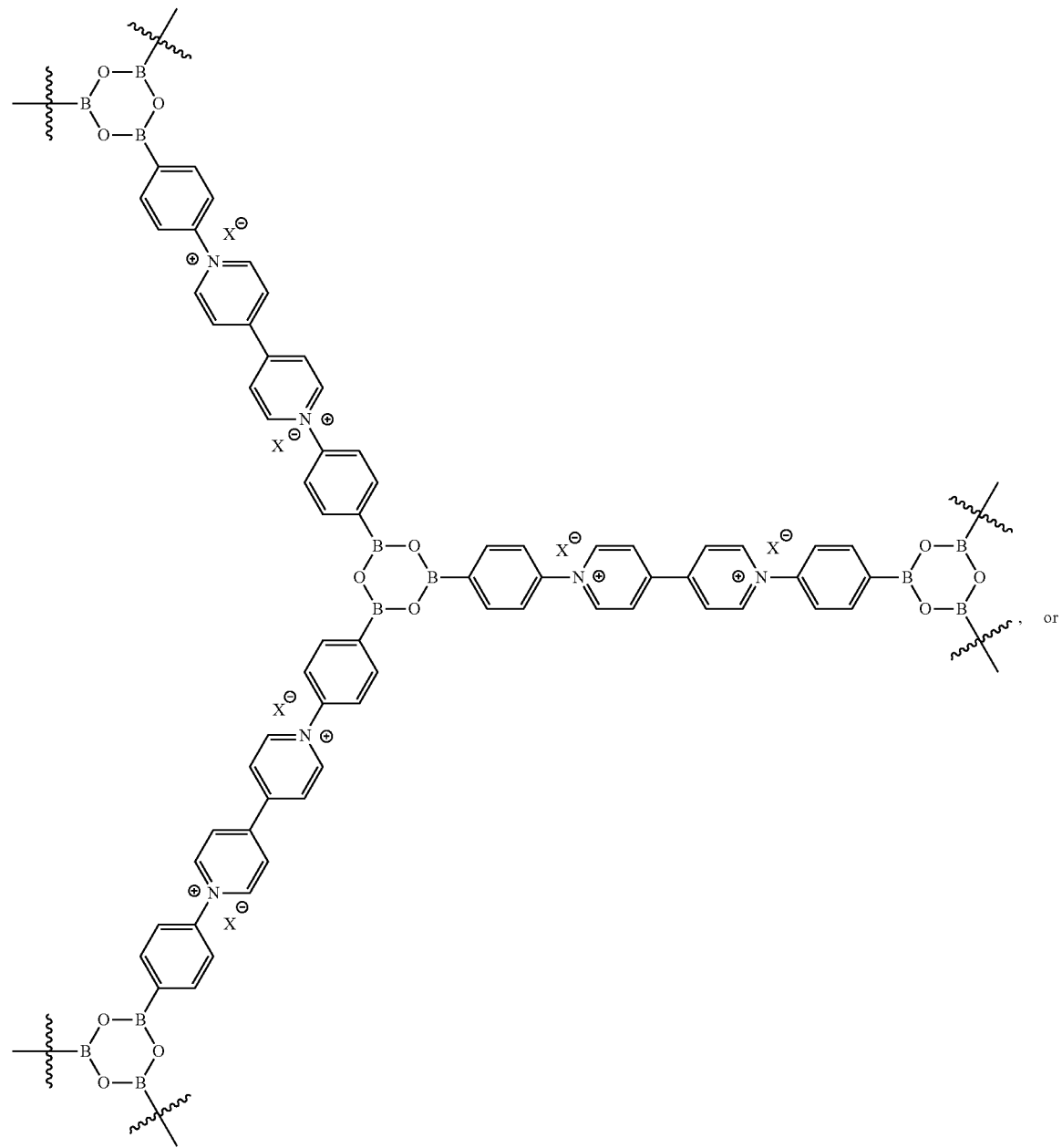
(XI)

(XII)

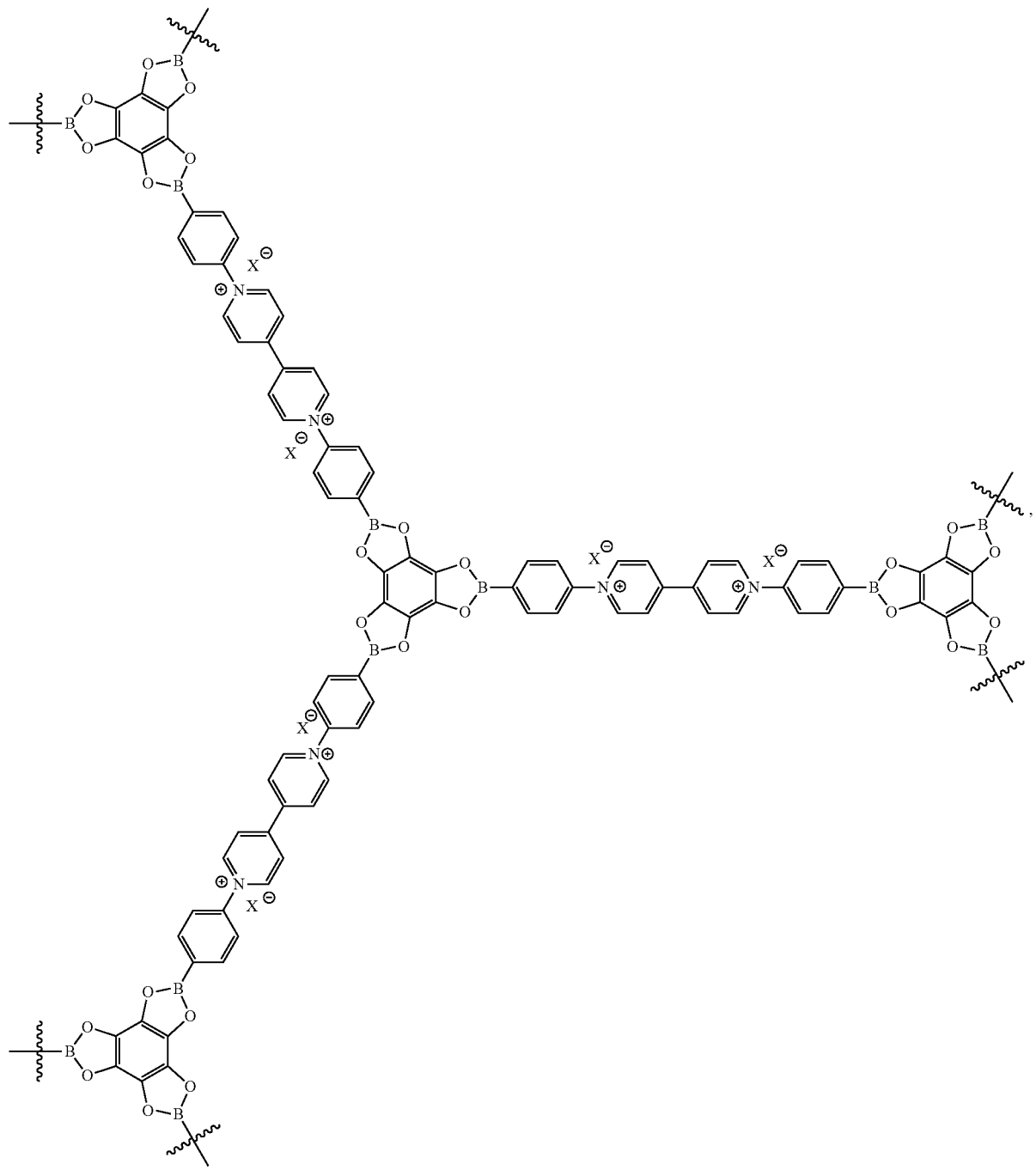

wherein X is an anion.

13. The electrochromic device of claim 12, wherein X is F⁻, Cl⁻, Br⁻, I⁻, $BF_4^-$, $PF_6^-$, $SbF_6^-$, $AsF_6^-$, $ClO_4^-$, $SO_3CF_3^-$, $N(CN)_2^-$, $C(CF_3SO_2)_3^-$, $N(SO_2C_2F_5)_2^-$, $^-Al(OC(CF_3)_3)_4$, bis(trifluoromethanesulfonyl) imide, $^-BAr_4$, or a combination thereof, wherein Ar is a aryl or fluorinated aryl group.

14. The electrochromic device of claim 11, wherein the anodic organic framework electroactive material is represented by at least one of the following chemical structures (III)-(V):

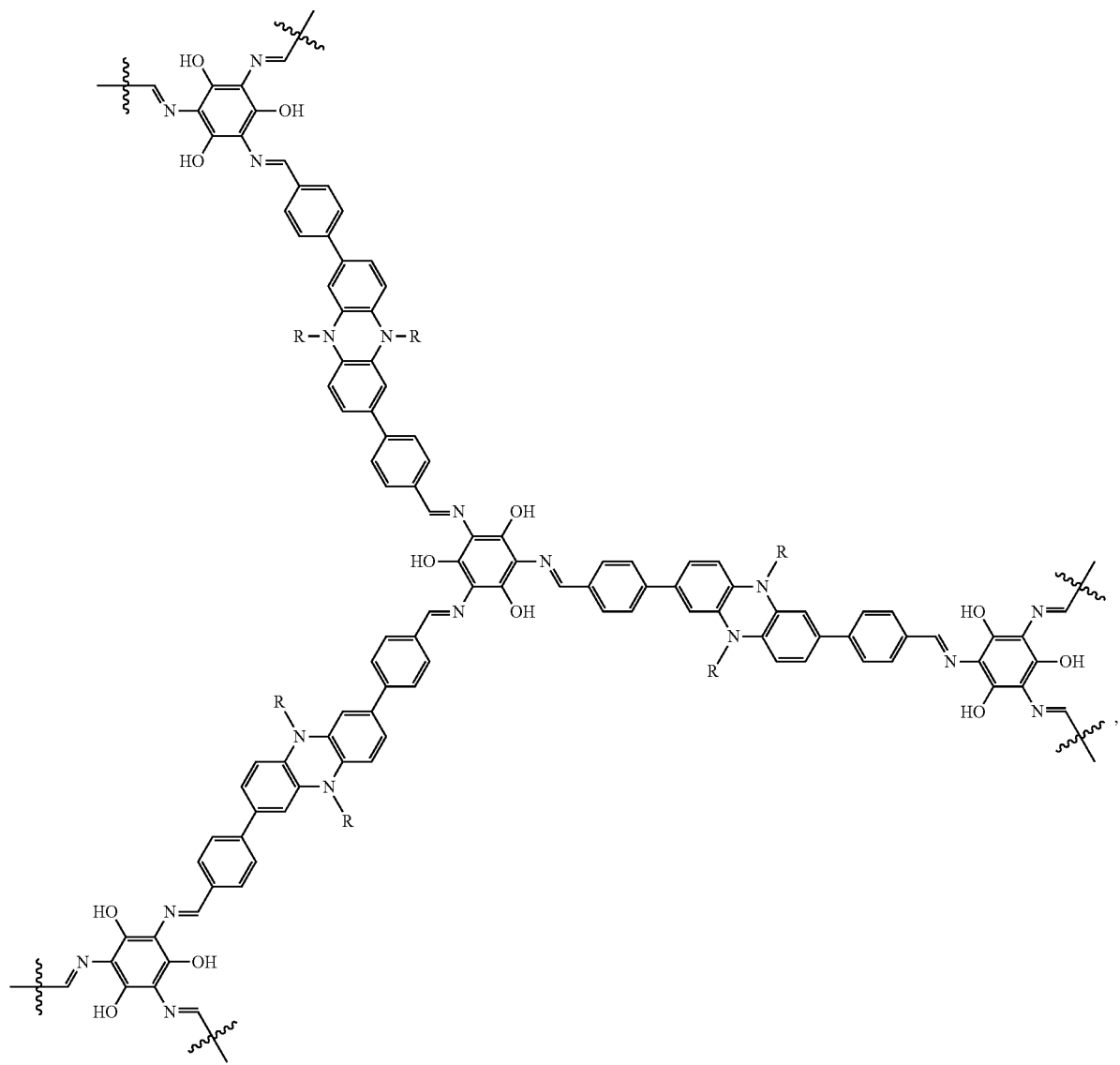
(III)

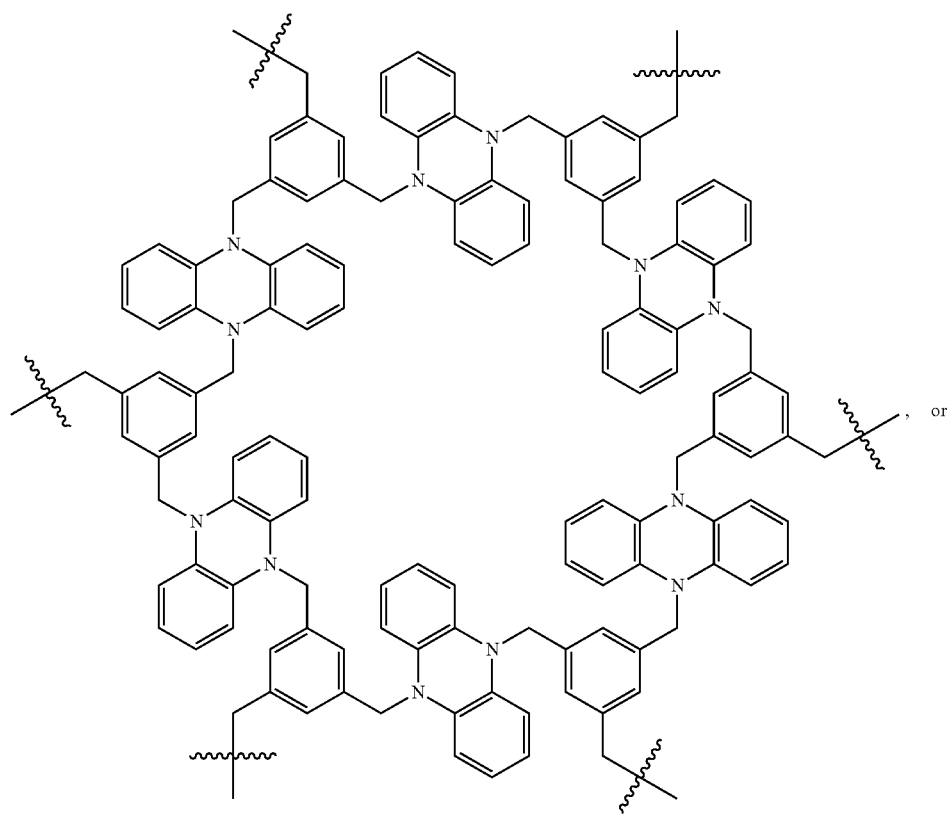
(IV)
, or (V)

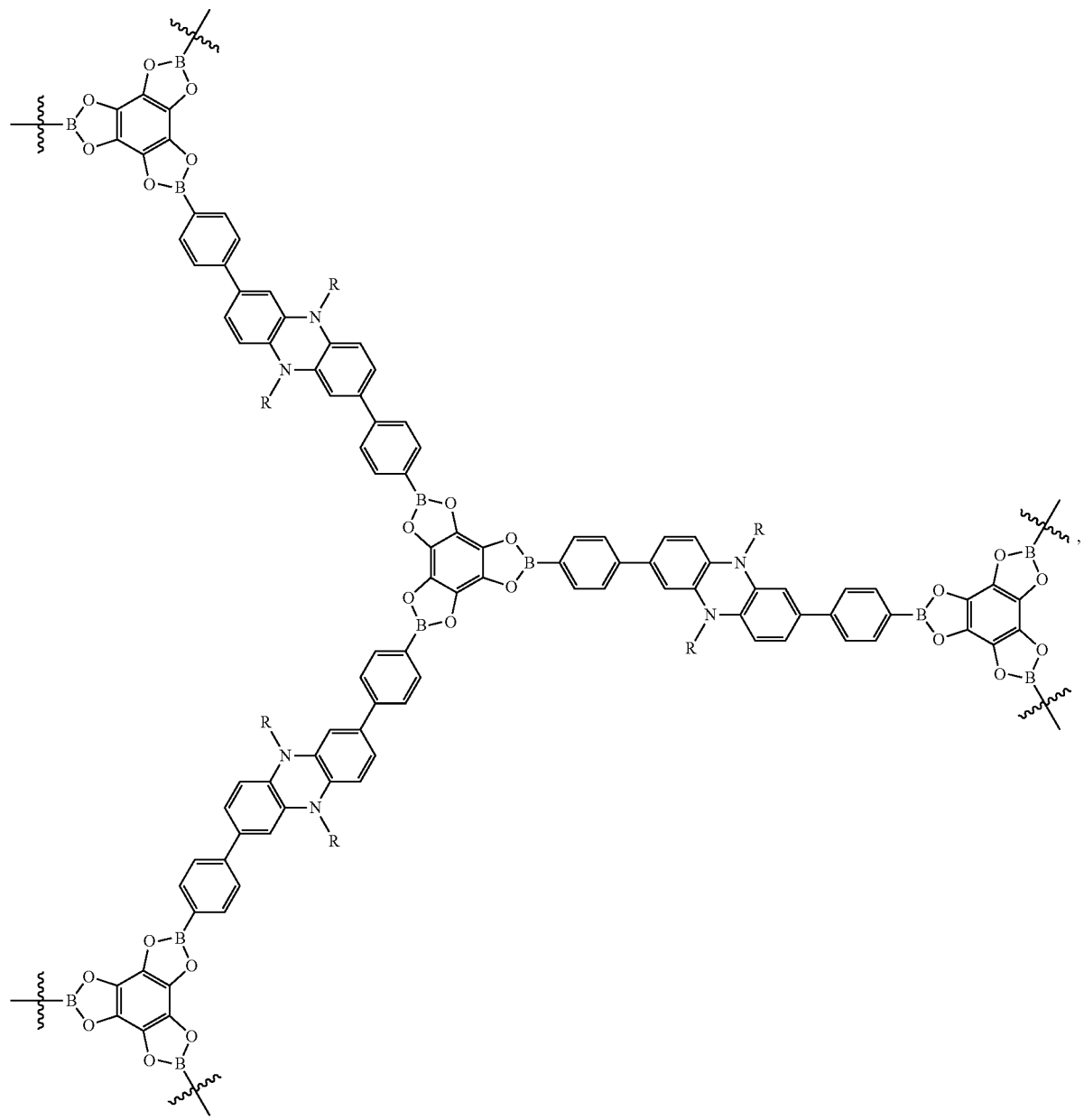

wherein R is an alkyl, siloxy alkyl, aryl, hydroxyalkyl, alkenyl, aralkyl, or a combination thereof.

15. The electrochromic device of claim 11, wherein Z and Z' may both include 2,4,6-triaminobenzene-1,3,5-triol, benzene-1,2,3,4,5,6-hexaol, benzene-1,2,3,4,5,6-hexamine, or a combination thereof.

16. The electrochromic device of claim 11, wherein L and L' may both include one or more phenyl rings.

17. The electrochromic device of claim 11, further comprising an electrolyte salt.

18. An electrochromic device, comprising:
a first substantially transparent substrate coupled to a first electrically conductive material;
a second substrate coupled to a second electrically conductive material; and
an electrochromic medium comprising:
at least one solvent and/or an electrolyte gel;
at least one anodic material; and
at least one cathodic material;
wherein the cathodic material is a cathodic organic framework electroactive material and/or the anodic material is an anodic organic framework electroactive material;
wherein at least one of the anodic and cathodic organic framework electroactive materials is electrochromic;
wherein the cathodic organic framework electroactive material is represented by at least one of the following chemical structures (VIII)-(XII):

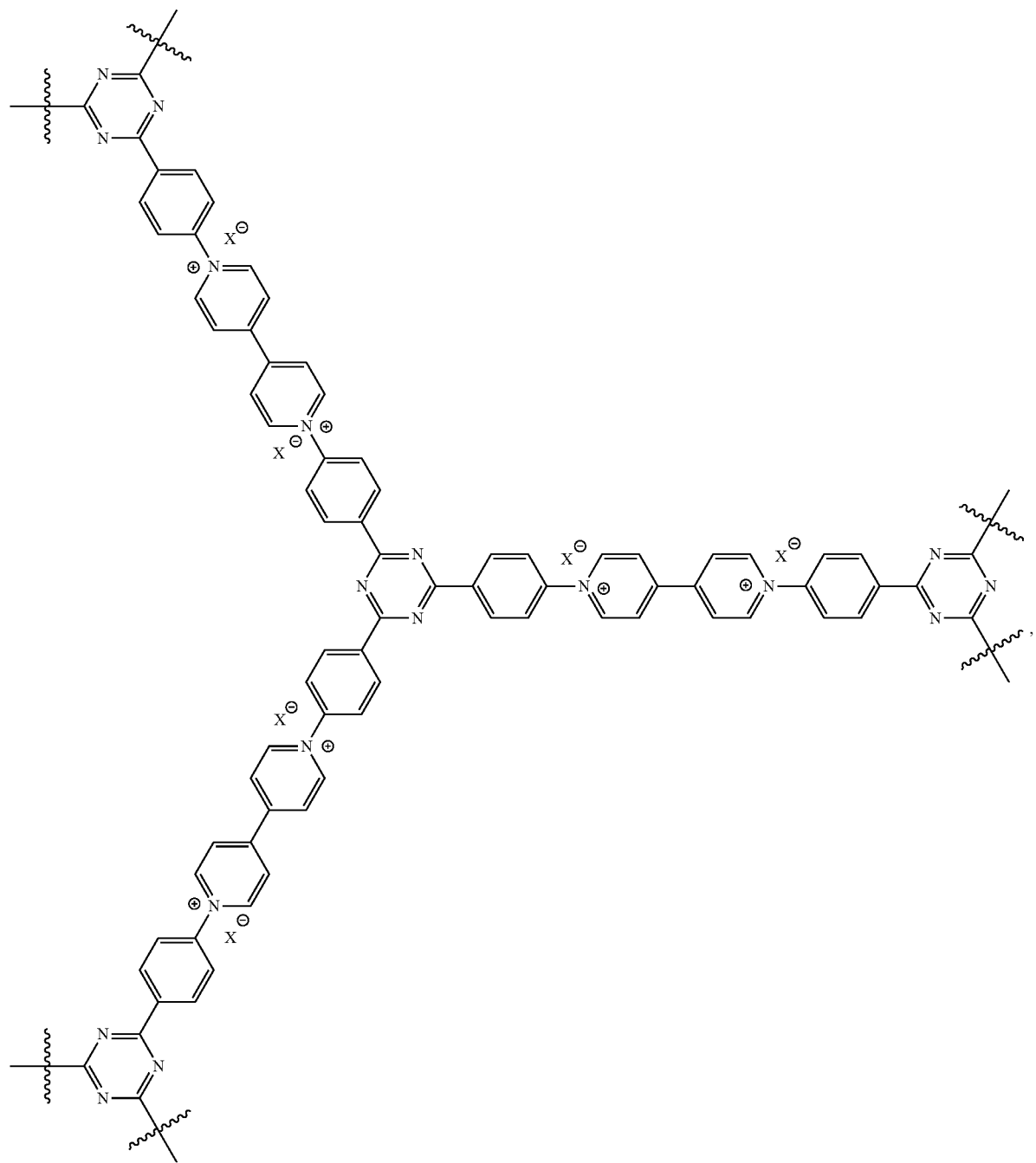
(VIII)

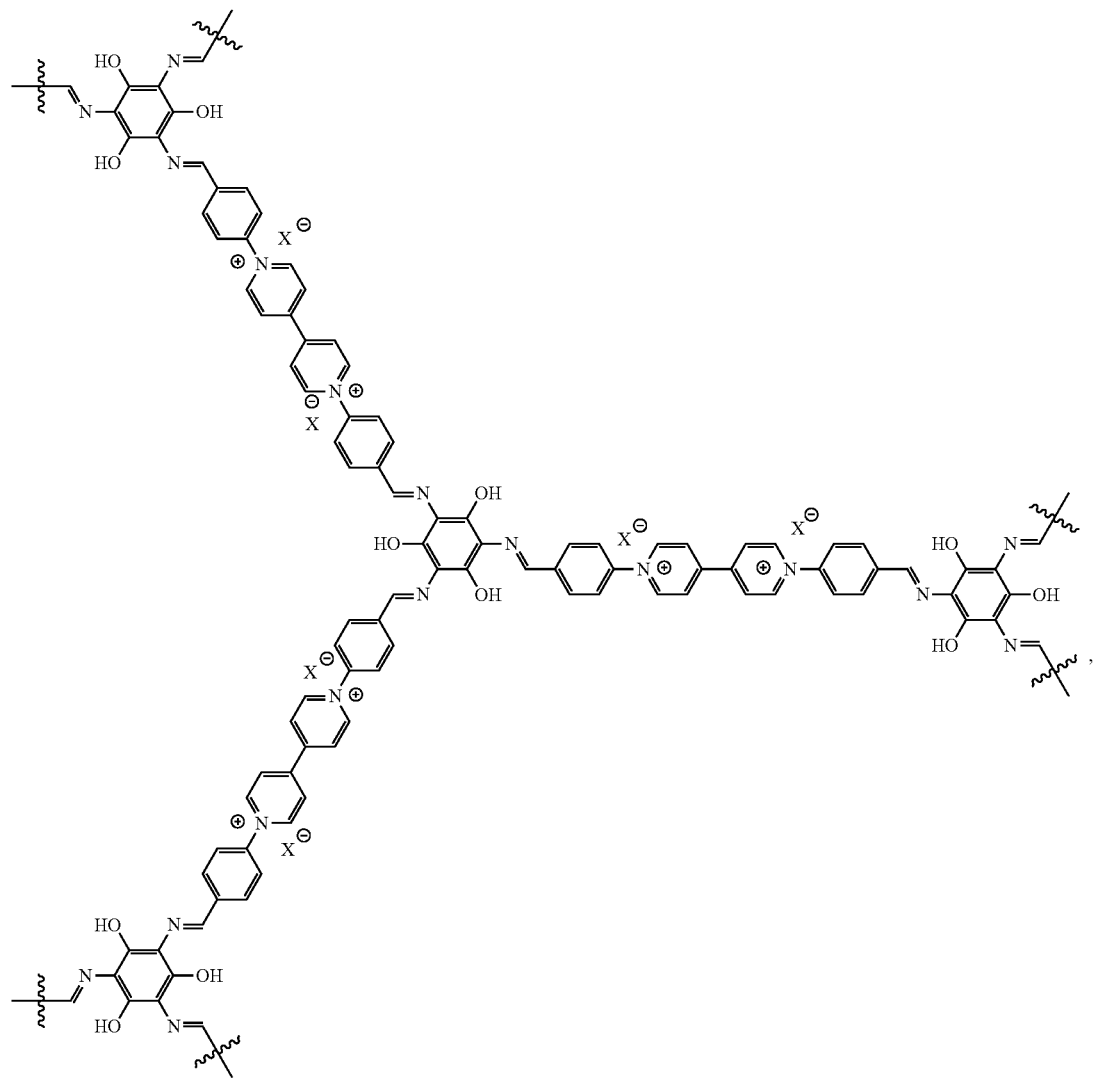
(IX)

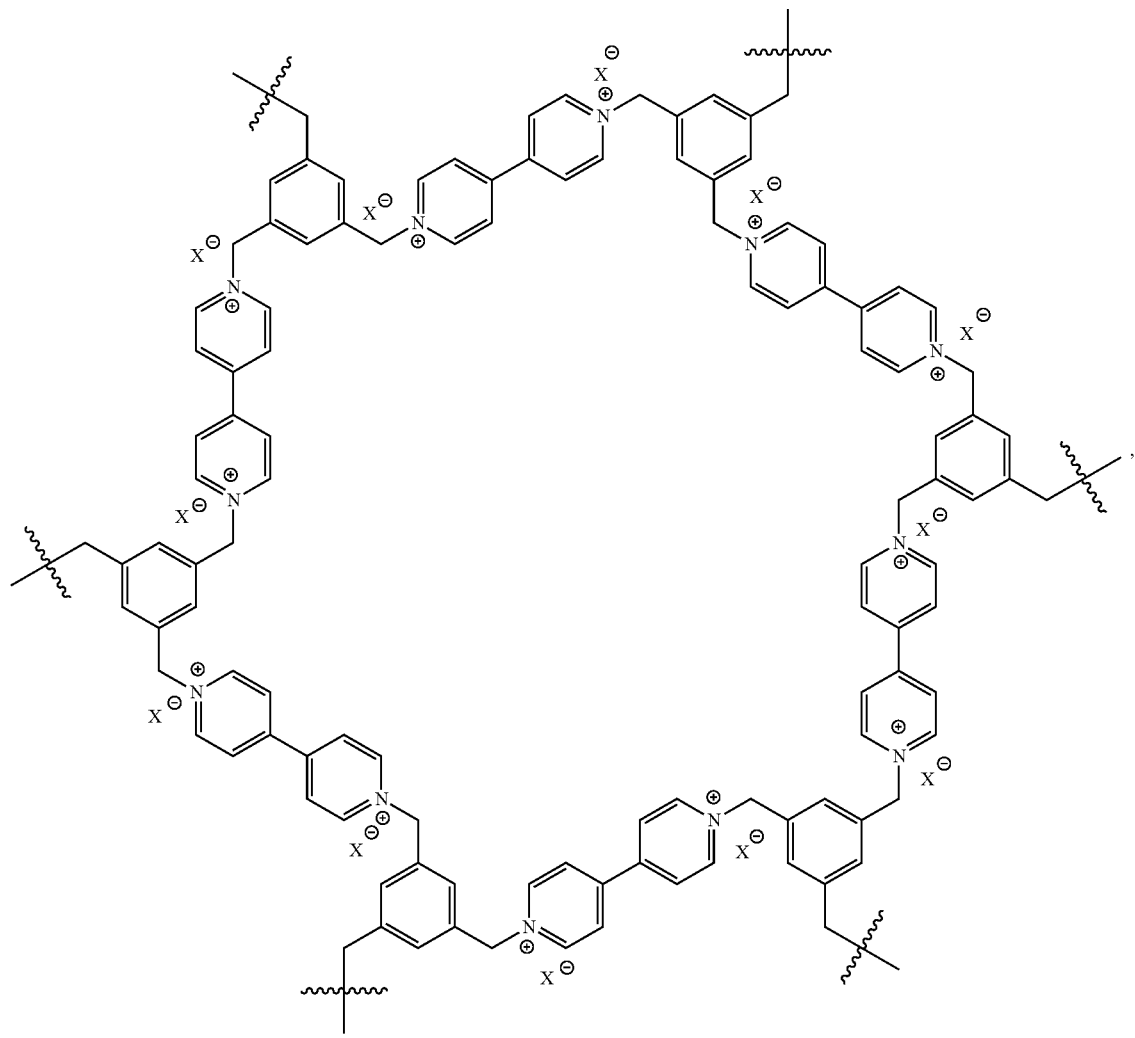
(X)

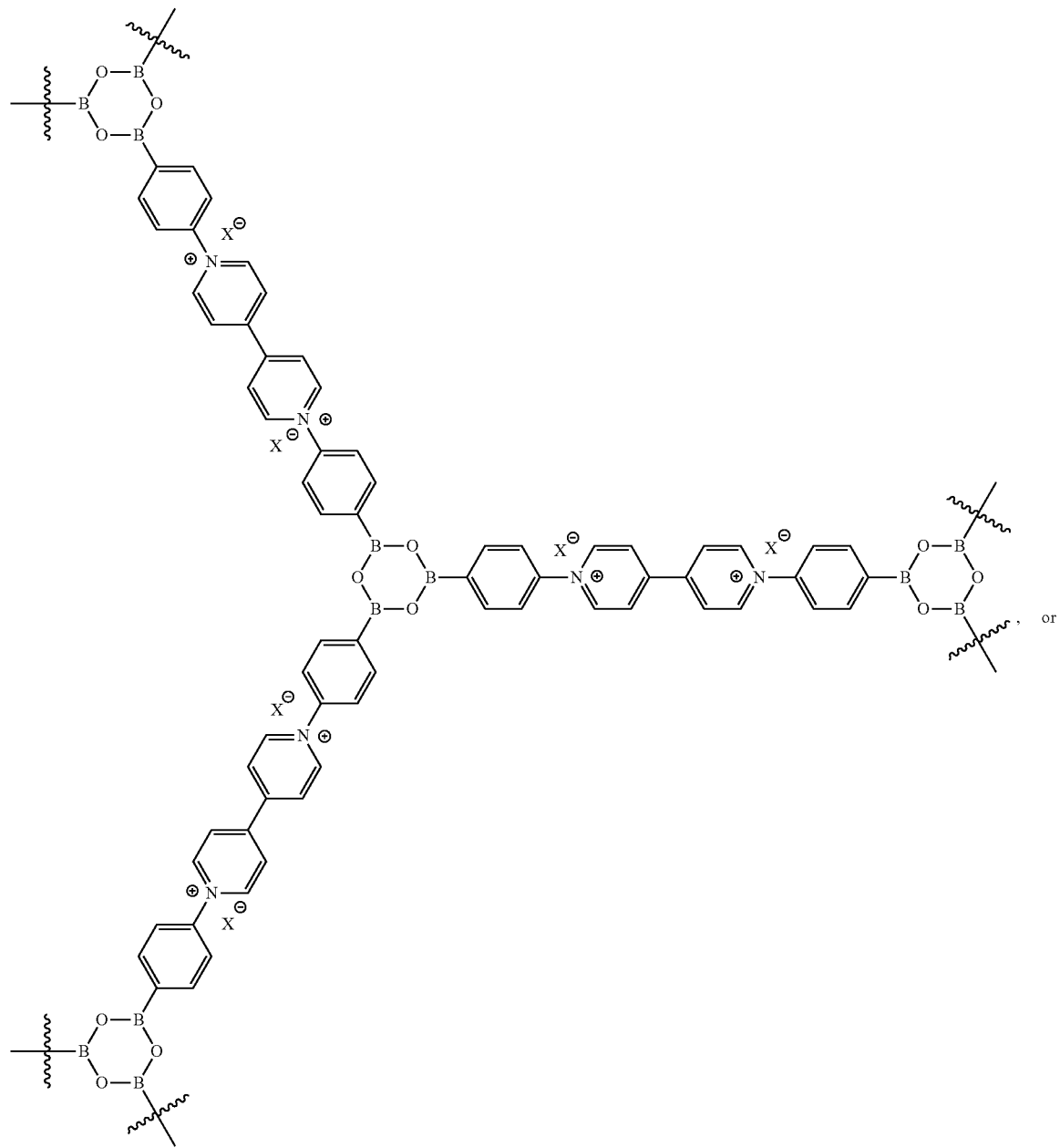
(XI)

(XII)
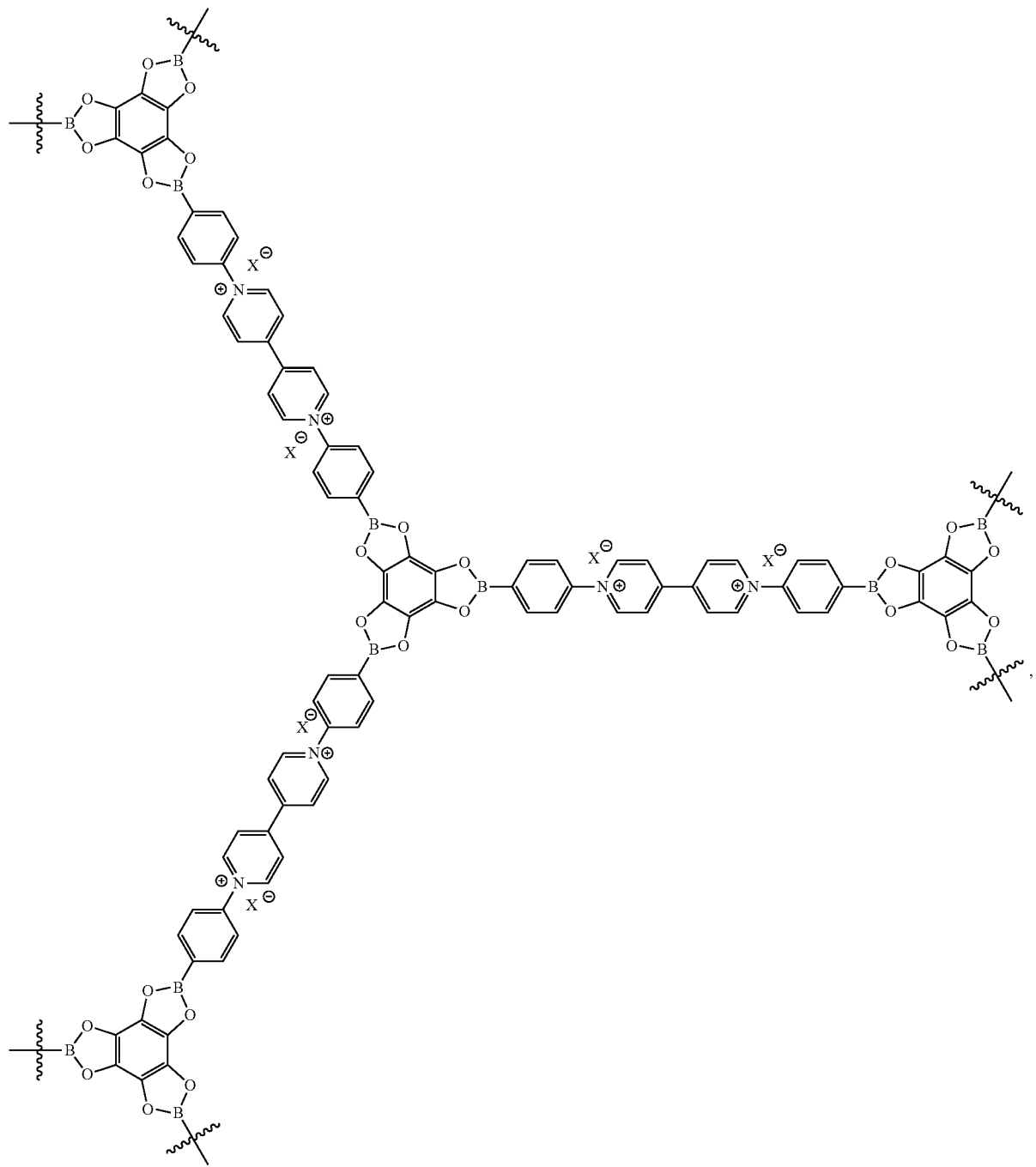
wherein X is an anion, and
wherein the anodic organic framework electroactive material is represented by at least one of the following chemical structures (III)-(V):

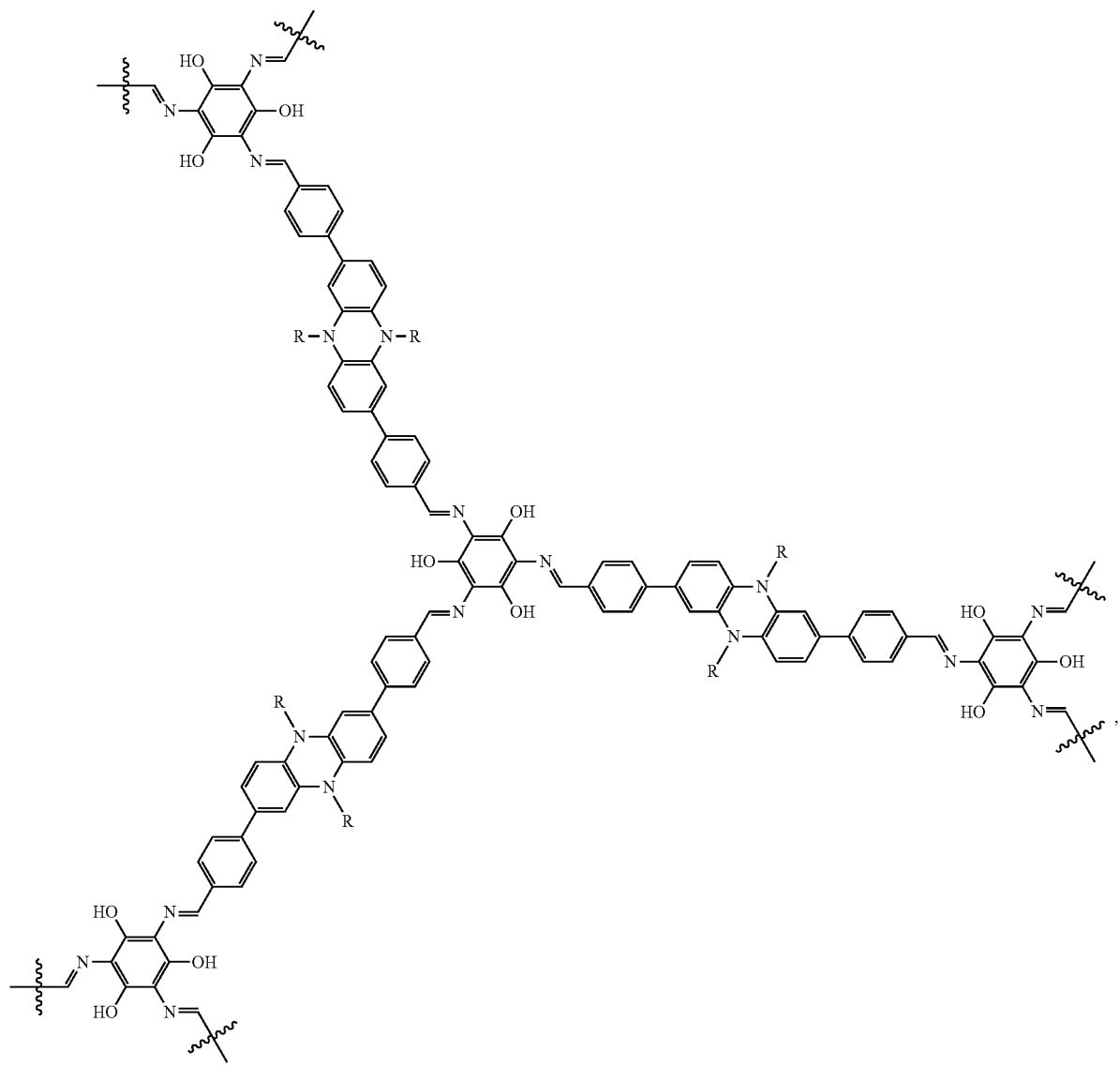

(IV)
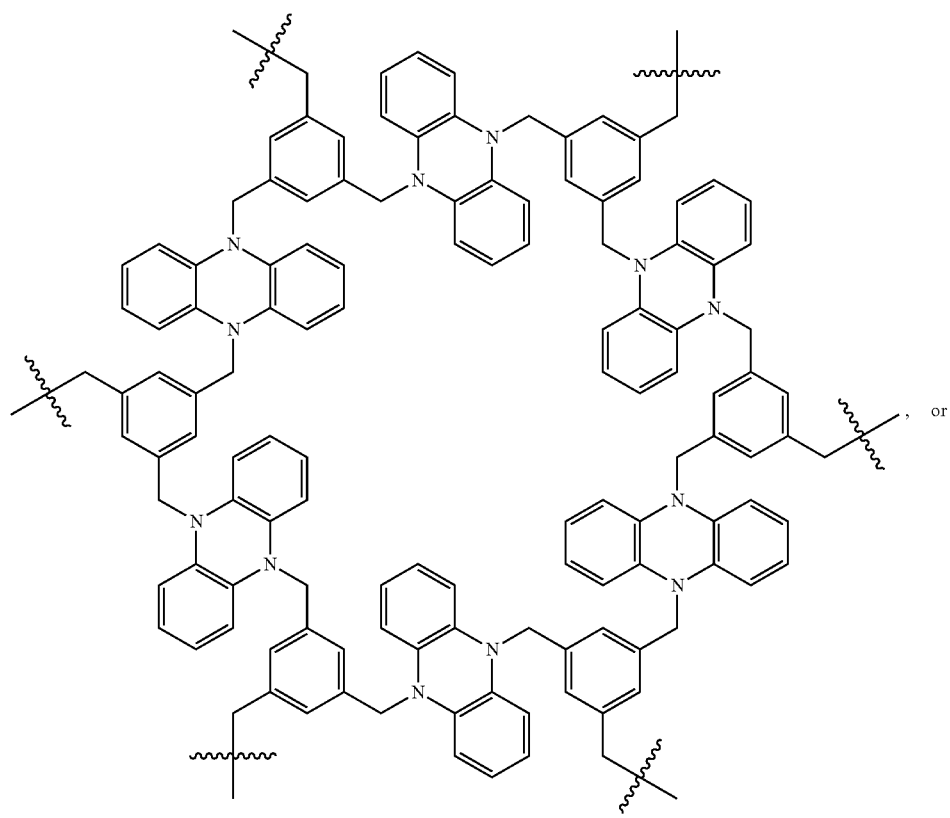
, or

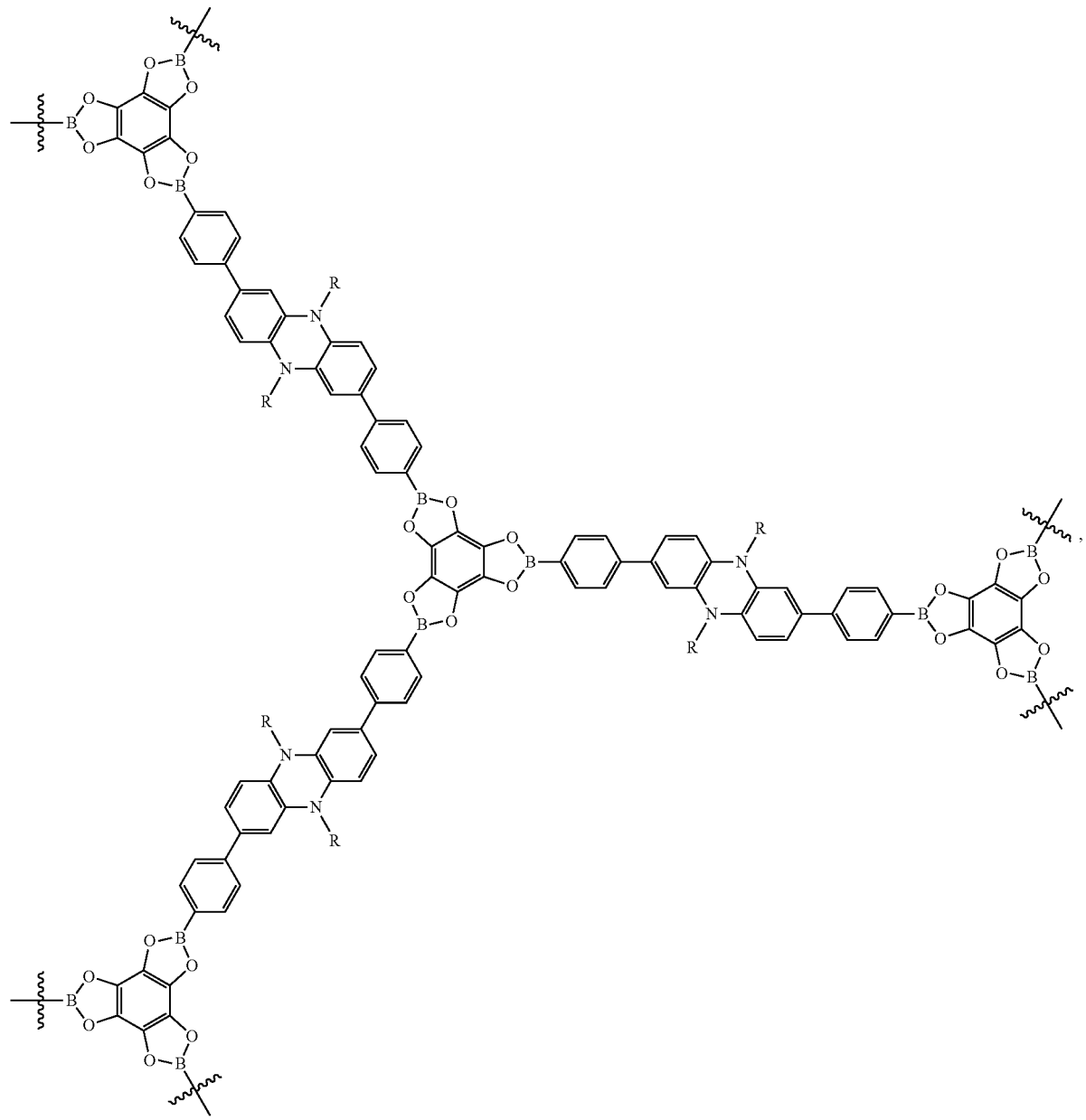

(V)

wherein R is an alkyl, siloxy alkyl, aryl, hydroxyalkyl, alkenyl, aralkyl, or a combination thereof.

19. The electrochromic device of claim 18, wherein X is $F^-$, $Cl^-$, $Br^-$, $I^-$, $BF_4^-$, $PF_6^-$, $SbF_6^-$, $AsF_6^-$, $ClO_4^-$, $SO_3CF_3^-$, $N(CN)_2^-$, $N(CF_3SO_2)_2^-$, $C(CF_3SO_2)_3^-$, $N(SO_2C_2F_5)_2^-$, $^-Al(OC(CF_3)_3)_4$, bis(trifluoromethanesulfonyl) imide, $^-BAr_4$, or a combination thereof, wherein Ar is a aryl or fluorinated aryl group.

20. The electrochromic device of claim 18, further comprising an electrolyte salt.

* * * * *